(12) United States Patent
Hasegawa et al.

(10) Patent No.: US 11,438,504 B2
(45) Date of Patent: Sep. 6, 2022

(54) IMAGING ELEMENT, IMAGING APPARATUS, OPERATION METHOD OF IMAGING ELEMENT, AND PROGRAM

(71) Applicant: FUJIFILM CORPORATION, Tokyo (JP)

(72) Inventors: Ryo Hasegawa, Saitama (JP); Tomoyuki Kawai, Saitama (JP); Hitoshi Sakurabu, Saitama (JP); Makoto Kobayashi, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/348,779

(22) Filed: Jun. 16, 2021

(65) Prior Publication Data

US 2021/0314486 A1     Oct. 7, 2021

Related U.S. Application Data

(63) Continuation of application No. PCT/JP2019/049219, filed on Dec. 16, 2019.

(30) Foreign Application Priority Data

Dec. 26, 2018  (JP) ............................ JP2018-243663

(51) Int. Cl.
*H04N 5/232* (2006.01)
*G02B 7/14* (2021.01)
(Continued)

(52) U.S. Cl.
CPC ......... *H04N 5/23232* (2013.01); *G02B 7/102* (2013.01); *G02B 7/14* (2013.01); *H04N 5/2353* (2013.01); *G03B 17/14* (2013.01)

(58) Field of Classification Search
CPC .... H04N 5/23232; H04N 5/2353; G02B 7/14; G02B 17/14
See application file for complete search history.

(56) References Cited

U.S. PATENT DOCUMENTS 8,154,606 B2* 4/2012 Tokuyama ............. H04N 5/772
                                                        348/208.16
10,937,287 B2* 3/2021 Kim ....................... H04N 7/013

FOREIGN PATENT DOCUMENTS

JP     2001-333429 A    11/2001
JP     2009-296353 A    12/2009
(Continued)

OTHER PUBLICATIONS

International Search Report issued in International Application No. PCT/JP2019/049219 dated Mar. 3, 2020.
(Continued)

*Primary Examiner* — Ahmed A Berhan
(74) *Attorney, Agent, or Firm* — Solaris Intellectual Property Group, PLLC

(57) ABSTRACT

An imaging element incorporates a memory and a processor. The memory stores image data obtained by imaging a subject at a first frame rate. The processor is configured to derive a degree of difference between first image data obtained as the image data by performing imaging and second image data that is obtained as the image data earlier than the first image data and stored in the storage portion, and perform processing of deciding at least one of the first image data or the second image data as the output image data in a case where the derived degree of difference is greater than or equal to a threshold value. The processor is configured to output the decided output image data at a second frame rate.

21 Claims, 43 Drawing Sheets

(51) Int. Cl.
*H04N 5/235* (2006.01)
*G03B 17/14* (2021.01)
*G02B 7/10* (2021.01)

(56) References Cited

FOREIGN PATENT DOCUMENTS

| | | |
|---|---|---|
| JP | 2010-88050 A | 4/2010 |
| JP | 2017-108368 A | 6/2017 |
| JP | 2017-188760 A | 10/2017 |

OTHER PUBLICATIONS

Written Opinion of the ISA issued in International Application No. PCT/JP2019/049219 dated Mar. 3, 2020.
International Preliminary Report on Patentability issued in International Application No. PCT/JP2019/049219 dated Sep. 8, 2020.

* cited by examiner

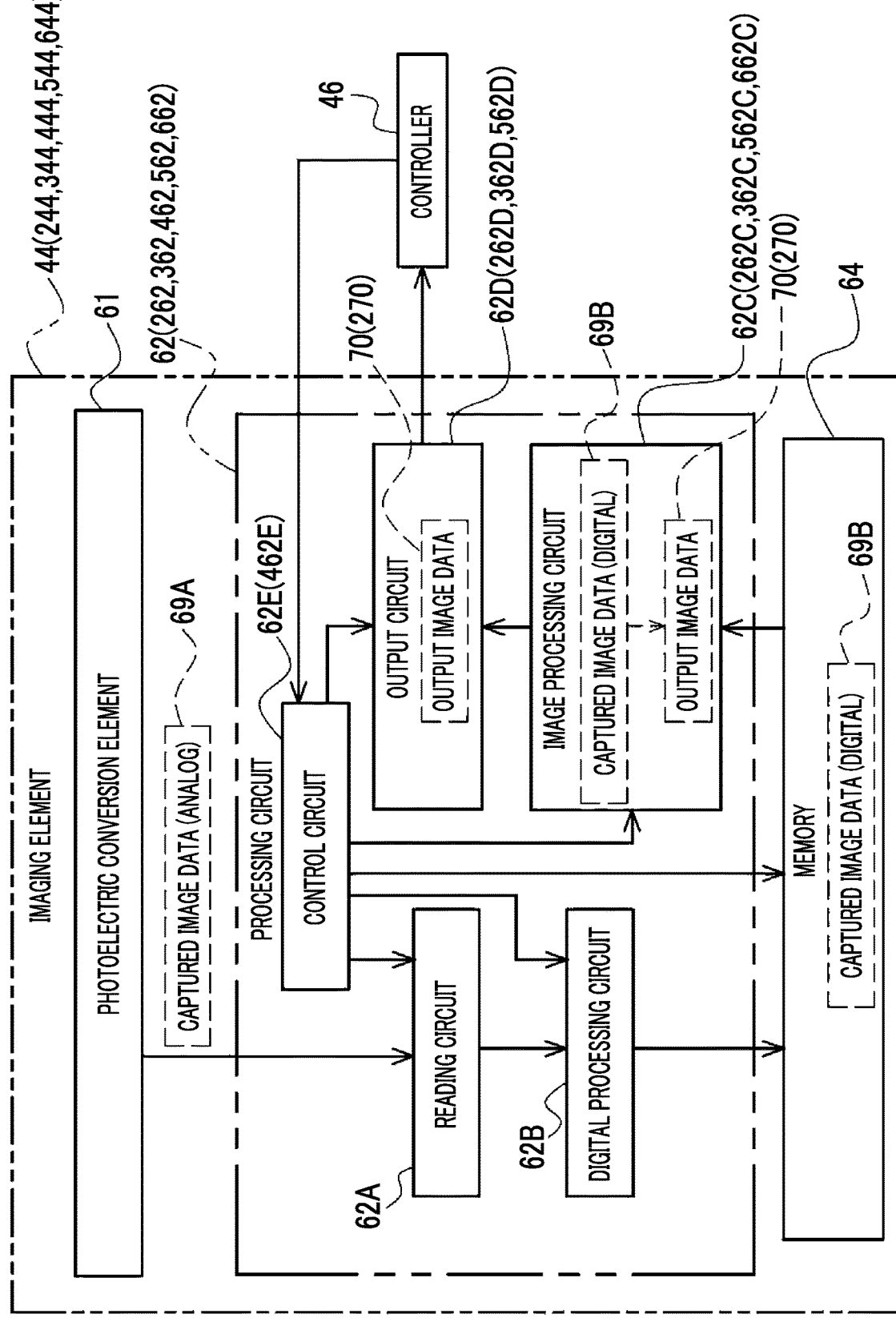

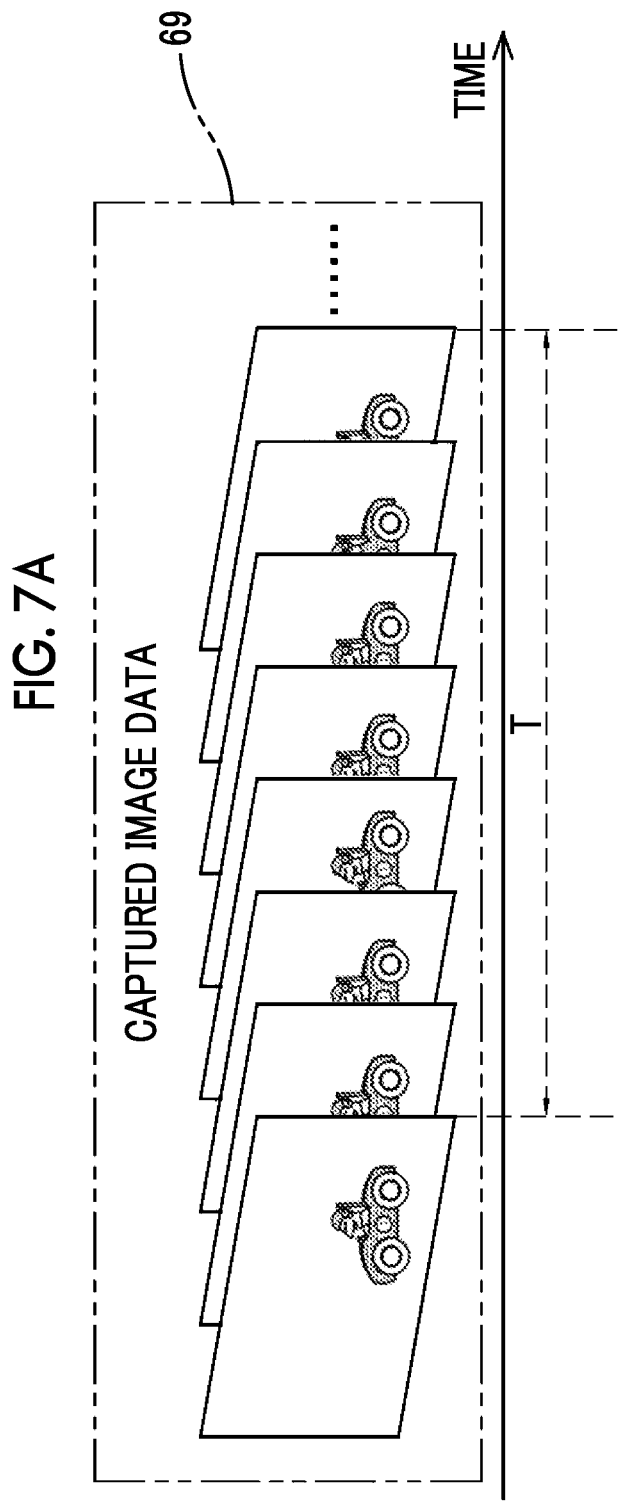

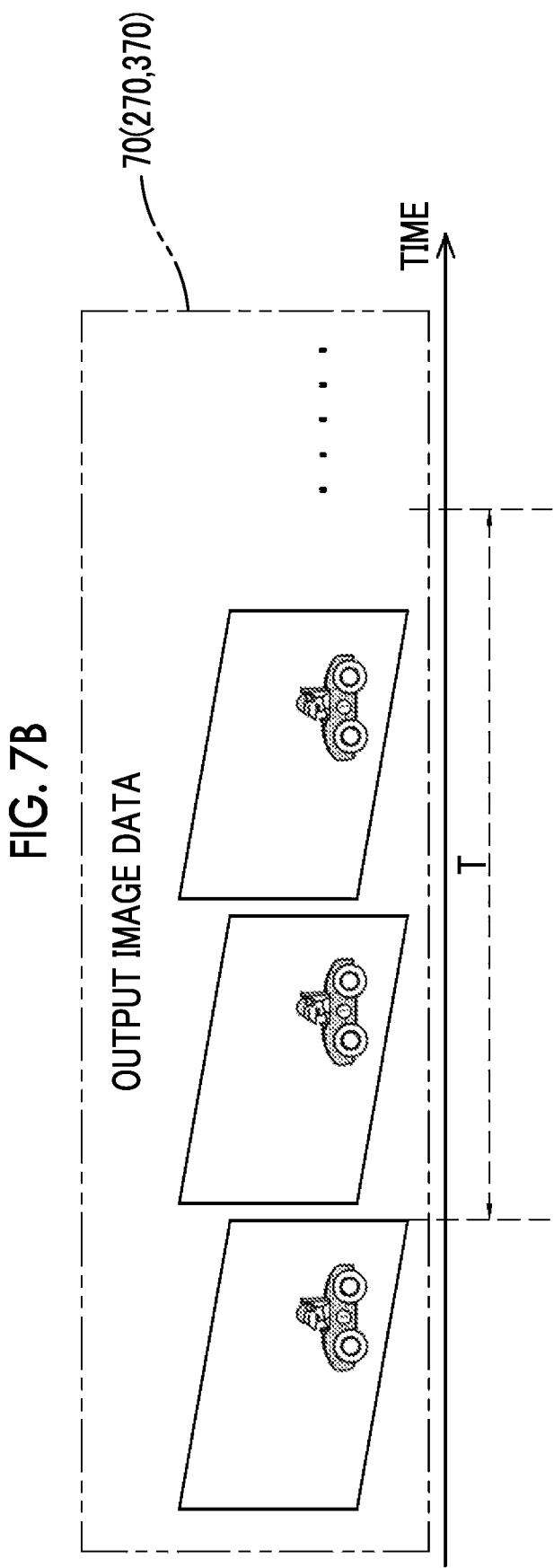

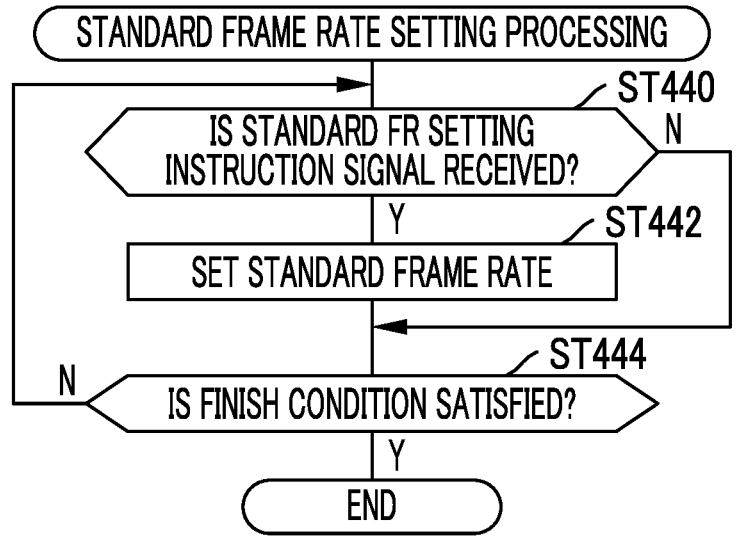
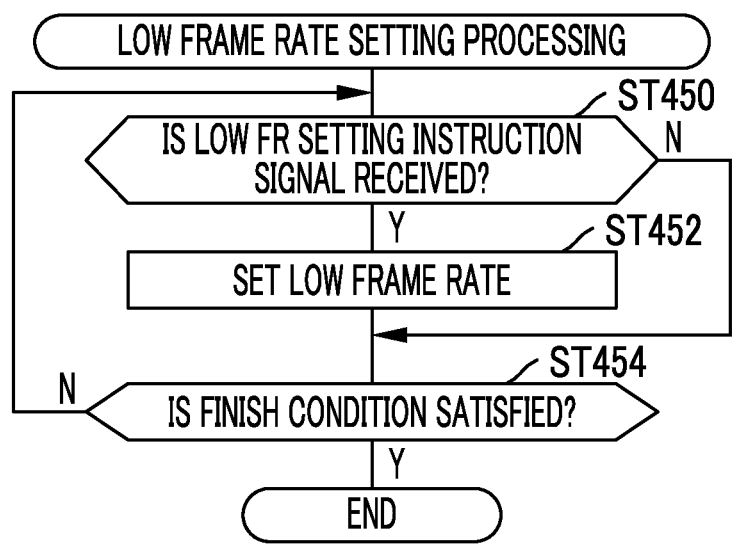

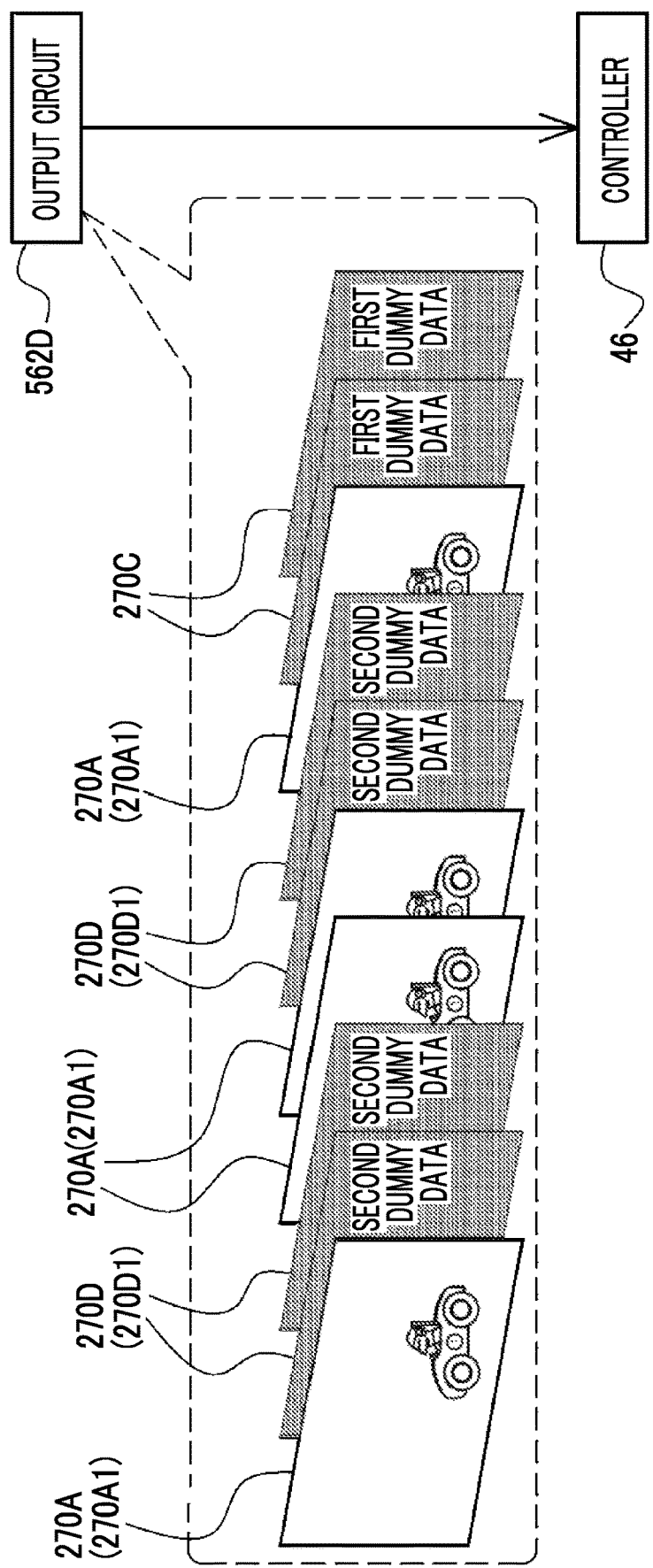

IMAGING ELEMENT, IMAGING APPARATUS, OPERATION METHOD OF IMAGING ELEMENT, AND PROGRAM

CROSS-REFERENCE TO RELATED APPLICATIONS

This application is a continuation application of International Application No. PCT/JP2019/049219, filed Dec. 16, 2019, the disclosure of which is incorporated herein by reference in its entirety. Further, this application claims priority from Japanese Patent Application No. 2018-243663, filed Dec. 26, 2018, the disclosure of which is incorporated herein by reference in its entirety.

BACKGROUND

1. Technical Field

The technology of the present disclosure relates to an imaging element, an imaging apparatus, an operation method of an imaging element, and a program.

2. Related Art

JP2017-108368A discloses a technology for obtaining difference data between a first frame and a second frame, outputting the difference data in a case where a difference is not detected, and displaying an image corresponding to imaging data of a third frame on a display apparatus in a case where the difference is detected.

JP2009-296353A discloses an imaging element module comprising a memory that stores captured image data as a digital signal, and a compressor that compresses the captured image data read out from the memory and outputs the captured image data to an outside. In the imaging element module disclosed in JP2009-296353A, difference data between previous captured image data and current captured image data is compressed data.

SUMMARY

One embodiment according to the technology of the present disclosure provides an imaging element, an imaging apparatus, an operation method of an imaging element, and a program capable of reducing power consumption required for outputting image data, compared to a case of outputting every image data obtained by imaging.

An imaging element according to a first aspect of the technology of the present disclosure is an imaging element comprising a storage portion that stores image data obtained by imaging a subject at a first frame rate and is incorporated in the imaging element, a processing portion that performs processing using the image data and is incorporated in the imaging element, and an output portion that outputs output image data based on the image data at a second frame rate based on a processing result and is incorporated in the imaging element, in which the processing portion derives a degree of difference between first image data obtained as the image data by performing imaging and second image data that is obtained as the image data earlier than the first image data and stored in the storage portion, and performs processing of deciding at least one of the first image data or the second image data as the output image data in a case where the derived degree of difference is greater than or equal to a threshold value, and the output portion outputs the output image data decided by the processing portion. Accordingly, power consumption required for outputting image data can be reduced, compared to a case of outputting every image data obtained by imaging.

In the imaging element according to a second aspect of the technology of the present disclosure, the processing portion performs thinning processing on the first image data and the second image data, and derives a degree of difference between the first image data after the thinning processing and the second image data after the thinning processing. Accordingly, the power consumption required for outputting the image data can be reduced, compared to a case of not performing the thinning processing on the first image data and the second image data.

In the imaging element according to a third aspect of the technology of the present disclosure, the processing portion detects main subject image data indicating an image of a main subject from one of the first image data and the second image data, and detects, from the other of the first image data and the second image data, specific image data indicating an image specified from a position corresponding to a position of the image of the main subject within an image indicated by the first image data, and the degree of difference is a degree of difference between the main subject image data detected by the processing portion and the specific image data detected by the processing portion. Accordingly, a load exerted on the processing portion can be reduced, compared to a case of deriving a degree of difference between the entire first image data and the entire second image data.

In the imaging element according to a fourth aspect of the technology of the present disclosure, the processing portion, in a case where a state where the degree of difference is less than the threshold value continues for a predetermined time period, decreases at least the first frame rate out of the first frame rate and the second frame rate. Accordingly, power consumption of the imaging element can be reduced, compared to a case of performing imaging without decreasing the first frame rate during a period in which the subject is not having a noticeable motion.

In the imaging element according to a fifth aspect of the technology of the present disclosure, the processing portion detects, from the image data, closed-eye image data indicating an image of an eye in a state where an eyelid is closed, and the output portion, in a case where the closed-eye image data is detected, does not output the image data from which the closed-eye image data is detected. The power consumption required for outputting the image data can be reduced, compared to a case of outputting the output image data including the closed-eye image data.

In the imaging element according to a sixth aspect of the technology of the present disclosure, the output portion, in a case where the degree of difference is greater than or equal to the threshold value, decides at least one of the first image data or the second image data as the output image data on a condition that the closed-eye image data is not detected by the processing portion. Accordingly, the output image data that is expected to be highly necessary for a user can be provided to the user.

In the imaging element according to a seventh aspect of the technology of the present disclosure, the processing portion derives an evaluation value indicating a degree of focusing for the image data, and the output portion, in a case where the derived evaluation value is less than a predetermined evaluation value, does not output the image data of a derivation target for the evaluation value less than the predetermined evaluation value. Accordingly, the power consumption required for outputting the image data can be reduced, compared to a case of outputting the output image data corresponding to the evaluation value less than the predetermined evaluation value.

In the imaging element according to an eighth aspect of the technology of the present disclosure, the processing portion, in a case where the degree of difference is greater than or equal to the threshold value, decides at least one of the first image data or the second image data as the output image data on a condition that the evaluation value is greater than or equal to the predetermined evaluation value. Accordingly, the output image data that is expected to be highly necessary for the user can be provided to the user.

In the imaging element according to a ninth aspect of the technology of the present disclosure, the output portion outputs first dummy data in a case where the degree of difference is less than the threshold value. Accordingly, a toggle rate of data can be decreased, compared to an output of the output image data in a case where the degree of difference is less than the threshold value.

In the imaging element according to a tenth aspect of the technology of the present disclosure, the output portion, even in a case where the degree of difference is greater than or equal to the threshold value, does not output the output image data and outputs second dummy data in a case where the output image data is image data satisfying a specific condition. Accordingly, the toggle rate of data can be decreased, compared to a constant output of every output image data in a case where the degree of difference is greater than or equal to the threshold value.

In the imaging element according to an eleventh aspect of the technology of the present disclosure, at least a photoelectric conversion element and the storage portion are formed in one chip. Accordingly, portability of the imaging element can be increased, compared to a case where the photoelectric conversion element and the storage portion are not formed in one chip.

In the imaging apparatus according to a twelfth aspect of the technology of the present disclosure, the imaging element is a laminated imaging element in which the photoelectric conversion element is laminated with the storage portion. Accordingly, a transfer speed of data from the photoelectric conversion element to the storage portion can be increased, compared to a non-laminated imaging element in which the photoelectric conversion element is not laminated with the storage portion.

An imaging apparatus according to a thirteenth aspect of the technology of the present disclosure comprises the imaging element according to any one of the first to twelfth aspects, and a display control portion that performs a control for displaying an image based on the output image data output by the output portion on a display portion. Accordingly, the power consumption can be reduced, compared to a case of displaying images indicated by every image data obtained by imaging the subject.

An imaging apparatus according to a fourteenth aspect of the technology of the present disclosure comprises the imaging element according to any one of the first to twelfth aspects, and a storage control portion that performs a control for storing the output image data output by the output portion in a storage device. Accordingly, the power consumption can be reduced, compared to a case of storing every image data obtained by imaging the subject in the storage device.

An operation method of an imaging element according to a fifteenth aspect of the technology of the present disclosure is an operation method of an imaging element including a storage portion that stores image data obtained by imaging a subject at a first frame rate, a processing portion that performs processing using the image data, and an output portion that outputs output image data based on the image data at a second frame rate based on a processing result of the processing portion, the storage portion, the processing portion, and the output portion being incorporated in the imaging element, the operation method comprising, by the processing portion, deriving a degree of difference between first image data obtained as the image data by performing imaging and second image data that is obtained as the image data earlier than the first image data and stored in the storage portion, and performing processing of deciding at least one of the first image data or the second image data as the output image data in a case where the derived degree of difference is greater than or equal to a threshold value, and by the output portion, outputting the output image data decided by the processing portion. Accordingly, the power consumption required for outputting the image data can be reduced, compared to a case of outputting every image data obtained by imaging.

A program according to a sixteenth aspect of the technology of the present disclosure is a program causing a computer to function as a processing portion and an output portion included in an imaging element including a storage portion that stores image data obtained by imaging a subject at a first frame rate, a processing portion that performs processing using the image data, and an output portion that outputs output image data based on the image data at a second frame rate based on a processing result of the processing portion, the storage portion, the processing portion, and the output portion being incorporated in the imaging element, in which the processing portion derives a degree of difference between first image data obtained as the image data by performing imaging and second image data that is obtained as the image data earlier than the first image data and stored in the storage portion, and performs processing of deciding at least one of the first image data or the second image data as the output image data in a case where the derived degree of difference is greater than or equal to a threshold value, and the output portion outputs the output image data decided by the processing portion. Accordingly, the power consumption required for outputting the image data can be reduced, compared to a case of outputting every image data obtained by imaging.

An imaging element according to a seventeenth aspect of the technology of the present disclosure is an imaging element comprising a memory that stores image data obtained by imaging a subject at a first frame rate and is incorporated in the imaging element, and a processor that is incorporated in the imaging element and configured to perform processing using the image data and output output image data based on the image data at a second frame rate depending on a processing result of the processing portion, in which the processor is configured to derive a degree of difference between first image data obtained as the image data by performing imaging and second image data that is obtained as the image data earlier than the first image data and stored in the memory, perform processing of deciding at least one of the first image data or the second image data as the output image data in a case where the derived degree of difference is greater than or equal to a threshold value, and output the decided output image data.

BRIEF DESCRIPTION OF THE DRAWINGS

Exemplary embodiments of the technology of the disclosure will be described in detail based on the following figures, wherein:

FIG. 6 is a block diagram illustrating an example of a configuration of the imaging element according to the first to sixth embodiments;

FIG. 7A is a conceptual diagram for describing an imaging frame rate of the imaging apparatus according to the first to sixth embodiments;

FIG. 7B is a conceptual diagram for describing an output frame rate of the imaging apparatus according to the first to sixth embodiments;

FIG. 30 is a flowchart illustrating an example of a flow of standard frame rate setting processing according to the fourth embodiment;

FIG. 31 is a flowchart illustrating an example of a flow of low frame rate setting processing according to the fourth embodiment;

FIG. 35 is a conceptual diagram illustrating an example of image data output by an output circuit included in the processing circuit of the imaging apparatus according to the fifth embodiment;

DETAILED DESCRIPTION

Hereinafter, an example of embodiments of an imaging apparatus according to the embodiments of the technology of the present disclosure will be described in accordance with the appended drawings.

First, meanings of terms used in the following description will be described.

In the following description, the abbreviation CPU stands for "Central Processing Unit". In addition, in the following description, the abbreviation RAM stands for "Random Access Memory". In addition, in the following description, the abbreviation ROM stands for "Read Only Memory". In addition, in the following description, the abbreviation DRAM stands for "Dynamic Random Access Memory". In addition, in the following description, the abbreviation SRAM stands for "Static Random Access Memory".

In the following description, the abbreviation LSI stands for "Large-Scale Integration". In addition, in the following description, the abbreviation ASIC stands for "Application Specific Integrated Circuit". In addition, in the following description, the abbreviation PLD stands for "Programmable Logic Device". In addition, in the following description, the abbreviation FPGA stands for "Field-Programmable Gate Array".

In the following description, the abbreviation SSD stands for "Solid State Drive". In addition, in the following description, the abbreviation DVD-ROM stands for "Digital Versatile Disc Read Only Memory". In addition, in the following description, the abbreviation USB stands for "Universal Serial Bus". In addition, in the following description, the abbreviation HDD stands for "Hard Disk Drive". In addition, in the following description, the abbreviation EEPROM stands for "Electrically Erasable and Programmable Read Only Memory".

In the following description, the abbreviation CCD stands for "Charge Coupled Device". In addition, in the following description, the abbreviation CMOS stands for "Complementary Metal Oxide Semiconductor". In addition, in the following description, the abbreviation EL stands for "Electro-Luminescence". In addition, in the following description, the abbreviation A/D stands for "Analog/Digital". In addition, in the following description, the abbreviation FIFO stands for "First in First out". In addition, in the following description, the abbreviation OF stands for "Interface". In addition, in the following description, the abbreviation AF stands for "Auto-Focus". In addition, in the following description, the abbreviation AE stands for "Automatic Exposure".

First Embodiment

Figure 1:
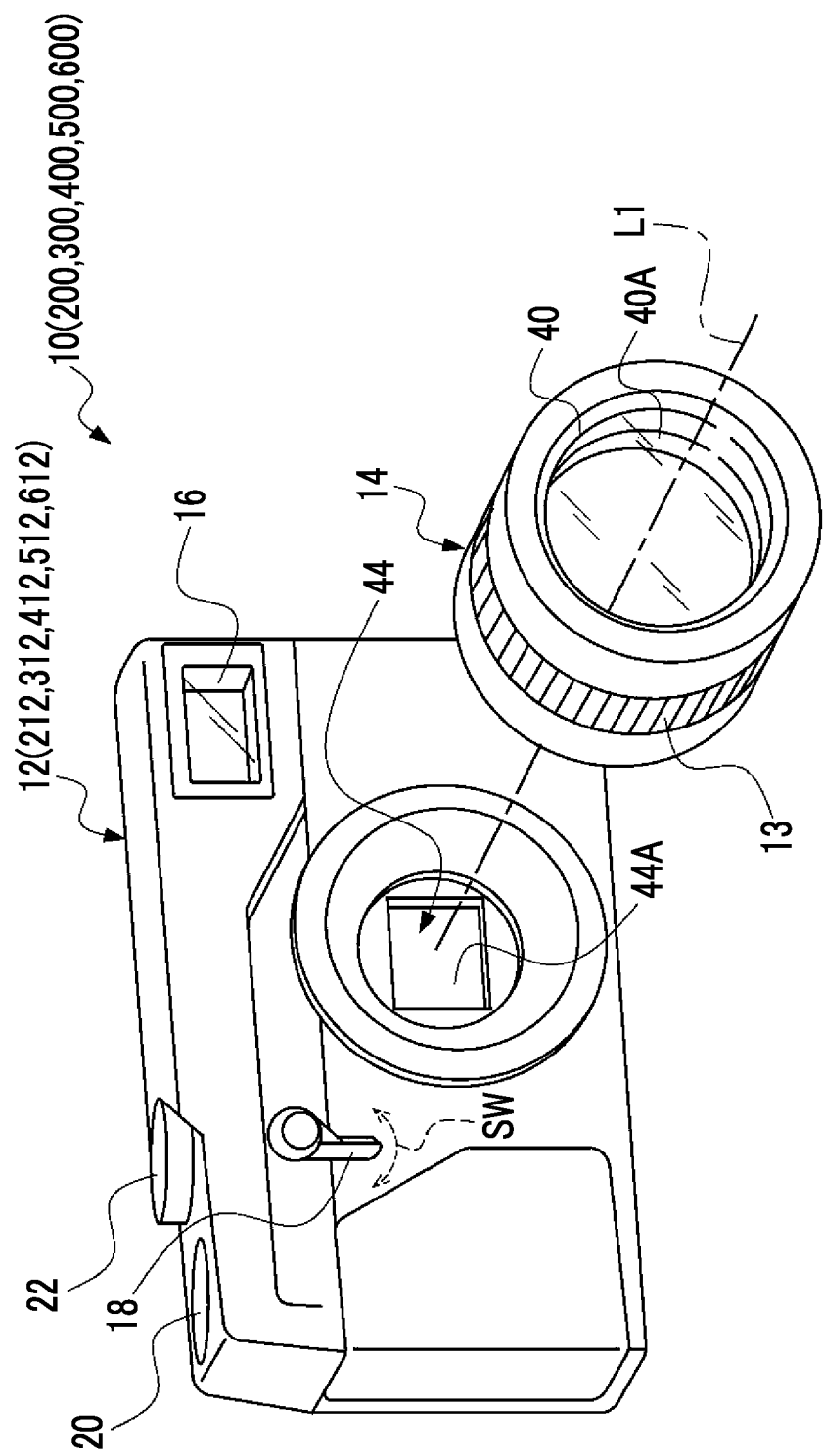
FIG. 1 is a schematic perspective view illustrating an example of an imaging apparatus according to first to sixth embodiments.

As illustrated in FIG. 1 as an example, an imaging apparatus 10 is an interchangeable lens camera. The imaging apparatus 10 is a digital camera that includes an imaging apparatus main body 12 and an interchangeable lens 14, and that does not include a reflex mirror.

A hybrid finder (registered trademark) 16 is disposed in the imaging apparatus main body 12. For example, the hybrid finder 16 here refers to a finder in which an optical view finder (hereinafter, referred to as the OVF) and an electronic view finder (hereinafter, referred to as the EVF) are selectively used. The abbreviation OVF stands for "optical viewfinder". In addition, the abbreviation EVF stands for "electronic viewfinder".

An imaging element 44 is disposed in a front view center portion of the imaging apparatus main body 12. For example, the imaging element 44 is a CMOS image sensor. As will be described in detail later, the imaging element 44 is an example of a "laminated imaging element" according to the embodiments of the technology of the present disclosure. While the CMOS image sensor is illustrated here as the imaging element 44, the technology of the present disclosure is not limited thereto. For example, the technology of the present disclosure is also established in a case where the imaging element 44 is a CCD image sensor.

The interchangeable lens 14 is interchangeably mounted on the imaging apparatus main body 12. An imaging lens 40 is disposed in a lens barrel of the interchangeable lens 14. In a case where the interchangeable lens 14 is mounted on the imaging apparatus main body 12, an optical axis L1 of the imaging lens 40 is positioned in a center portion of a light receiving surface 44A of the imaging element 44, and an image of subject light showing a subject is formed on the light receiving surface 44A through the imaging lens 40.

A focus ring 13 that is used in a case where the imaging apparatus 10 is in a manual focus mode is disposed in the interchangeable lens 14. The imaging lens 40 includes a focus lens 40A. The focus lens 40A moves in an optical axis direction in accordance with a manual rotation operation of the focus ring 13, and the image of the subject light is formed on the light receiving surface 44A at a focal position corresponding to a subject distance. The "focal position" here refers to a position of the focus lens 40A on the optical axis L1 in a focused state.

A finder switching lever 18 is disposed on a front surface of the imaging apparatus main body 12. An optical image visually recognizable by the OVF and a live view image that is an electronic image visually recognizable by the EVF are switched by rotationally moving the finder switching lever 18 in a direction of arrow SW. The "live view image" here refers to a motion picture image for displaying obtained by imaging the subject by the imaging element 44. The live view image is generally referred to as a live preview image.

A release button 20 and a dial 22 are disposed on an upper surface of the imaging apparatus main body 12. The dial 22 is operated in a case of setting an operation mode of an imaging system, an operation mode of a playback system, and the like.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10, an imaging mode and a playback mode are selectively set as an operation mode in accordance with an instruction of a user. The imaging mode is broadly divided into a display motion picture capturing mode and a recording imaging mode.

The display motion picture capturing mode is an operation mode in which the live view image of a plurality of consecutive frames obtained by consecutive imaging is displayed on a first display 32 and/or a second display 86 (refer to FIG. 3) described later.

The recording imaging mode is broadly divided into a still picture image capturing mode and a motion picture image capturing mode. The still picture image capturing mode is an operation mode in which a still picture image obtained by imaging the subject by the imaging apparatus 10 is recorded, and the motion picture image capturing mode is an operation mode in which a motion picture image obtained by imaging the subject by the imaging apparatus 10 is recorded.

The recording imaging mode is an operation mode in which the live view image is displayed on the first display 32 and/or the second display 86 described later, and in which recording image data is recorded on a secondary storage device 80 (refer to FIG. 3) described later and/or a memory card or the like. The recording image data is broadly divided into still picture image data and motion picture image data. The still picture image data is image data obtained in the still picture image capturing mode, and the motion picture image data is image data obtained in the motion picture image capturing mode.

In a case where the imaging mode is set, first, the imaging apparatus 10 is set to the display motion picture capturing mode. In the display motion picture capturing mode, in a case where the push operation is performed on the release button 20, the imaging apparatus 10 transitions to the recording imaging mode from the display motion picture capturing mode.

In the imaging mode, a manual focus mode and an auto focus mode are selectively set in accordance with an instruction of the user. In the auto focus mode, an imaging condition is adjusted by setting the release button 20 to the half push state. Then, in a case where the full push state is subsequently set, exposure is performed. That is, by setting the release button 20 to the half push state, an AE function is operated, and an exposure state is set. Then, an AF function is operated, and a focusing control is performed. In a case where the release button 20 is set to the full push state, imaging is performed.

Figure 2:
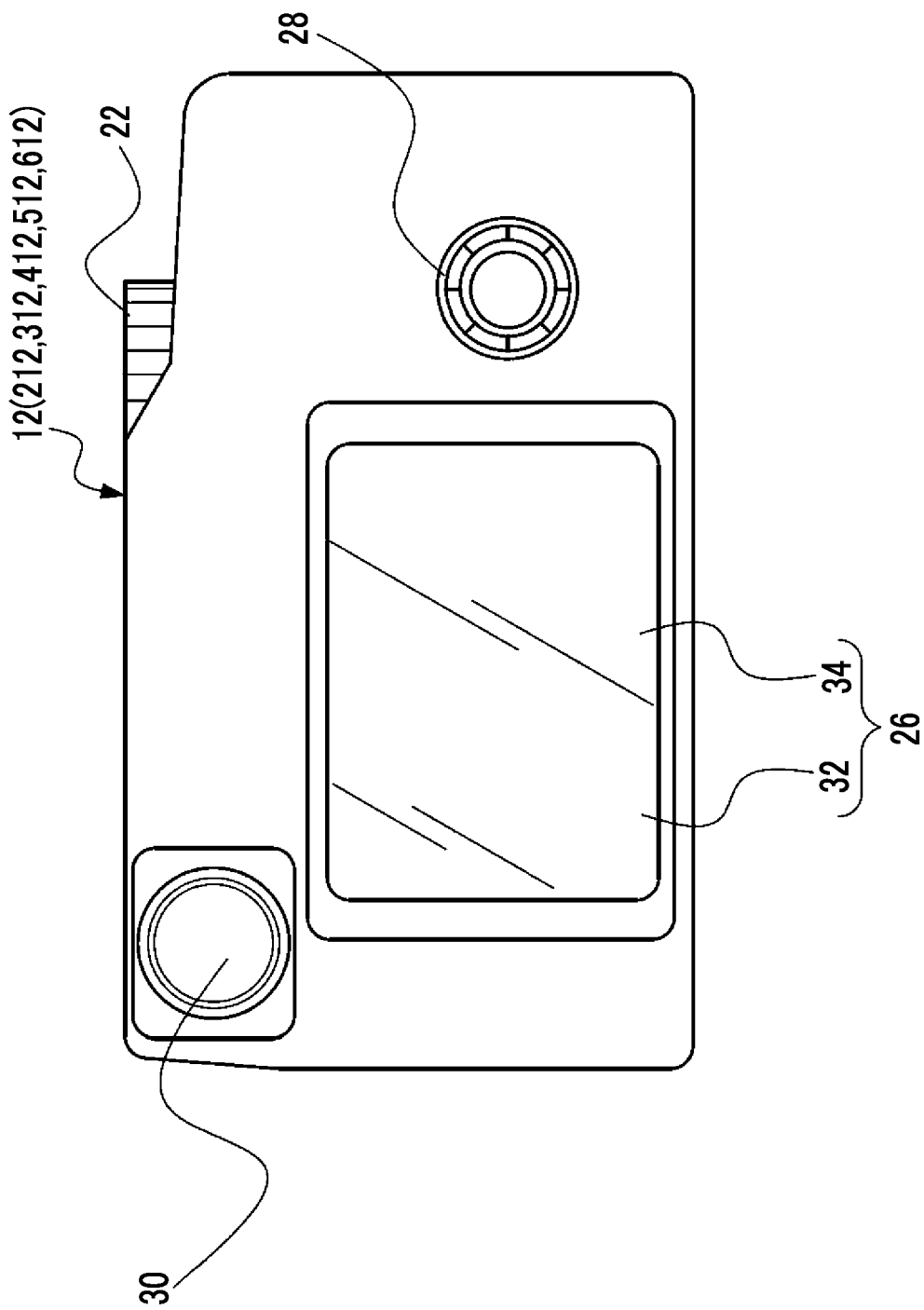
FIG. 2 is a schematic rear view illustrating an example of the imaging apparatus according to the first to sixth embodiments.

As illustrated in FIG. 2 as an example, a touch panel display 26, an instruction key 28, and a finder eyepiece portion 30 are disposed on a rear surface of the imaging apparatus main body 12.

Figure 3:
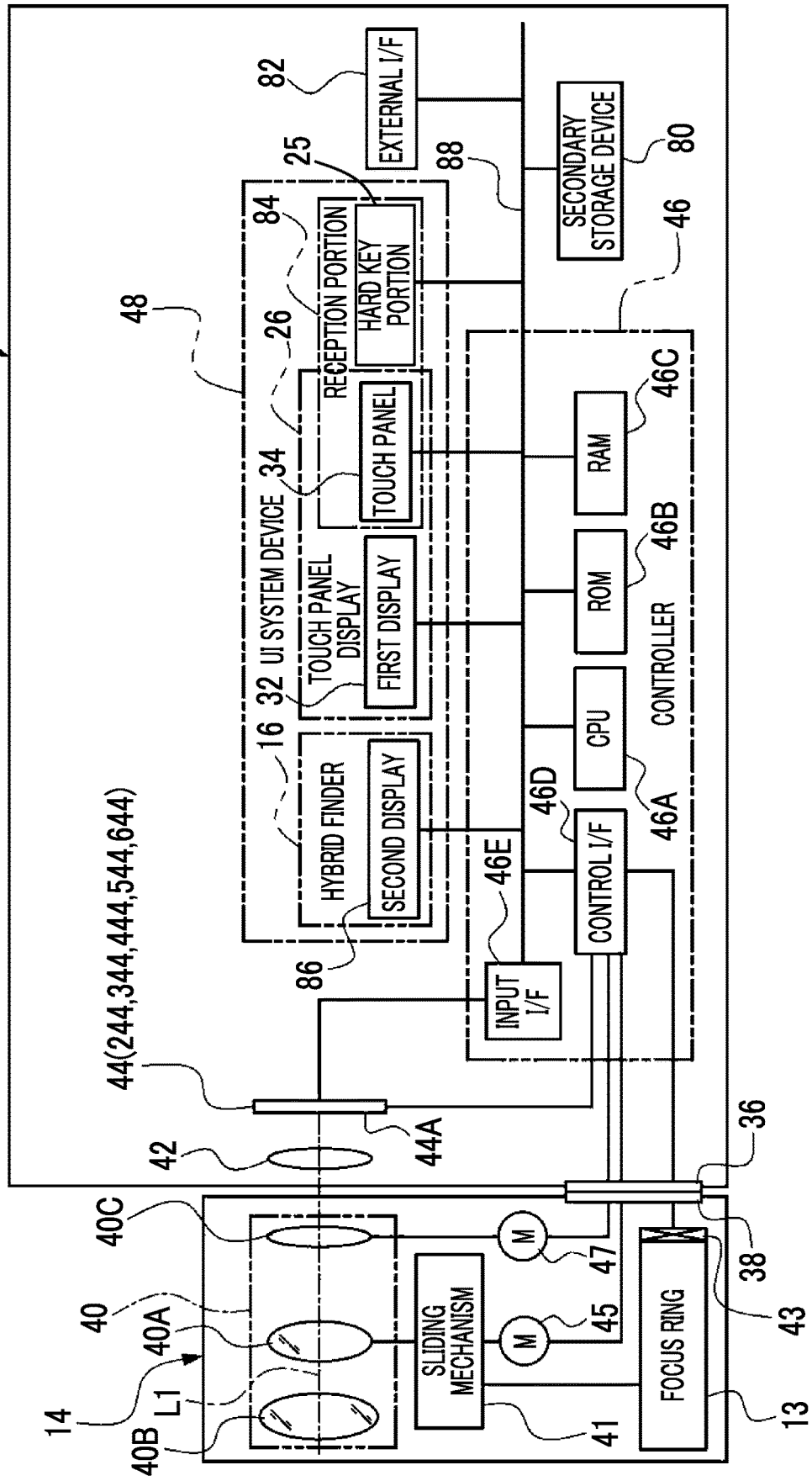
FIG. 3 is a block diagram illustrating an example of a hardware configuration of an electric system of the imaging apparatus according to the first to sixth embodiments.

The touch panel display 26 comprises the first display 32 and a touch panel 34 (refer to FIG. 3). A liquid crystal display or an organic EL display is illustrated as the first display 32.

The first display 32 displays images, text information, and the like. The first display 32 is used for displaying the live view image which is obtained by consecutive imaging in a case where the imaging apparatus 10 is in the imaging mode. In addition, the first display 32 is used for displaying the still picture image obtained by imaging in a case where a still picture image capturing instruction is provided. Furthermore, the first display 32 is used for displaying a playback image and displaying a menu screen and the like in a case where the imaging apparatus 10 is in the playback mode.

The touch panel 34 is a transmissive touch panel and is overlaid on a surface of a display region of the first display 32. The touch panel 34 senses a contact by an instruction object such as a finger or a stylus pen and outputs a sensing result to a predetermined output destination such as the CPU 46A (refer to FIG. 3) described later.

The instruction key 28 receives various instructions such as selection of one or a plurality of menus, confirmation of a selected content, deletion of the selected content, zooming, and frame advance.

As illustrated in FIG. 3 as an example, the imaging apparatus 10 comprises mounts 36 and 38. The mount 36 is disposed in the imaging apparatus main body 12. The mount 38 is disposed in the interchangeable lens 14 at a position corresponding to a position of the mount 36. The interchangeable lens 14 is interchangeably mounted on the imaging apparatus main body 12 by joining the mount 38 to the mount 36.

As illustrated in FIG. 3 as an example, the interchangeable lens 14 includes an imaging lens 40. The imaging lens 40 comprises an objective lens 40B and a stop 40C in addition to the focus lens 40A. The focus lens 40A, the objective lens 40B, and the stop 40C are arranged in an order of the objective lens 40B, the focus lens 40A, and the stop 40C along the optical axis L1 from a subject side to an imaging apparatus main body 12 side.

The imaging lens 40 includes a sliding mechanism 41 and motors 45 and 47. The motor 47 is connected to the stop 40C. The stop 40C adjusts exposure by operating in response to motive power provided from the motor 47.

The sliding mechanism 41 moves the focus lens 40A along the optical axis L1 by receiving motive power. The motor 45 and the focus ring 13 are connected to the sliding mechanism 41. Motive power from the motor 45 or motive power obtained by operating the focus ring 13 is provided to the sliding mechanism 41. That is, the sliding mechanism 41 moves the focus lens 40A along the optical axis L1 in accordance with the motive power from the motor 45 or the motive power obtained by operating the focus ring 13.

The motors 45 and 47 are connected to the imaging apparatus main body 12 through the mounts 36 and 38, and driving of the motors 45 and 47 is controlled in accordance with a command from the imaging apparatus main body 12. In the present embodiment, stepping motors are applied as an example of the motors 45 and 47. Accordingly, the motors 45 and 47 operate in synchronization with pulse electric power in accordance with the command from the imaging apparatus main body 12. While an example of disposing the motors 45 and 47 in the imaging lens 40 is illustrated in the example illustrated in FIG. 3, the technology of the present disclosure is not limited thereto. At least one of the motors 45 and 47 may be disposed in the imaging apparatus main body 12.

A rotary encoder 43 is disposed in the imaging apparatus main body 12. The rotary encoder 43 is connected to the imaging apparatus main body 12 through the mounts 36 and 38. The rotary encoder 43 detects a position of the focus ring 13 and outputs a detection result to the imaging apparatus main body 12.

The imaging apparatus main body 12 comprises a mechanical shutter 42. The mechanical shutter 42 operates by receiving motive power from a driving source (not illustrated) such as a motor under control of the CPU 46A described later. In a case where the interchangeable lens 14 is mounted on the imaging apparatus main body 12 through the mounts 36 and 38, the subject light is transmitted through the imaging lens 40, and the image of the subject light is formed on the light receiving surface 44A through the mechanical shutter 42.

The imaging apparatus main body 12 comprises a controller 46 and a UI system device 48. The controller 46 controls the entire imaging apparatus 10. The UI system device 48 is a device that presents information to the user or receives an instruction from the user. The UI system device 48 is connected to the controller 46 through a busline 88. The controller 46 acquires various types of information from the UI system device 48 and controls the UI system device 48.

The controller 46 comprises a CPU 46A, a ROM 46B, a RAM 46C, a control I/F 46D, and an input I/F 46E. The CPU 46A, the ROM 46B, the RAM 46C, the control I/F 46D, and the input I/F 46E are connected to each other through the busline 88.

The ROM 46B stores various programs. The CPU 46A reads out the various programs from the ROM 46B and loads the read various programs into the RAM 46C. The CPU 46A controls the entire imaging apparatus 10 in accordance with the various programs loaded in the RAM 46C.

The control I/F 46D is a device including an FPGA and is connected to the imaging element 44. The CPU 46A controls the imaging element 44 through the control I/F 46D. In addition, the control I/F 46D is connected to the motors 45 and 47 through the mounts 36 and 38, and the CPU 46A controls the motors 45 and 47 through the control I/F 46D. Furthermore, the control I/F 46D is connected to the rotary encoder 43 through the mounts 36 and 38, and the CPU 46A specifies the position of the focus ring 13 based on the detection result input from the rotary encoder 43.

The secondary storage device 80 and an external I/F 82 are connected to the busline 88. The secondary storage device 80 is a non-volatile memory such as a flash memory, an SSD, an HDD, or an EEPROM. The CPU 46A reads out and writes various types of information in the secondary storage device 80.

The external I/F 82 is a device including an FPGA. An external apparatus (not illustrated) such as a USB memory and a memory card is connected to the external I/F 82. The external I/F 82 exchanges various types of information between the CPU 46A and the external apparatus.

The CPU 46A stores output image data 70 (refer to FIG. 6) described later in the secondary storage device 80 and/or the external apparatus. The CPU 46A is an example of a "storage control portion" according to the embodiments of the technology of the present disclosure. In addition, the secondary storage device 80 and the external apparatus are an example of a "storage device" according to the embodiments of the technology of the present disclosure.

The UI system device 48 comprises the hybrid finder 16, the touch panel display 26, and a reception portion 84. The first display 32 and the touch panel 34 are connected to the busline 88. Accordingly, the CPU 46A displays various types of information on the first display 32 and operates in accordance with various instructions received by the touch panel 34.

The reception portion 84 comprises the touch panel 34 and a hard key portion 25. The hard key portion 25 includes a plurality of hard keys and includes a release button 20, a dial 22, and an instruction key 28. The hard key portion 25 is connected to the busline 88, and the CPU 46A operates in accordance with various instructions received by the hard key portion 25.

The hybrid finder 16 comprises the second display 86. The CPU 46A displays various types of information on the second display 86.

Figure 4:
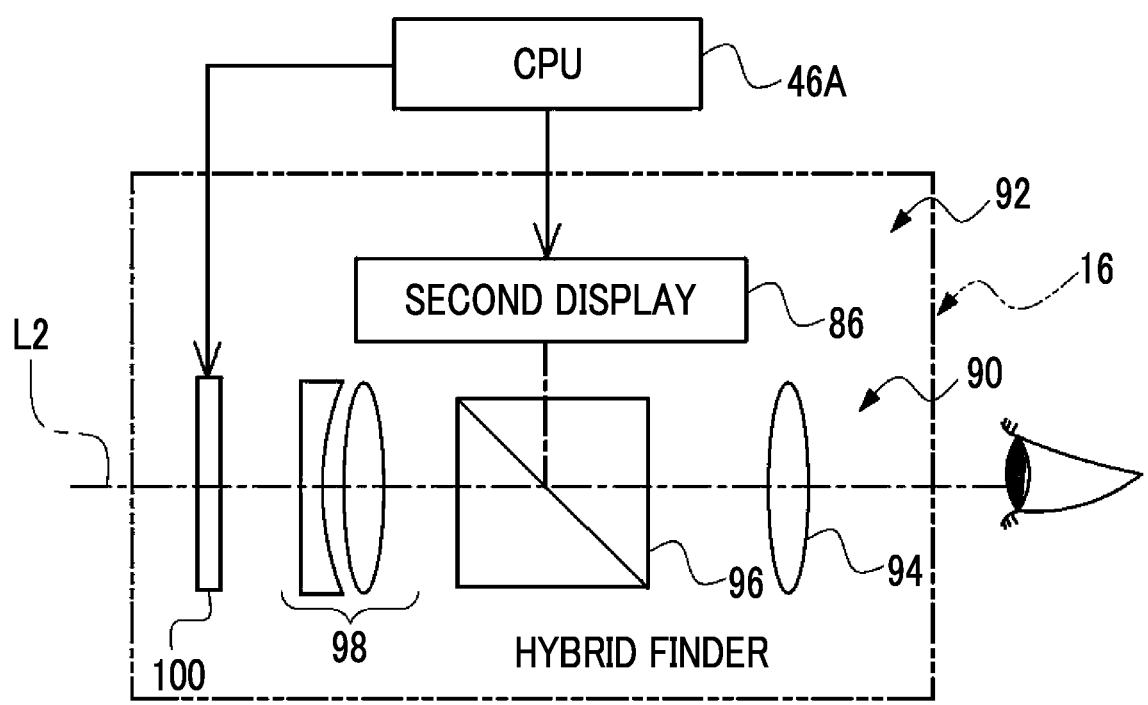
FIG. 4 is a schematic configuration diagram illustrating an example of a configuration of a hybrid finder included in the imaging apparatus according to the first to sixth embodiments.

As illustrated in FIG. 4 as an example, the hybrid finder 16 includes an OVF 90 and an EVF 92. The OVF 90 is a reverse Galilean finder and includes an eyepiece lens 94, a prism 96, and an objective lens 98. The EVF 92 includes the second display 86, the prism 96, and the eyepiece lens 94.

A liquid crystal shutter 100 is arranged closer to the subject side than the objective lens 98 along an optical axis L2 of the objective lens 98. The liquid crystal shutter 100 blocks light such that the optical image is not incident on the objective lens 98 in a case of using the EVF 92.

The prism 96 reflects and guides the electronic image or various types of information displayed on the second display 86 to the eyepiece lens 94 and combines the optical image with the electronic image and/or the various types of information displayed on the second display 86. A live view image is illustrated as an example of the electronic image displayed on the second display 86.

In a case of an OVF mode, the CPU 46A enables the optical image to be visually recognized from the eyepiece lens 94 by controlling the liquid crystal shutter 100 to a non-light blocking state. In addition, in a case of an EVF mode, the CPU 46A enables only the electronic image displayed on the second display 86 to be visually recognized from the eyepiece lens 94 by controlling the liquid crystal shutter 100 to a light blocking state.

Hereinafter, for convenience of description, the first display 32 (refer to FIG. 3) and the second display 86 will be referred to as the "display" without a reference sign unless otherwise necessary to distinguish therebetween. The display is an example of a "display portion" according to the embodiments of the technology of the present disclosure. In addition, the CPU 46A is an example of a "display control portion" according to the embodiments of the technology of the present disclosure.

Figure 5:
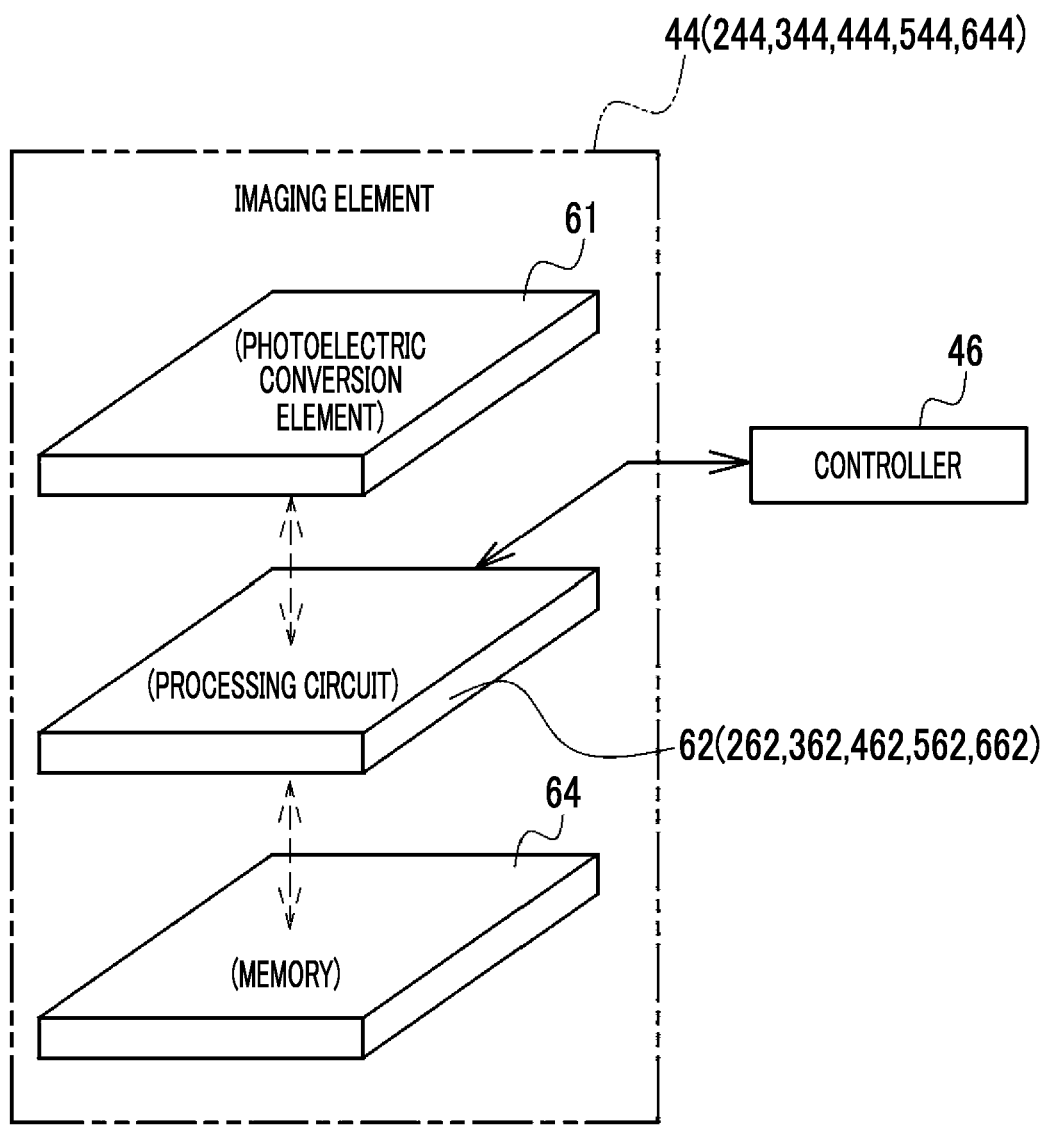
FIG. 5 is a schematic configuration diagram illustrating an example of a laminated structure of an imaging element included in the imaging apparatus according to the first to sixth embodiments.

As illustrated in FIG. 5 as an example, the imaging element 44 incorporates a photoelectric conversion element 61, a processing circuit 62, and a memory 64. In the imaging element 44, the photoelectric conversion element 61 is laminated with the processing circuit 62 and the memory 64. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity. The memory 64 is an example of a "storage portion" according to the embodiments of the technology of the present disclosure.

The processing circuit 62 is, for example, an LSI, and the memory 64 is, for example, a DRAM. However, the technology of the present disclosure is not limited thereto, and an SRAM may be employed as the memory 64 instead of the DRAM.

The processing circuit 62 is implemented by an ASIC and an FPGA and exchanges various types of information with the controller 46. While an example of implementing the processing circuit 62 by the ASIC and the FPGA is illustrated here, the technology of the present disclosure is not limited thereto. For example, the processing circuit 62 may be implemented by only an ASIC, a PLD, or an FPGA or may be implemented by a combination of the ASIC and the PLD or a combination of the PLD and the FPGA among the ASIC, the PLD, and the FPGA. In addition, a computer including a CPU, a ROM, and a RAM may be employed. The number of CPUs may be singular or plural. In addition, the processing circuit 62 may be implemented by a combination of a hardware configuration and a software configuration.

The photoelectric conversion element 61 includes a plurality of photodiodes arranged in a matrix form. Photodiodes of "4896×3265" pixels are illustrated as an example of the plurality of photodiodes.

The photoelectric conversion element 61 comprises color filters, and the color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with a predetermined periodicity in each of a row direction (horizontal direction) and a column direction (vertical direction) for the plurality of photodiodes of the photoelectric conversion element 61. Thus, the imaging apparatus 10 can perform processing in accordance with a repeating pattern in a case of performing demosaicing and the like on R, G, and B signals. The demosaicing refers to processing of calculating every color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

The imaging element 44 has a so-called electronic shutter function and controls an electric charge accumulation time period of each photodiode in the photoelectric conversion element 61 by performing the electronic shutter function under control of the controller 46. The electric charge accumulation time period refers to a so-called shutter speed.

In the imaging apparatus 10, the imaging for the still picture image and the imaging for the motion picture image are performed using a rolling shutter method. The imaging for the still picture image is implemented by performing the electronic shutter function and operating the mechanical shutter 42 (refer to FIG. 3). The imaging for the live view image is implemented by performing the electronic shutter function without operating the mechanical shutter 42. While the rolling shutter method is illustrated here, the technology of the present disclosure is not limited thereto. A global shutter method may be applied instead of the rolling shutter method.

As illustrated in FIG. 6 as an example, the processing circuit 62 includes a reading circuit 62A, a digital processing circuit 62B, an image processing circuit 62C, an output circuit 62D, and a control circuit 62E. The reading circuit 62A, the digital processing circuit 62B, the image processing circuit 62C, and the control circuit 62E are implemented by ASICs, and the output circuit 62D is implemented by an FPGA. The image processing circuit 62C is an example of a "processing portion" according to the embodiments of the technology of the present disclosure, and the output circuit 62D is an example of an "output portion" according to the embodiments of the technology of the present disclosure.

The control circuit 62E is connected to the controller 46. Specifically, the control circuit 62E is connected to the control I/F 46D (refer to FIG. 3) of the controller 46 and controls the entire imaging element 44 in accordance with an instruction of the CPU 46A (refer to FIG. 3).

The reading circuit 62A is connected to the photoelectric conversion element 61, the digital processing circuit 62B, and the control circuit 62E. The memory 64 is connected to the digital processing circuit 62B, the image processing circuit 62C, and the control circuit 62E. The image processing circuit 62C is connected to the output circuit 62D, the control circuit 62E, and the memory 64.

The output circuit 62D is connected to the control circuit 62E and the controller 46. Specifically, the output circuit 62D is connected to the input I/F 46E (refer to FIG. 3) of the controller 46.

The reading circuit 62A reads out analog captured image data 69A that is signal electric charges accumulated in the photoelectric conversion element 61, from the photoelectric conversion element 61 under control of the control circuit 62E. Specifically, the reading circuit 62A reads out the captured image data 69A for each frame in accordance with a vertical synchronization signal input from the control circuit 62E. In addition, the reading circuit 62A reads out the captured image data 69A for each row in accordance with a horizontal synchronization signal input from the control circuit 62E within a reading period of one frame.

The digital processing circuit 62B digitizes the analog captured image data 69A by performing signal processing of correlative double sampling processing and then, A/D conversion on the analog captured image data 69A read out by the reading circuit 62A. The digital processing circuit 62B stores captured image data 69B obtained by digitizing the captured image data 69A in the memory 64. Hereinafter, the captured image data 69A and 69B will be referred to as "captured image data 69" unless otherwise necessary to distinguish therebetween.

The memory 64 is a memory that can store the captured image data 69B of a plurality of frames. The memory 64 has a storage region (not illustrated) in units of pixels. The captured image data 69B is stored in a corresponding storage region of the memory 64 in units of pixels by the digital processing circuit 62B.

The image processing circuit 62C performs processing using the captured image data 69B. Specifically, the image processing circuit 62C acquires the captured image data 69B from the memory 64 and performs various types of signal processing on the acquired captured image data 69B. The "various types of signal processing" here include not only well-known signal processing such as tone correction, white balance adjustment, sharpness adjustment, gamma correction, and gradation correction but also signal processing according to the embodiments of the technology of the present disclosure. As will be described in detail later, for example, the signal processing according to the embodiments of the technology of the present disclosure refers to signal processing performed by an image data acquisition portion 62C1, a difference image data generation portion 62C2, a binarized image data generation portion 62C3, and an output image data decision portion 62C4 illustrated in FIG. 8.

The image processing circuit 62C generates the output image data 70 by performing the various types of signal processing on the captured image data 69A and outputs the generated output image data 70 to the output circuit 62D.

The output circuit 62D outputs the output image data 70 based on the captured image data 69B, depending on a result of the various types of signal processing performed by the image processing circuit 62C. Specifically, the output circuit 62D outputs the output image data 70 input from the image processing circuit 62C to the controller 46.

In the imaging element 44, the subject is imaged at an imaging frame rate, and the output image data 70 is output to the controller 46 at an output frame rate. The imaging frame rate is an example of a "first frame rate" according to the embodiments of the technology of the present disclosure, and the output frame rate is an example of a "second frame rate" according to the embodiments of the technology of the present disclosure. The "imaging" here refers to processing from a start of exposure of one frame in the photoelectric conversion element 61 to storage of the captured image data 69B of one frame in the memory 64.

The imaging frame rate is a frame rate required for imaging performed in cooperation among the photoelectric conversion element 61, the reading circuit 62A, the digital processing circuit 62B, the control circuit 62E, and the memory 64. Meanwhile, the output frame rate is a frame rate that is the same as a frame rate used in a device in a rear stage of the imaging element 44.

The imaging frame rate and the output frame rate may have a relationship of "imaging frame rate≤output frame rate". For example, the imaging frame rate may be a frame rate at which imaging of eight frames is performed within a period T as illustrated in FIG. 7A, and the output frame rate may be a frame rate at which three frames are output within the period T as illustrated in FIG. 7B.

In the present embodiment, 240 frames per second (fps) is employed as the imaging frame rate, and 60 fps is employed as the output frame rate. However, the technology of the present disclosure is not limited thereto. For example, 300 fps may be employed as the imaging frame rate, and 120 fps may be employed as the output frame rate. Alternatively, the imaging frame rate and the output frame rate may be the same.

Figure 8:
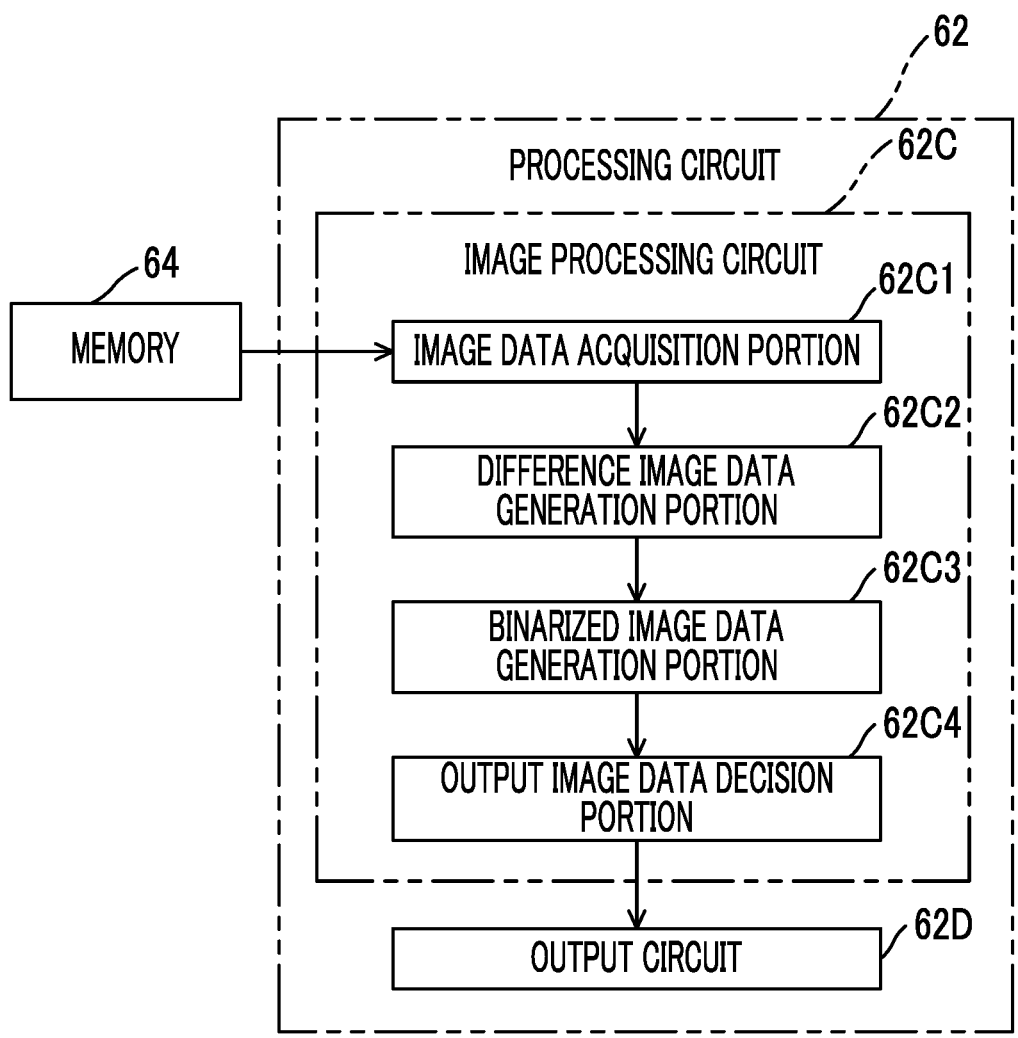
FIG. 8 is a block diagram illustrating an example of a configuration of a processing circuit included in the imaging element of the imaging apparatus according to the first embodiment.

As illustrated in FIG. 8 as an example, the image processing circuit 62C includes the image data acquisition portion 62C1, the difference image data generation portion 62C2, the binarized image data generation portion 62C3, and the output image data decision portion 62C4. The image data acquisition portion 62C1 is connected to the memory 64. The difference image data generation portion 62C2 is connected to the image data acquisition portion 62C1. The binarized image data generation portion 62C3 is connected to the difference image data generation portion 62C2. The output image data decision portion 62C4 is connected to the binarized image data generation portion 62C3. The output circuit 62D is connected to the output image data decision portion 62C4.

Figure 9:
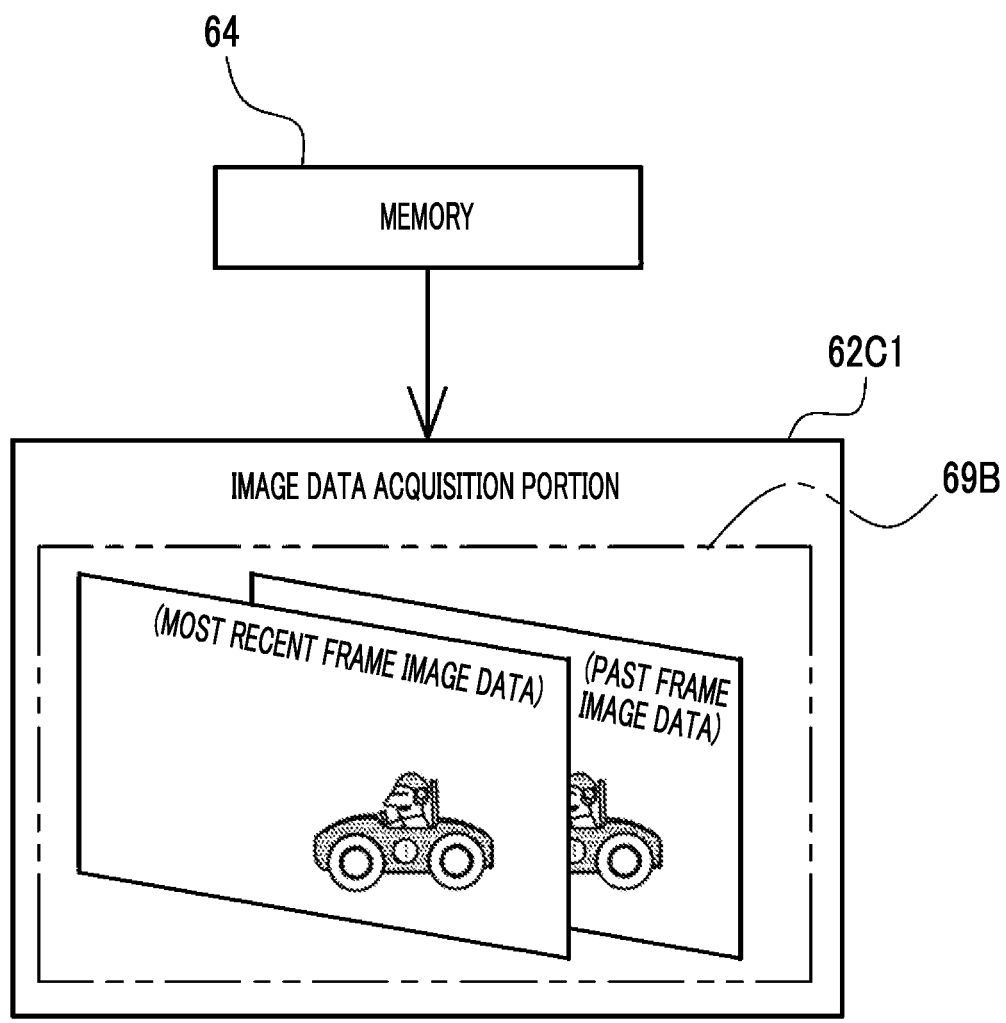
FIG. 9 is a conceptual diagram for describing an image data acquisition portion illustrated in FIG. 8.

As illustrated in FIG. 9 as an example, the image data acquisition portion 62C1 acquires the captured image data 69B from the memory 64. In the example illustrated in FIG. 9, an aspect of acquiring most recent frame image data and past frame image data as the captured image data 69B by the image data acquisition portion 62C1 is illustrated.

The memory 64 inputs and outputs the captured image data 69B using a FIFO method. The image data acquisition portion 62C1 sequentially acquires the captured image data 69B output from the memory 64. The image data acquisition portion 62C1 temporarily holds a pair of pieces of the captured image data 69B sequentially acquired from the memory 64. Out of the pair of pieces of captured image data 69B held by the image data acquisition portion 62C1, the most recent captured image data 69B acquired from the memory 64 is the most recent frame image data. In addition, out of the pair of pieces of captured image data 69B held by the image data acquisition portion 62C1, the captured image data 69B acquired from the memory 64 earlier than the most recent frame image data by one frame is the past frame image data.

Figure 10:
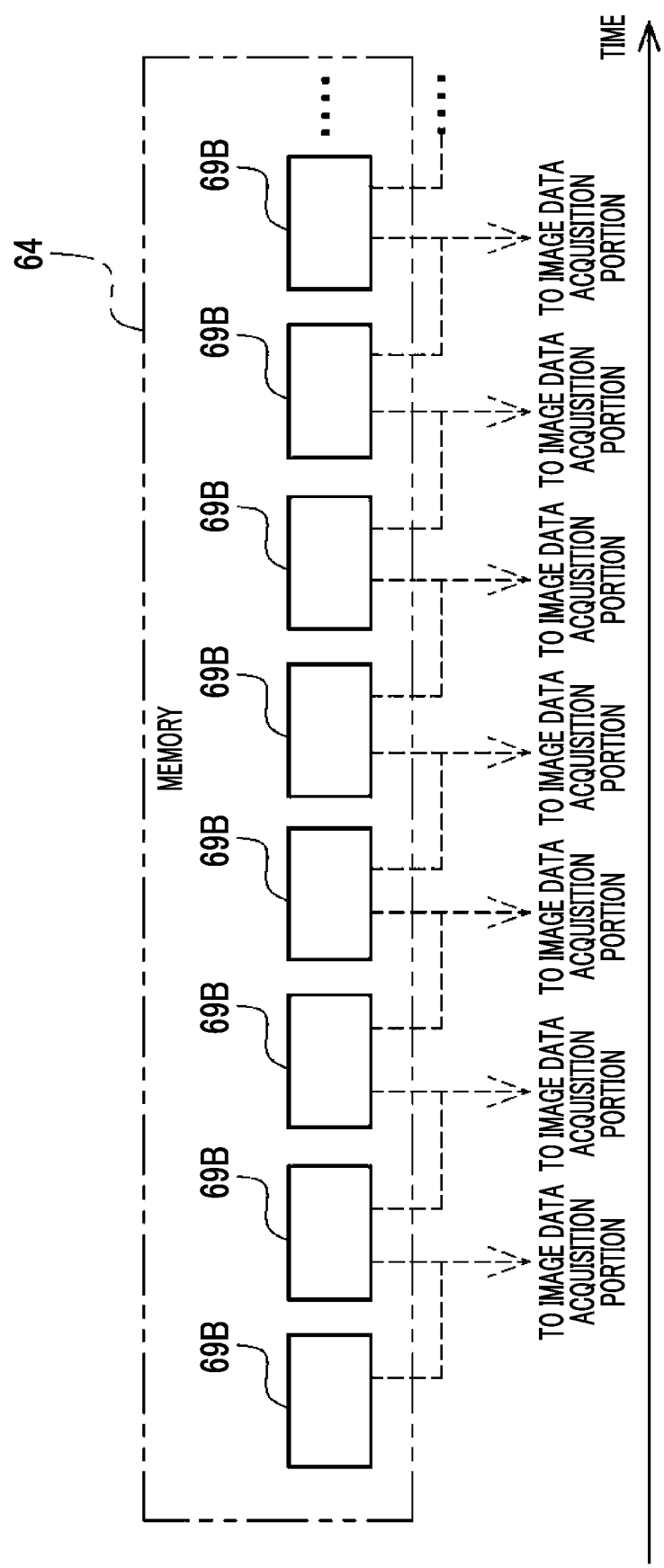
FIG. 10 is a conceptual diagram illustrating an example of an aspect of output of captured image data output to the image data acquisition portion from a memory illustrated in FIG. 8.

That is, as illustrated in FIG. 10 as an example, the captured image data 69B is input and output in the memory 64 using the FIFO method, and each time the captured image data 69B is stored in the memory 64, the image data acquisition portion 62C1 acquires the captured image data 69B output from the memory 64. The image data acquisition portion 62C1 temporarily holds the pair of pieces of captured image data 69B of which timings of acquisition from the memory 64 are adjacent.

In a case where new captured image data 69B is acquired from the memory 64, the image data acquisition portion 62C1 outputs the past frame image data. In addition, in a case where new captured image data 69B is acquired from the memory 64, the image data acquisition portion 62C1 holds the most recent frame image data as the past frame image data and holds the newly acquired captured image data 69B as the most recent frame image data. Each time the captured image data 69B is acquired from the memory 64 by the image data acquisition portion 62C1, the pair of pieces of captured image data 69B held by the image data acquisition portion 62C1 are updated.

Figure 11:
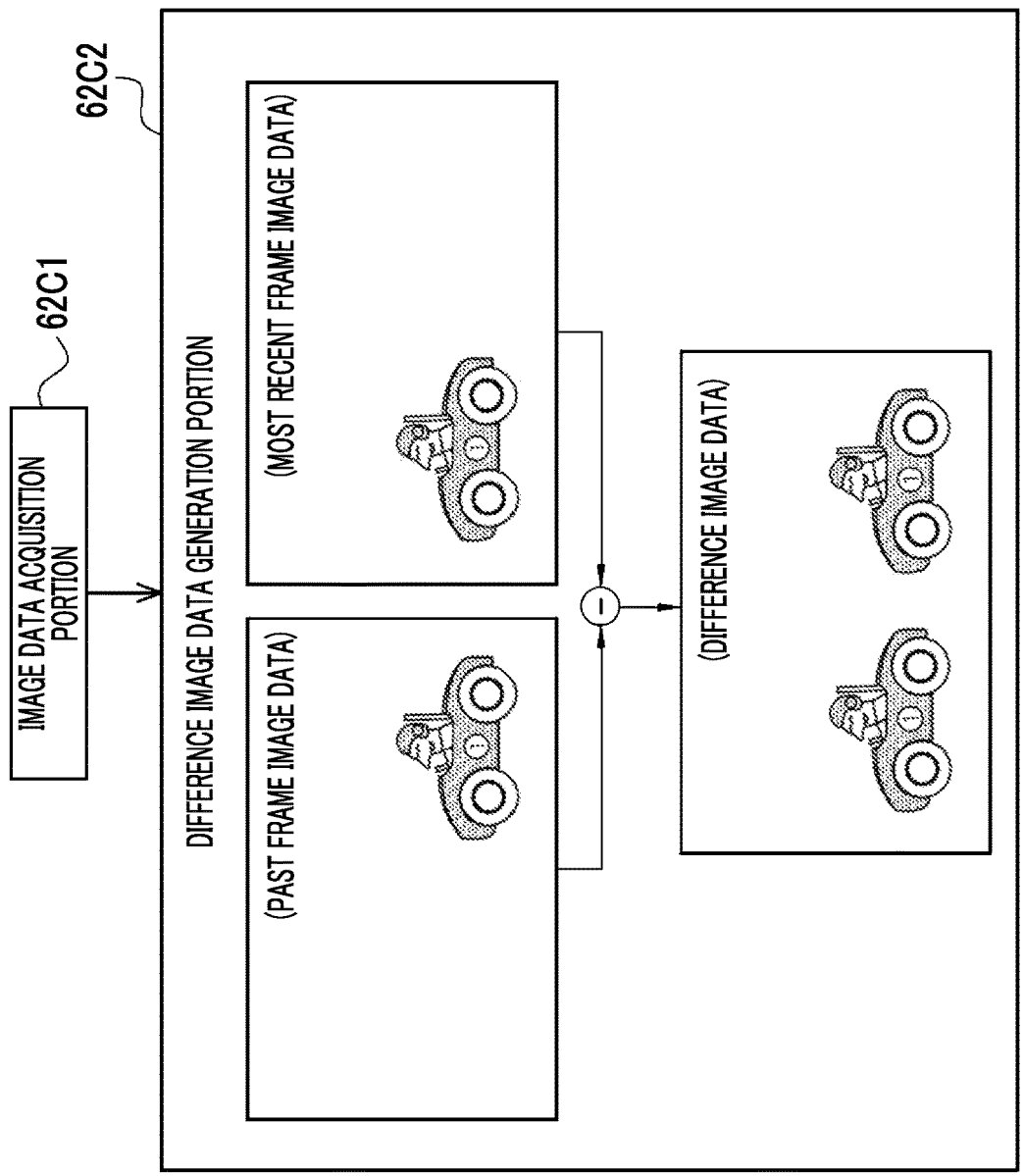
FIG. 11 is a conceptual diagram for describing a difference image data generation portion illustrated in FIG. 8.

As illustrated in FIG. 11 as an example, the captured image data 69B output from the image data acquisition portion 62C1 is input into the difference image data generation portion 62C2. The difference image data generation portion 62C2 acquires the captured image data 69B from the image data acquisition portion 62C1 and holds the captured image data 69B as the most recent frame image data and the past frame image data in the same manner as the image data acquisition portion 62C1. Furthermore, in a case where new captured image data 69B is acquired from the image data acquisition portion 62C1, the difference image data generation portion 62C2 updates the most recent frame image data and the past frame image data of a holding target in the same manner as the image data acquisition portion 62C1 and outputs the captured image data 69B held as the past frame image data to the binarized image data generation portion 62C3 (refer to FIG. 8 and FIG. 12).

The difference image data generation portion 62C2 calculates an absolute value (hereinafter, referred to as a "difference absolute value") of a difference between the currently held pair of pieces of captured image data 69B, that is, the most recent frame image data and the past frame image data, and generates difference image data based on the difference absolute value. Here, in a case where the past frame image data is denoted by $I_{past}(x, y)$, and the most recent frame image data is denoted by $I_{curr}(x, y)$, difference image data $I_{diff}(x, y)$ is calculated in accordance with Expression (1) below.

$$I_{diff}(x,y)=|I_{curr}(x,y)-I_{past}(x,y)| \quad (1)$$

Figure 12:
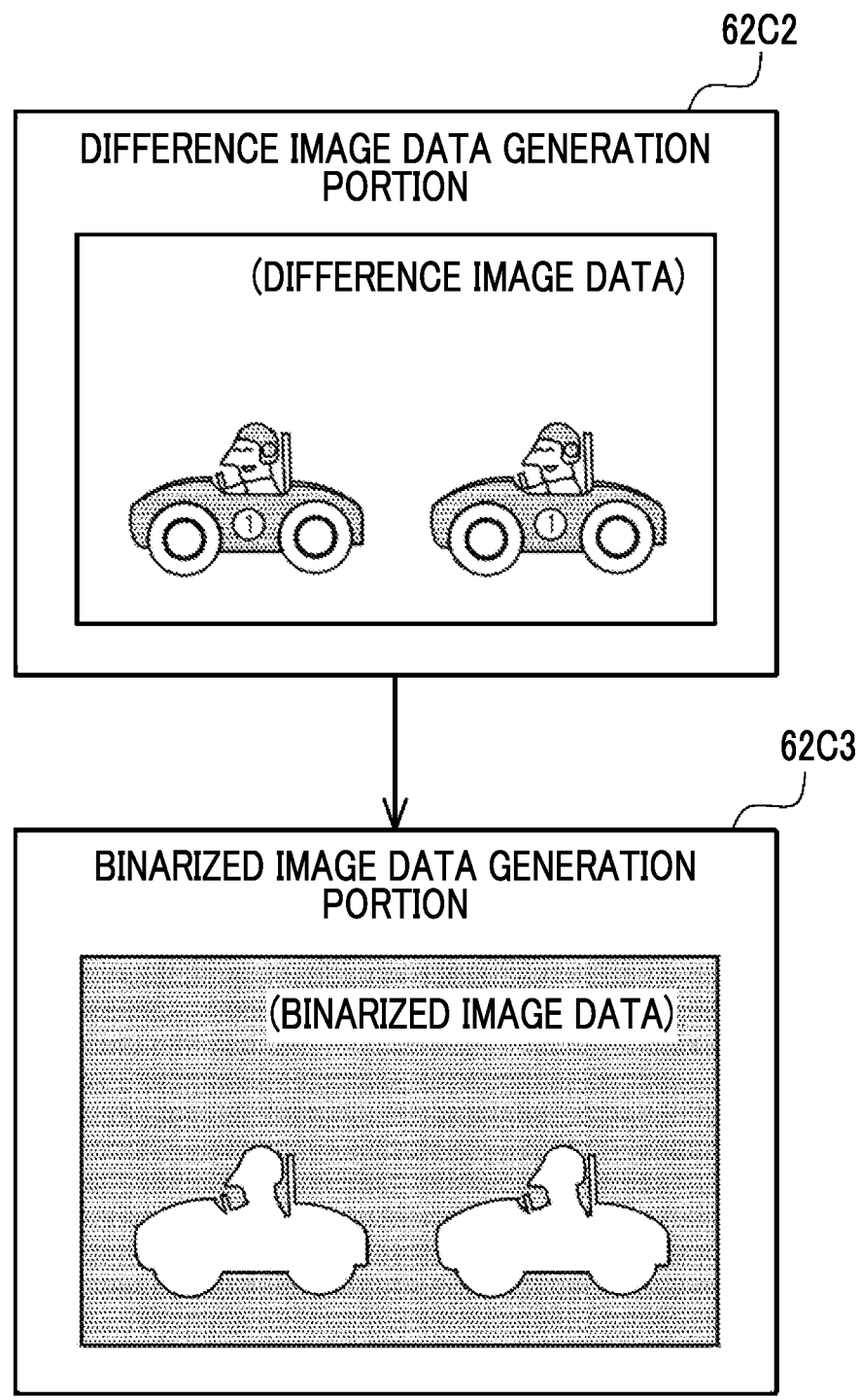
FIG. 12 is a conceptual diagram for describing the difference image data generation portion and a binarized image data generation portion illustrated in FIG. 8.

In a case where the difference image data $I_{diff}(x, y)$ is calculated, the difference image data generation portion 62C2 outputs the calculated difference image data $I_{diff}(x, y)$ to the binarized image data generation portion 62C3 (refer to FIG. 12).

As illustrated in FIG. 12 as an example, the binarized image data generation portion 62C3 acquires the difference image data from the difference image data generation portion 62C2 and generates binarized image data from the acquired difference image data. The binarized image data generation portion 62C3 binarizes the difference image data $I_{diff}(x, y)$. For example, the difference image data $I_{diff}(x, y)$ is converted into binarized image data $I_{bin}(x, y)$ in accordance with Expression (2) and Expression (3) below.

$$I_{bin}(x,y)=1(I_{diff}(x,y) \geq \text{threshold value } T1) \quad (2)$$

$$I_{bin}(x,y)=0(I_{diff}(x,y) < \text{threshold value } T1) \quad (3)$$

The captured image data 69B output from the difference image data generation portion 62C2 is input into the binarized image data generation portion 62C3. The binarized image data generation portion 62C3 acquires the captured image data 69B from the difference image data generation portion 62C2 and holds the captured image data 69B as the most recent frame image data and the past frame image data in the same manner as the image data acquisition portion 62C1. Furthermore, in a case where new captured image data 69B is acquired from the difference image data generation portion 62C2, the binarized image data generation portion 62C3 updates the most recent frame image data and the past frame image data of the holding target in the same manner as the image data acquisition portion 62C1 and outputs the captured image data 69B held as the past frame image data to the output image data decision portion 62C4 (refer to FIG. 8).

Figure 13:
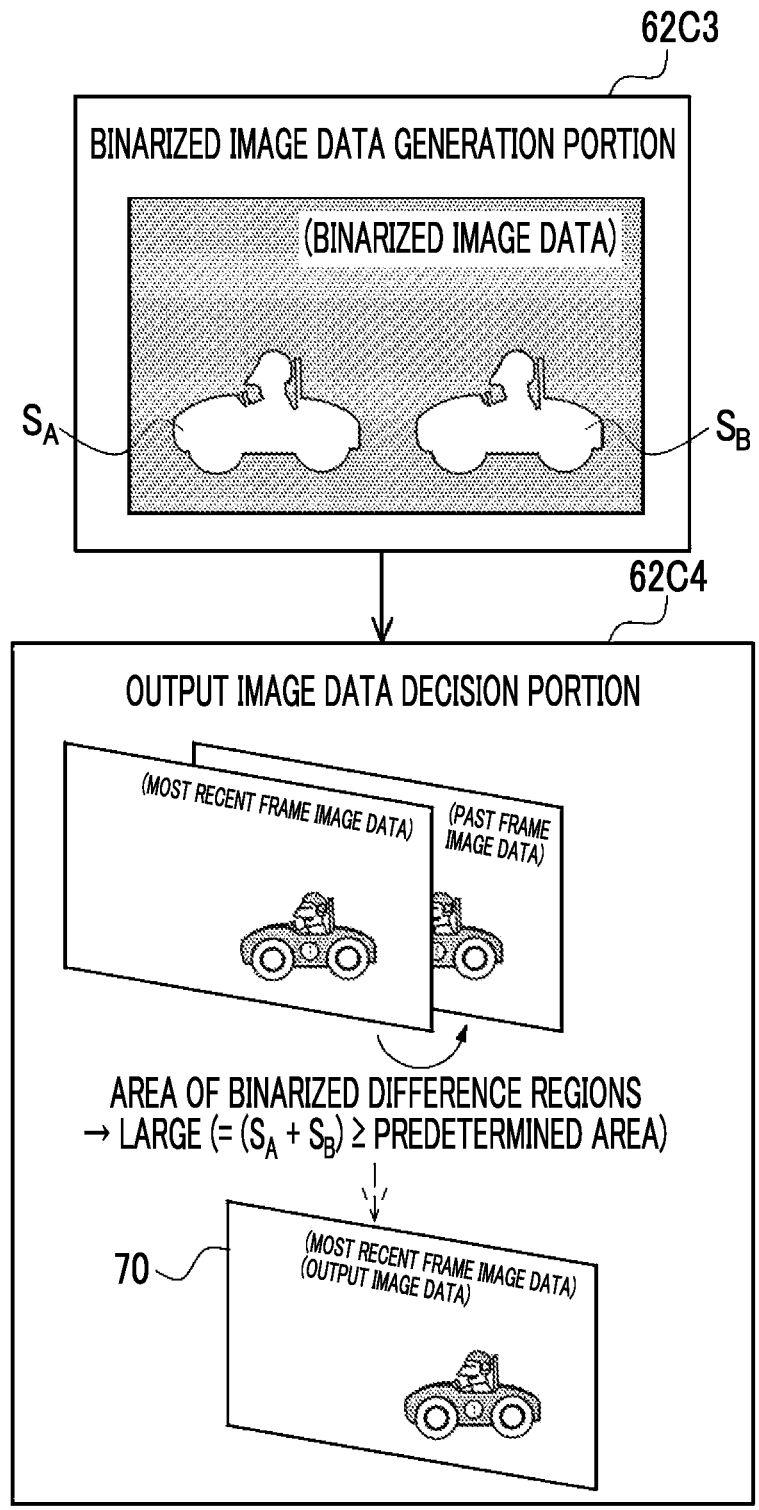
FIG. 13 is a conceptual diagram for describing the binarized image data generation portion and an output image data decision portion illustrated in FIG. 8.

In the example illustrated in FIG. 13, binarized difference regions $S_A$ and $S_B$ of "$I_{bin}(x, y)=1$" are included in the binarized image data. The output image data decision portion 62C4 calculates a total area ($=\Sigma I_{bin}(x, y)$) of the binarized difference region $S_A$ and the binarized difference region $S_B$ and determines whether or not the calculated total area is greater than or equal to a predetermined area. In a case where the calculated total area is greater than or equal to the predetermined area, the output image data decision portion 62C4 decides the most recent frame image data as the output image data 70 out of the most recent frame image data and the past frame image data that are used for generating the binarized image data including the binarized difference region $S_A$ and the binarized difference region $S_B$.

For example, the "predetermined area" is an area obtained from a result of a computer simulation and/or a sensory test using an actual apparatus, as an area of the binarized difference regions in a case where it is possible to visually recognize that the subject has a motion during imaging of two frames. In the first embodiment, an area of 20 percent of an area of the entire image indicated by the binarized image data is employed as the "predetermined area". The "predetermined area" may be a fixed value or a variable value that can be changed in accordance with an instruction received by the reception portion 84 (refer to FIG. 3). The "predetermined area" is an example of a "threshold value" according to the embodiments of the technology of the present disclosure. The total area of the binarized difference region $S_A$ and the binarized difference region $S_B$ is an example of a "degree of difference" according to the embodiments of the technology of the present disclosure. Hereinafter, for convenience of description, the total area of the binarized difference region $S_A$ and the binarized difference region $S_B$ will be simply referred to as the "area of the binarized difference regions".

Figure 14:
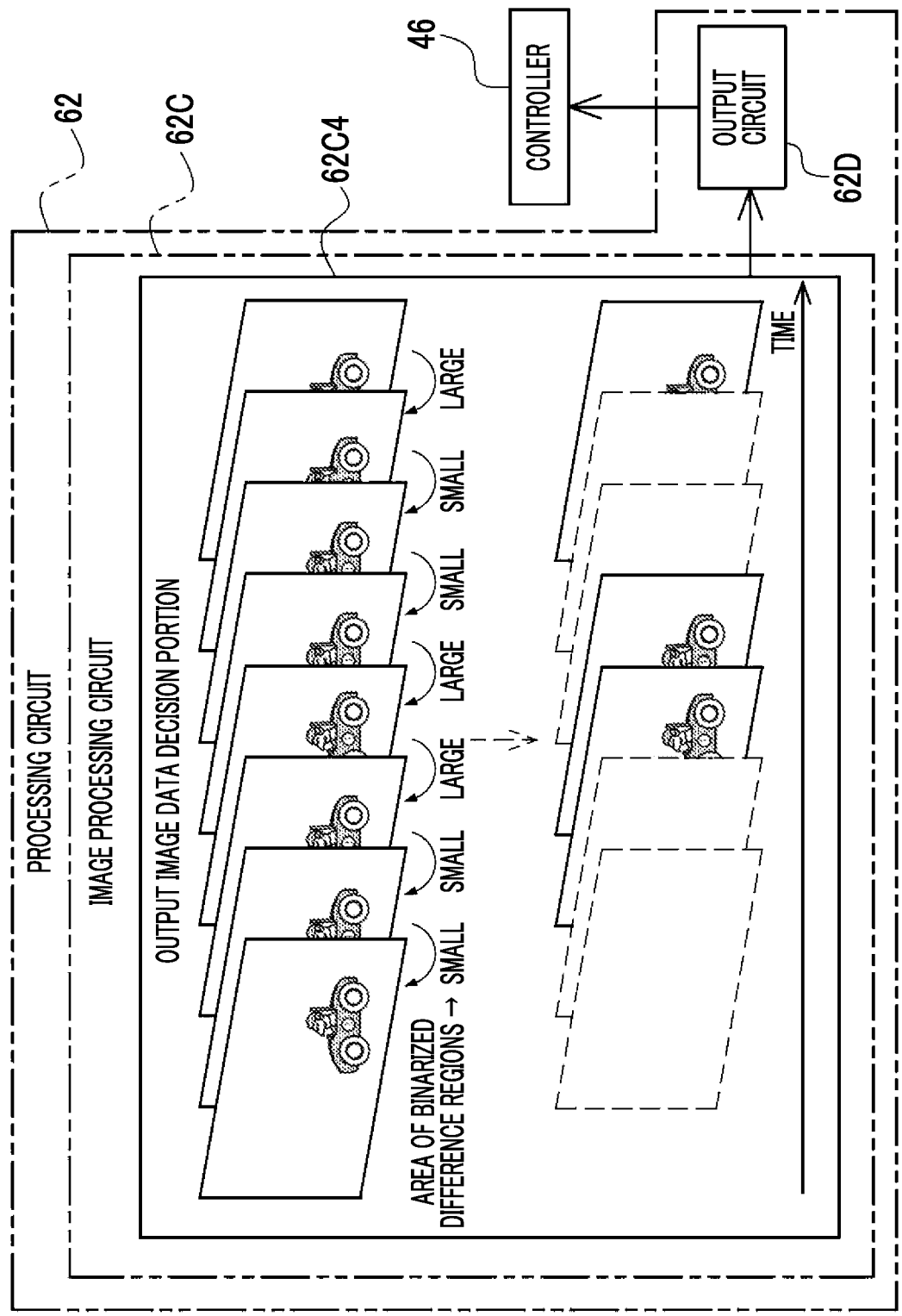
FIG. 14 is a conceptual diagram for describing the output image data decision portion illustrated in FIG. 8 and FIG. 13 in detail.

As illustrated in FIG. 14 as an example, each time the captured image data 69B is input from the binarized image data generation portion 62C3, the output image data decision portion 62C4 compares the total area of the binarized difference regions of the binarized image data corresponding to the input captured image data 69B with the predetermined area. The output image data decision portion 62C4 determines whether or not to output the input captured image data 69B to the output circuit 62D based on a comparison result. The output image data decision portion 62C4 sequentially outputs the output image data 70 decided as the captured image data 69B to be output to the output circuit 62D.

The output circuit 62D outputs image data at the output frame rate based on a processing result of the image processing circuit 62C. Specifically, the output circuit 62D outputs the output image data 70 based on the captured image data 69B at the output frame rate depending on the processing result obtained by processing the captured image data 69B by the image processing circuit 62C.

Next, an action of the imaging apparatus 10 will be described.

First, a flow of imaging processing executed by the processing circuit 62 of the imaging element 44 will be described with reference to FIG. 15.

In the imaging processing illustrated in FIG. 15, first, in step ST10, the reading circuit 62A determines whether or not a timing (hereinafter, referred to as an "exposure start timing") at which the photoelectric conversion element 61 starts the exposure is reached. The exposure start timing is a timing that is periodically defined by the imaging frame rate. In step ST10, in a case where the exposure start timing is not reached, a negative determination is made, and the imaging processing transitions to step ST30. In step ST10, in a case where the exposure start timing is reached, a positive determination is made, and the imaging processing transitions to step ST12.

In step ST12, the reading circuit 62A causes the photoelectric conversion element 61 to perform the exposure of one frame.

In subsequent step ST14, the reading circuit 62A reads out the captured image data 69A of one frame from the photoelectric conversion element 61.

In subsequent step ST16, the digital processing circuit 62B digitizes the captured image data 69A by performing signal processing of the correlative double sampling processing and then, the A/D conversion on the captured image data 69A read out in step ST14.

In subsequent step ST18, the digital processing circuit 62B stores captured image data 69B obtained by digitization in the memory 64. The captured image data 69B stored in the memory 64 is acquired by the image data acquisition portion 62C1.

In subsequent step ST20, the image data acquisition portion 62C1 determines whether or not the past frame image data is included. That is, the image data acquisition portion 62C1 determines whether or not the pair of pieces of captured image data 69B including the most recent frame image data and the past frame image data are held. In step ST20, in a case where the past frame image data is not included, a negative determination is made, and the imaging processing transitions to step ST30. In step ST20, in a case where the past frame image data is included, a positive determination is made, and the imaging processing transitions to step ST22.

In step ST22, first, the difference image data generation portion 62C2 calculates the difference absolute value of the most recent frame image data and the past frame image data acquired by the image data acquisition portion 62C1 and generates the difference image data from the calculated difference absolute value. Next, the binarized image data generation portion 62C3 generates the binarized image data by binarizing the difference image data. The output image data decision portion 62C4 calculates the binarized difference regions from the binarized image data value generated by the binarized image data generation portion 62C3.

In subsequent step ST24, the output image data decision portion 62C4 determines whether or not the area of the binarized difference regions is greater than or equal to the predetermined area. In step ST24, in a case where the area of the binarized difference regions is not greater than or equal to the predetermined area, a negative determination is made, and the imaging processing transitions to step ST30. In step ST24, in a case where the area of the binarized difference regions is greater than or equal to the predetermined area, a positive determination is made, and the imaging processing transitions to step ST26.

In step ST26, the output image data decision portion 62C4 decides the most recent frame image data as the output image data 70 out of the most recent frame image data and the past frame image data which are used for generating the binarized image data including the binarized difference regions.

In subsequent step ST28, the output circuit 62D outputs the output image data 70 decided in step ST26 to the controller 46.

The controller 46 displays the output image data 70 input from the output circuit 62D on the display as the live view image or the still picture image or stores the output image data 70 in the secondary storage device 80 and/or the memory card (not illustrated).

In step ST30, the control circuit 62E determines whether or not a condition (hereinafter, referred to as an "imaging processing finish condition") under which the imaging processing is finished is satisfied. For example, a condition that an instruction to finish the imaging processing is received by the reception portion 84 is illustrated as the imaging processing finish condition. In step ST30, in a case where the imaging processing finish condition is not satisfied, a negative determination is made, and the imaging processing transitions to step ST10. In step ST30, in a case where the imaging processing finish condition is satisfied, the imaging processing is finished.

As described above, the imaging element 44 comprises the memory 64, the image processing circuit 62C, and the memory 64. The memory 64 stores the captured image data 69B obtained by imaging the subject at the imaging frame rate. In the image processing circuit 62C, a degree of difference between the most recent frame image data and the past frame image data which are the pair of pieces of captured image data 69B is calculated.

In the first embodiment, the degree of difference refers to the area of the binarized difference regions. An increase in area of the binarized difference regions means an increase in motion of the subject. Thus, it is expected that the captured image data 69 obtained by imaging at this point is image data worth displaying or storing for the user. Conversely, a decrease in area of the binarized difference regions means a decrease in motion of the subject. Thus, it is expected that the captured image data 69 obtained by imaging at this point is image data not worth displaying or storing for the user.

Therefore, in the image processing circuit 62C, in a case where the area of the binarized difference regions is greater than or equal to the predetermined area, the most recent frame image data used for calculating the degree of difference is decided as the output image data 70. The output image data 70 is output to the controller 46 by the output circuit 62D. Accordingly, the power consumption required for outputting the image data can be reduced, compared to a case of outputting every image data obtained by imaging.

In addition, the imaging element 44 is an imaging element in which the photoelectric conversion element 61, the processing circuit 62, and the memory 64 are formed in one chip. Accordingly, portability of the imaging element 44 is increased, compared to an imaging element in which the photoelectric conversion element 61, the processing circuit 62, and the memory 64 are not formed in one chip. In addition, a degree of design freedom can be increased, compared to a case of the imaging element in which the photoelectric conversion element 61, the processing circuit 62, and the memory 64 are not formed in one chip. Furthermore, it is possible to contribute to size reduction of the imaging apparatus main body 12, compared to a case of the imaging element in which the photoelectric conversion element 61, the processing circuit 62, and the memory 64 are not formed in one chip.

In addition, as illustrated in FIG. 5, the laminated imaging element in which the photoelectric conversion element 61 is laminated with the memory 64 is employed as the imaging element 44. Accordingly, a transfer speed of the captured image data 69 from the photoelectric conversion element 61 to the memory 64 can be increased, compared to a case of not laminating the photoelectric conversion element 61 and the memory 64. Improving the transfer speed contributes to high-speed processing in the entire processing circuit 62. In addition, the degree of design freedom can be increased, compared to a case of not laminating the photoelectric conversion element 61 and the memory 64. Furthermore, it is possible to contribute to size reduction of the imaging apparatus main body 12, compared to a case of not laminating the photoelectric conversion element 61 and the memory 64.

In addition, in the imaging apparatus 10, the live view image or the like based on the output image data 70 is displayed on the second display 86. Accordingly, the user can visually recognize an image indicated by the output image data 70. In addition, the power consumption can be reduced, compared to a case of displaying every captured image data 69B obtained by imaging the subject on the display. In addition, the user can visually recognize only an image that is expected to be highly necessary for the user.

Furthermore, in the imaging apparatus 10, the output image data 70 is stored in the secondary storage device 80 and/or the memory card or the like. Accordingly, a storage capacity of the secondary storage device 80 and/or the memory card can be prolonged, compared to a case of storing every captured image data 69B obtained by imaging the subject in the secondary storage device 80 or the like.

Figure 16:
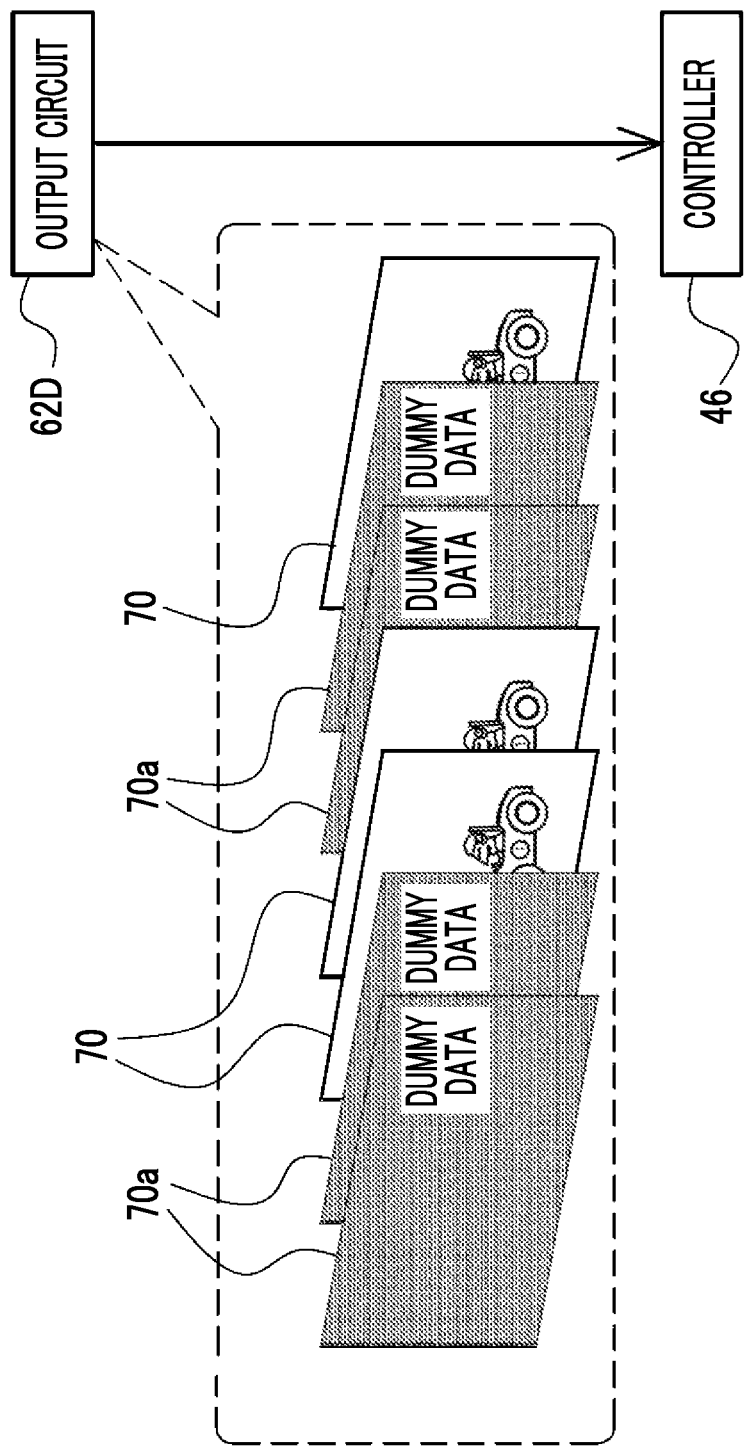
FIG. 16 is a conceptual diagram illustrating a modification example of image data output by an output circuit included in the processing circuit of the imaging apparatus according to the first embodiment.

While an example of a form in which the most recent frame image data not decided as the output image data 70 in step ST26 is not output to the controller 46 by the output circuit 62D is illustratively described in the first embodiment, the technology of the present disclosure is not limited thereto. For example, in a case where the area of the binarized difference regions is less than the predetermined area, as illustrated in FIG. 16, dummy data 70a may be output instead of the most recent frame image data out of the most recent frame image data and the past frame image data which are used for generating the binarized image data including the binarized difference regions. That is, the output circuit 62D may output the dummy data 70a to the controller 46 instead of the most recent frame image data not decided as the output image data 70 in step ST26 of the imaging processing. For example, image data having the same pixel value for all pixels is illustrated as the dummy data 70a. For example, the image data having the same pixel value for all pixels refers to image data in which pixel values for all pixels are "0".

Figure 17:
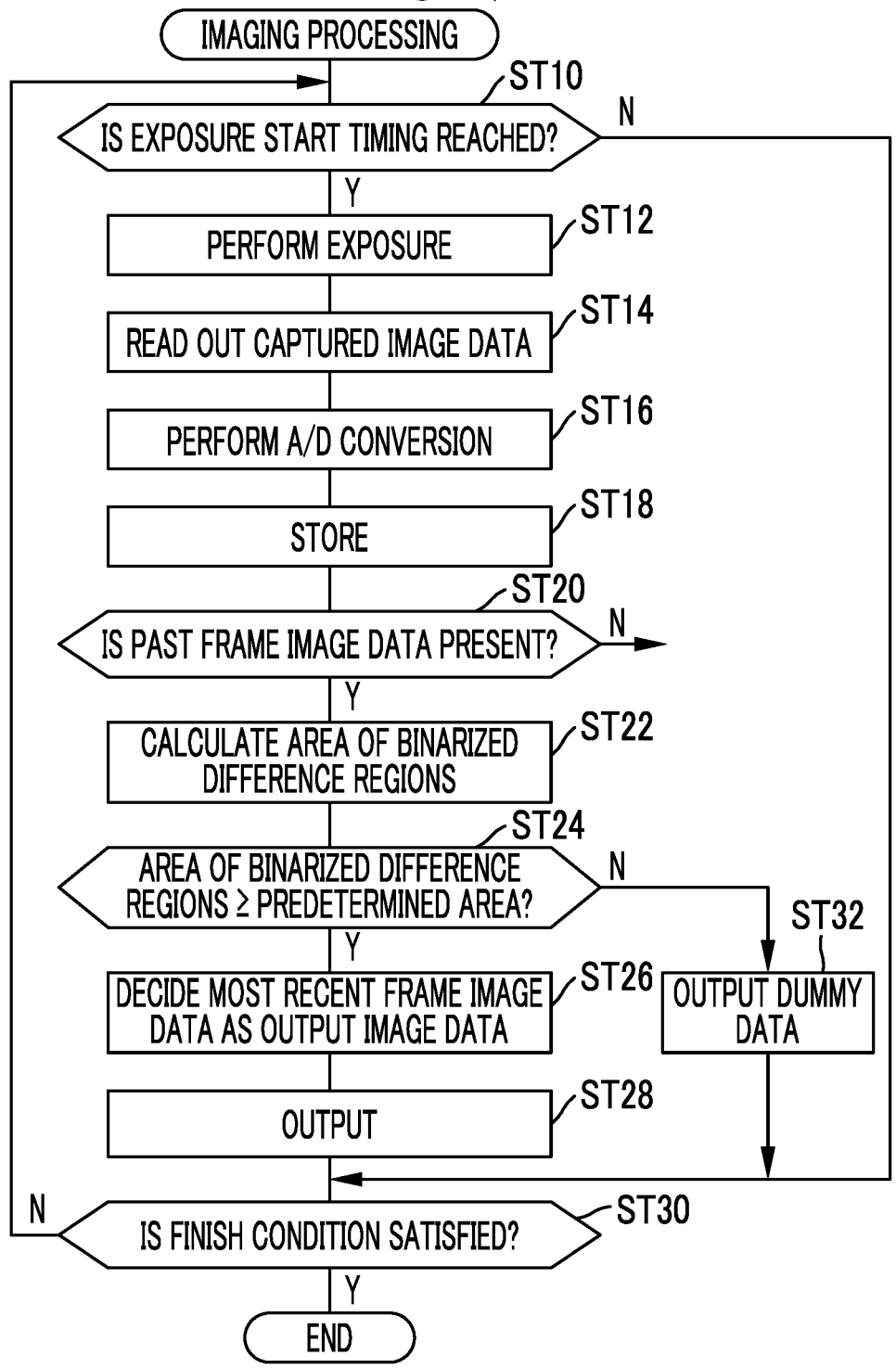
FIG. 17 is a flowchart illustrating a modification example of the flow of imaging processing according to the first embodiment.

In a case where the output circuit 62D outputs the dummy data 70a, imaging processing illustrated in FIG. 17 as an example is executed by the processing circuit 62. In the example illustrated in FIG. 17, in a case where a negative determination is made in step ST24 of the imaging processing, the imaging processing transitions to step ST32. In step ST32, the output circuit 62D outputs the dummy data 70a to the controller 46. Then, the imaging processing transitions to step ST30.

In a case where the area of the binarized difference regions is less than the predetermined area, the dummy data 70a is output to the controller 46 by the output circuit 62D. In a case where the area of the binarized difference regions is less than the predetermined area, it is expected that the captured image data 69 obtained by imaging at this point is image data not worth displaying or storing for the user. In this case, by outputting the dummy data 70a to the controller 46, a degree of change in data between the imaging element 44 and the controller 46, that is, a toggle rate of data, can be decreased, compared to a case of simply not outputting the image data. Consequently, the power consumption required for outputting the image data can be reduced, compared to an output of any captured image data 69 to the controller 46 in a case where the area of the binarized difference regions is less than the predetermined area. The dummy data 70a is an example of "first dummy data" according to the embodiments of the technology of the present disclosure.

In addition, while the area of the binarized difference regions in the first embodiment is illustrated as an example of the "degree of difference" according to the embodiments of the technology of the present disclosure, the technology of the present disclosure is not limited thereto. For example, an absolute value of a simple difference between the most recent frame image data and the past frame image data may be applied instead of the area of the binarized difference regions.

In addition, while the difference absolute value is illustrated in the first embodiment, the technology of the present disclosure is not limited thereto. A ratio of the most recent frame image data to the past frame image data may be used. For example, the ratio of the most recent frame image data to the past frame image data refers to "$I_{past}(x, y)/I_{curr}(x, y)$".

In addition, while a case of storing the pair of pieces of captured image data 69A in the memory 64 is described in the first embodiment, the technology of the present disclosure is not limited thereto. For example, the most recent frame image data that is a comparison target for the past frame image data may not be stored in the memory 64 and be directly output to the image processing circuit 62C from the digital processing circuit 62B. In this case, for example, the captured image data 69B is input into the memory 64 from the digital processing circuit 62B as the past frame image data for each frame. In the image processing circuit 62C, the degree of difference between the captured image data 69B input from the memory 64 as the past frame image data and the most recent frame image data directly input from the digital processing circuit 62B is calculated.

In addition, while an example of a form in which only the most recent frame image data is output by the output circuit 62D in a case where the area of the binarized difference regions is greater than or equal to the predetermined area is illustratively described in the first embodiment, the technology of the present disclosure is not limited thereto. For example, in a case where the area of the binarized difference regions is greater than or equal to the predetermined area, both of the most recent frame image data and the past frame image data may be output by the output circuit 62D.

In addition, while the past frame image data is the captured image data 69B earlier than the most recent frame image data by one frame in the first embodiment, the technology of the present disclosure is not limited thereto. For example, the past frame image data may be the captured image data 69B earlier than the most recent frame image data by two or more frames.

In addition, while the live view image or the like based on the output image data 70 is displayed on the second display 86 in the first embodiment, the technology of the present disclosure is not limited thereto. For example, the live view image or the like based on the output image data 70 may be displayed on the first display 32 or may be displayed on both of the first display 32 and the second display 86.

In addition, while an imaging element in which the photoelectric conversion element 61, the processing circuit 62, and the memory 64 are formed in one chip is illustrated as the imaging element 44 in the first embodiment, the technology of the present disclosure is not limited thereto. For example, at least the photoelectric conversion element 61 and the memory 64 among the photoelectric conversion element 61, the processing circuit 62, and the memory 64 may be formed in one chip.

Second Embodiment

An example of a form of generating the difference image data by targeting all pixels of the captured image data 69B of two frames is illustratively described in the first embodiment. A case of generating the difference image data from compressed image data of the captured image data 69B will be described in a second embodiment.

In the second embodiment, the same constituents as the first embodiment will be designated by the same reference signs and will not be described. Hereinafter, parts different from the first embodiment will be described.

As illustrated in FIG. 1 to FIG. 3 as an example, an imaging apparatus 200 according to the second embodiment is different from the imaging apparatus 10 described in the first embodiment in that an imaging apparatus main body 212 is included instead of the imaging apparatus main body 12. As illustrated in FIG. 3 as an example, the imaging apparatus main body 212 is different from the imaging apparatus main body 12 in that an imaging element 244 is included instead of the imaging element 44. As illustrated in FIG. 5 as an example, the imaging element 244 is different from the imaging element 44 in that a processing circuit 262 is included instead of the processing circuit 62.

As illustrated in FIG. 6 as an example, the processing circuit 262 is different from the processing circuit 62 in that an image processing circuit 262C is included instead of the image processing circuit 62C, and that an output circuit 262D is included instead of the output circuit 62D. The image processing circuit 262C is different from the image processing circuit 62C in that output image data 270 is generated based on the captured image data 69B instead of generating the output image data 70 based on the captured image data 69B. The output circuit 262D is different from the output circuit 62D in that the output image data 270 is output instead of the output image data 70.

Figure 18:
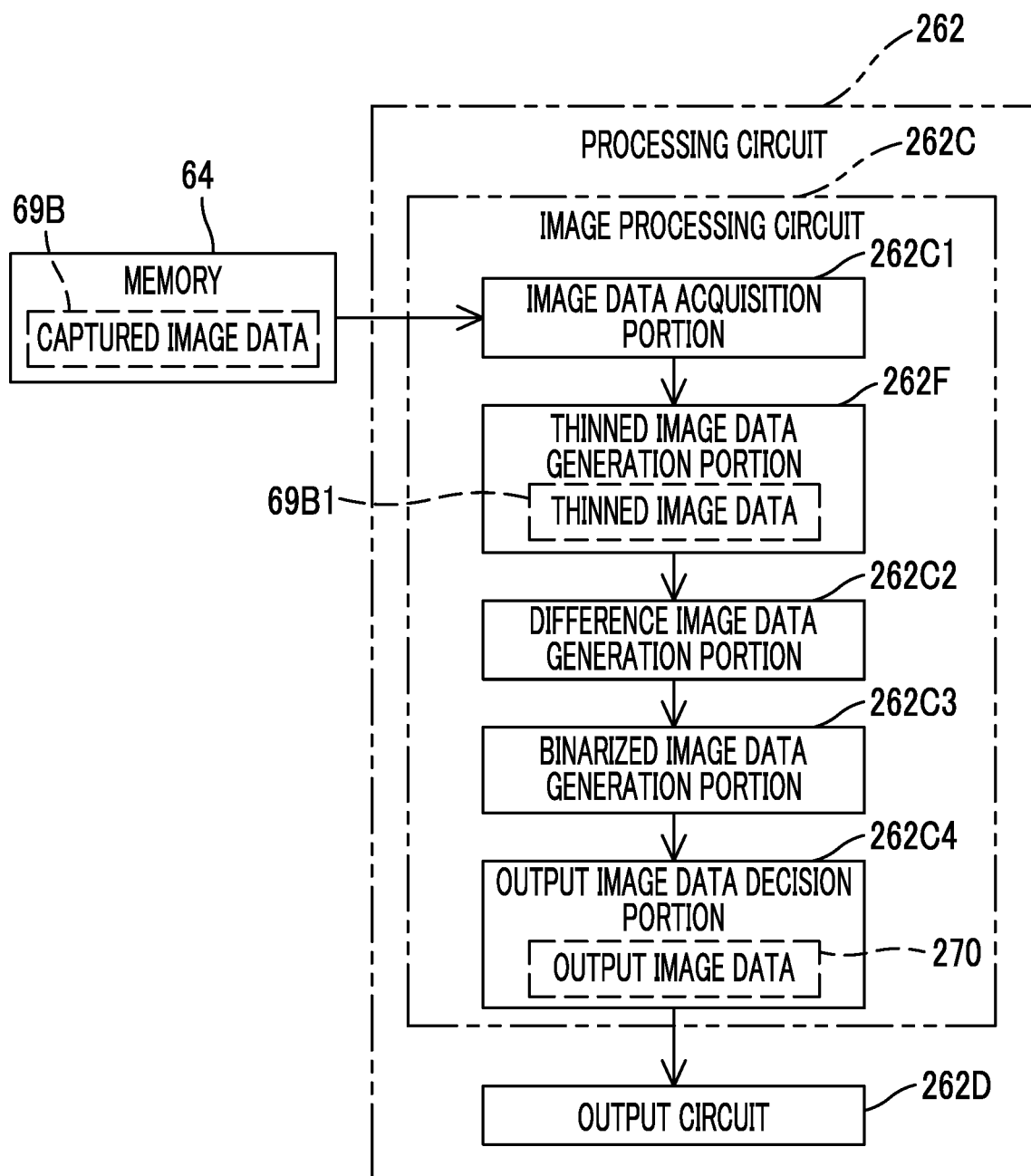
FIG. 18 is a block diagram illustrating an example of a configuration of a processing circuit included in the imaging element of the imaging apparatus according to the second embodiment.

As illustrated in FIG. 18 as an example, the image processing circuit 262C includes an image data acquisition portion 262C1, a thinned image data generation portion 262F, a difference image data generation portion 262C2, a binarized image data generation portion 262C3, and an output image data decision portion 262C4.

The image data acquisition portion 262C1 acquires the captured image data 69B from the memory 64 in the same manner as the image data acquisition portion 62C1 of the first embodiment. That is, the image data acquisition portion 262C1 acquires the most recent frame image data and the past frame image data from the memory 64 in the same manner as the image data acquisition portion 62C1 of the first embodiment.

The thinned image data generation portion 262F performs thinning processing on the captured image data 69B acquired by the image data acquisition portion 262C1. Specifically, the thinned image data generation portion 262F performs the thinning processing on each of the most recent frame image data and the past frame image data acquired by the image data acquisition portion 262C1. The thinning processing is processing of compressing the captured image data 69B by thinning out pixels from the captured image data 69B.

The difference image data generation portion 262C2 is different from the difference image data generation portion 62C2 described in the first embodiment in that the difference image data is generated from thinned image data 69B1 instead of the captured image data 69B.

The binarized image data generation portion 262C3 is different from the binarized image data generation portion 62C3 described in the first embodiment in that the binarized image data is generated from the difference image data generated by the difference image data generation portion 262C2 instead of the difference image data generated by the difference image data generation portion 62C2.

The output image data decision portion 262C4 is different from the output image data decision portion 62C4 described in the first embodiment in that the output image data 270 is generated based on the binarized image data generated by the binarized image data generation portion 262C3 instead of deciding the output image data 70 based on the binarized image data generated by the binarized image data generation portion 62C3. The output image data decision portion 262C4 outputs the output image data 270 to the output circuit 262D. The output image data 270 is different from the output image data 70 in that the output image data 270 is not the most recent frame image data of the captured image data 69B and is the most recent frame image data after the thinning processing.

Figure 19:
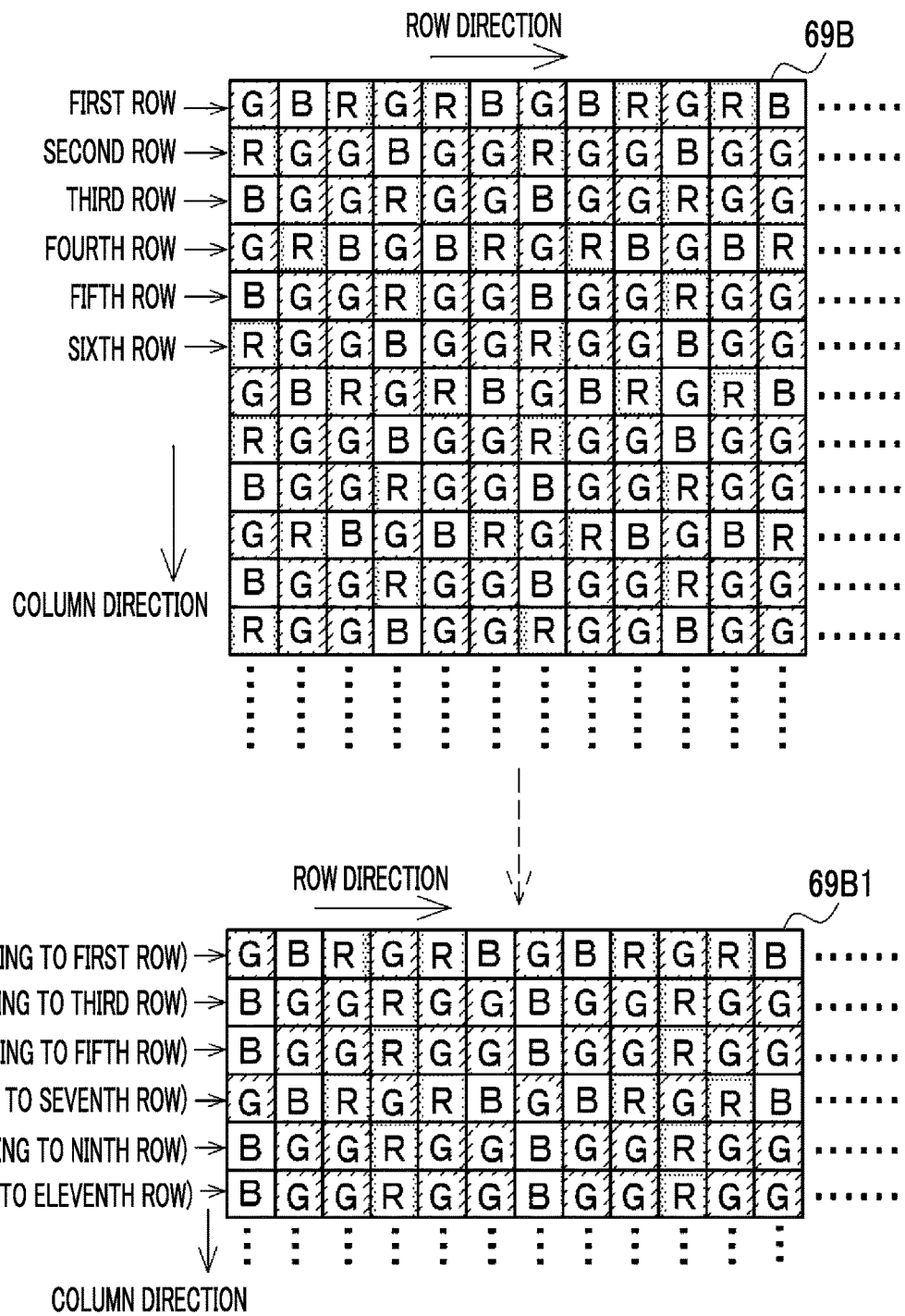
FIG. 19 is a conceptual diagram illustrating an example of a data structure of each of the captured image data obtained by imaging performed by the imaging element included in the imaging apparatus according to the second embodiment and thinned image data.

As illustrated in FIG. 19 as an example, the captured image data 69B is color image data including R pixels, G pixels, and B pixels. The captured image data 69B is image data in which a plurality of primary color pixels are periodically arranged. Specifically, in the captured image data 69B, the R pixels, the G pixels, and the B pixels are arranged with periodicity corresponding to X-Trans (registered trademark) arrangement.

In the example illustrated in FIG. 19, in a first row, the R pixels, the G pixels, and the B pixels are arranged in circulation in an order of the G pixel, the B pixel, the R pixel, the G pixel, and the B pixel in a row direction. In addition, in a second row, the R pixels, the G pixels, and the B pixels are arranged in circulation in an order of the R pixel, the G pixel, the G pixel, the B pixel, the G pixel, and the G pixel in the row direction. In addition, in a third row, the R pixels, the G pixels, and the B pixels are arranged in circulation in an order of the B pixel, the G pixel, the G pixel, the R pixel, the G pixel, and the G pixel in the row direction. In addition, in a fourth row, the R pixels, the G pixels, and the B pixels are arranged in circulation in an order of the G pixel, the R pixel, the B pixel, the G pixel, the B pixel, and the R pixel in the row direction. In addition, in a fifth row, the R pixels, the G pixels, and the B pixels are arranged in circulation in an order of the B pixel, the G pixel, the G pixel, the R pixel, the G pixel, and the G pixel in the row direction. Furthermore, in a sixth row, the R pixels, the G pixels, and the B pixels are arranged in circulation in an order of the R pixel, the G pixel, the G pixel, the B pixel, the G pixel, and the G pixel in the row direction. An arrangement pattern of the R pixels, the G pixels, and the B pixels of the entire captured image data 69B is formed by repetition of an arrangement pattern of the R pixels, the G pixels, and the B pixels of the first row to the sixth row in units of six rows in a column direction.

The thinned image data 69B1 is image data obtained by performing the thinning processing on the captured image data 69B in units of rows. Specifically, as illustrated in FIG. 19 as an example, the thinned image data 69B1 is image data indicating a vertically ½ thinned image obtained by thinning out pixels of lines of even-numbered rows in the column direction from a captured image indicated by the captured image data 69B. That is, pixels of each row of the vertically ½ thinned image are pixels corresponding to pixels of odd-numbered rows of the captured image.

Figure 20:
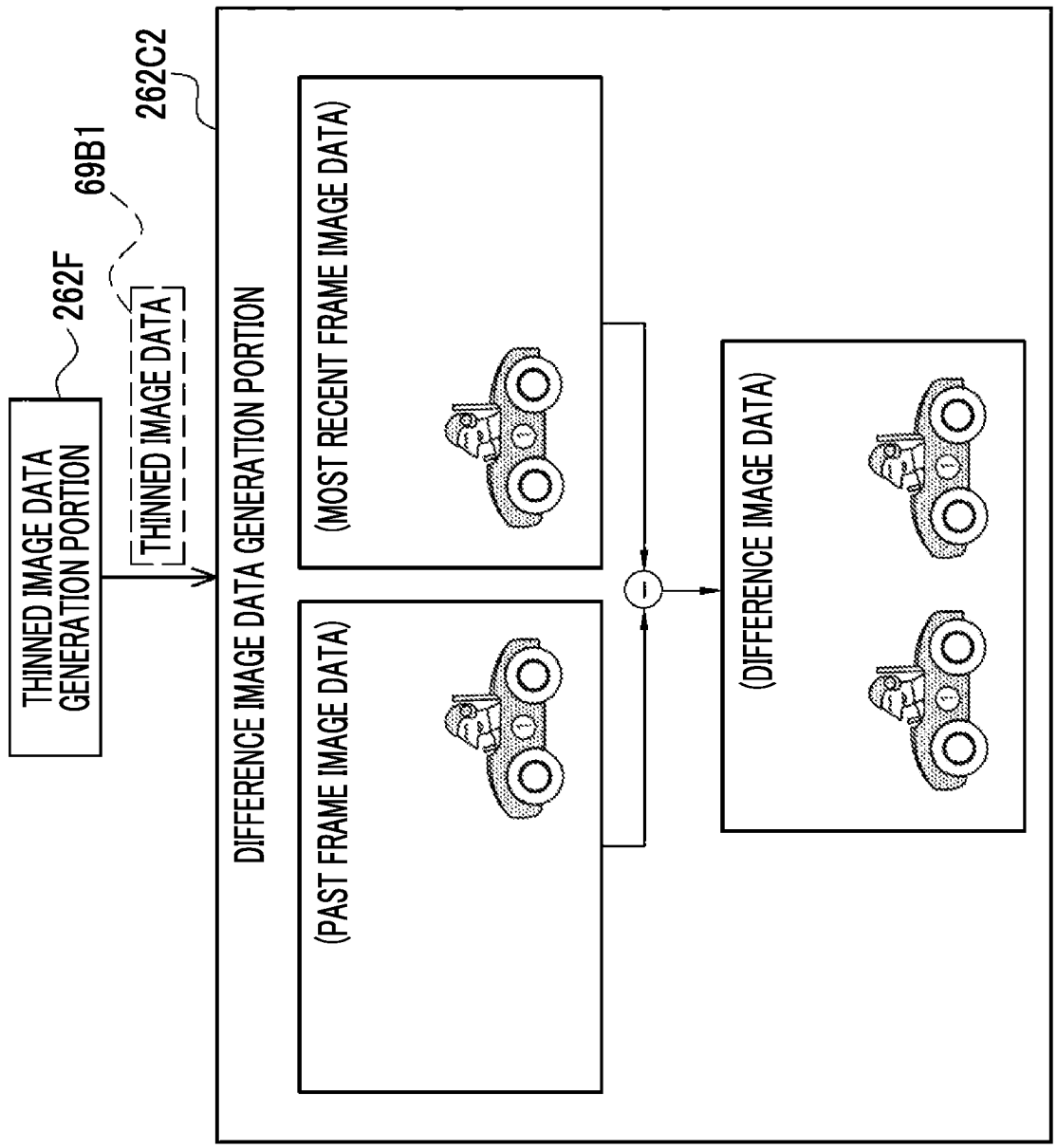
FIG. 20 is a conceptual diagram for describing a thinned image data generation portion and a difference image data generation portion illustrated in FIG. 18.

As illustrated in FIG. 20 as an example, the difference image data generation portion 262C2 acquires the thinned image data 69B1 from the thinned image data generation portion 262F. The thinned image data 69B1 is generated by performing the thinning processing on each of the most recent frame image data and the past frame image data in units of rows by the thinned image data generation portion 262F. That is, the thinned image data 69B1 includes the most recent frame image data after the thinning processing and the past frame image data after the thinning processing. The most recent frame image data after the thinning processing is an example of "first image data after thinning processing" according to the embodiments of the technology of the present disclosure. The past frame image data after the thinning processing is an example of "second image data after the thinning processing" according to the embodiments of the technology of the present disclosure.

The difference image data generation portion 262C2 generates the difference image data from the most recent frame image data after the thinning processing and the past frame image data after the thinning processing in the same manner as the difference image data generation portion 62C2 described in the first embodiment.

Next, an action of the imaging apparatus 200 will be described.

Figure 21:
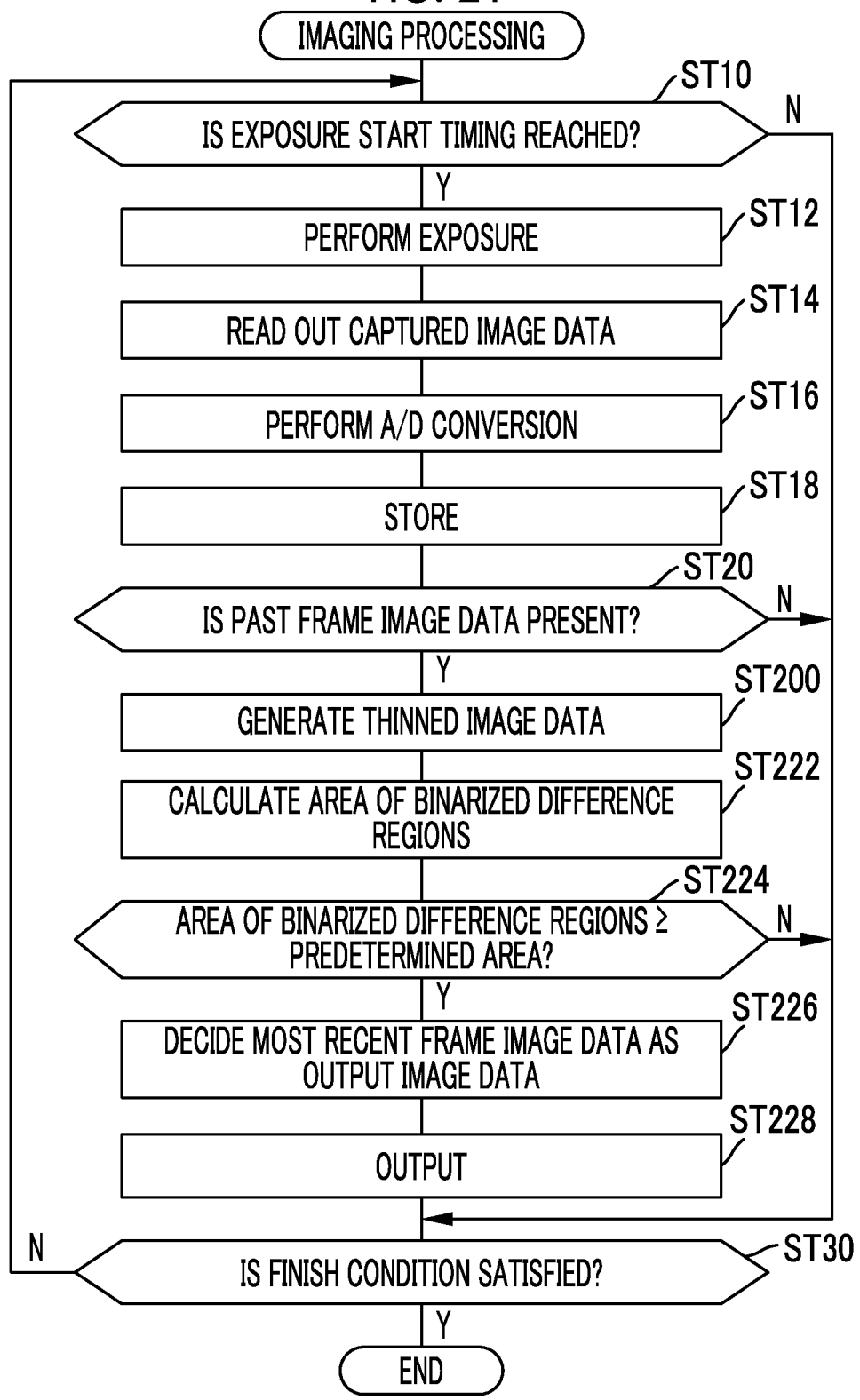
FIG. 21 is a flowchart illustrating an example of a flow of imaging processing according to the second embodiment.

First, a flow of imaging processing executed by the processing circuit 262 of the imaging element 244 will be described with reference to FIG. 21. The imaging processing illustrated in FIG. 21 is different from the imaging processing illustrated in FIG. 15 in that step ST200 is included. In addition, the imaging processing illustrated in FIG. 21 is different from the imaging processing illustrated in FIG. 15 in that step ST222 to step ST228 are included instead of step ST22 to step ST28. Thus, in a flowchart of the imaging processing illustrated in FIG. 21, the same steps as the imaging processing illustrated in FIG. 15 are designated by the same step numbers. Hereinafter, only parts of the imaging processing illustrated in FIG. 21 different from the imaging processing illustrated in FIG. 15 will be described.

In the imaging processing illustrated in FIG. 21, in a case where a positive determination is made in step ST20, the imaging processing transitions to step ST200. In step ST200, the thinned image data generation portion 262F generates the thinned image data 69B1 from the captured image data 69B as described above.

Figure 15:
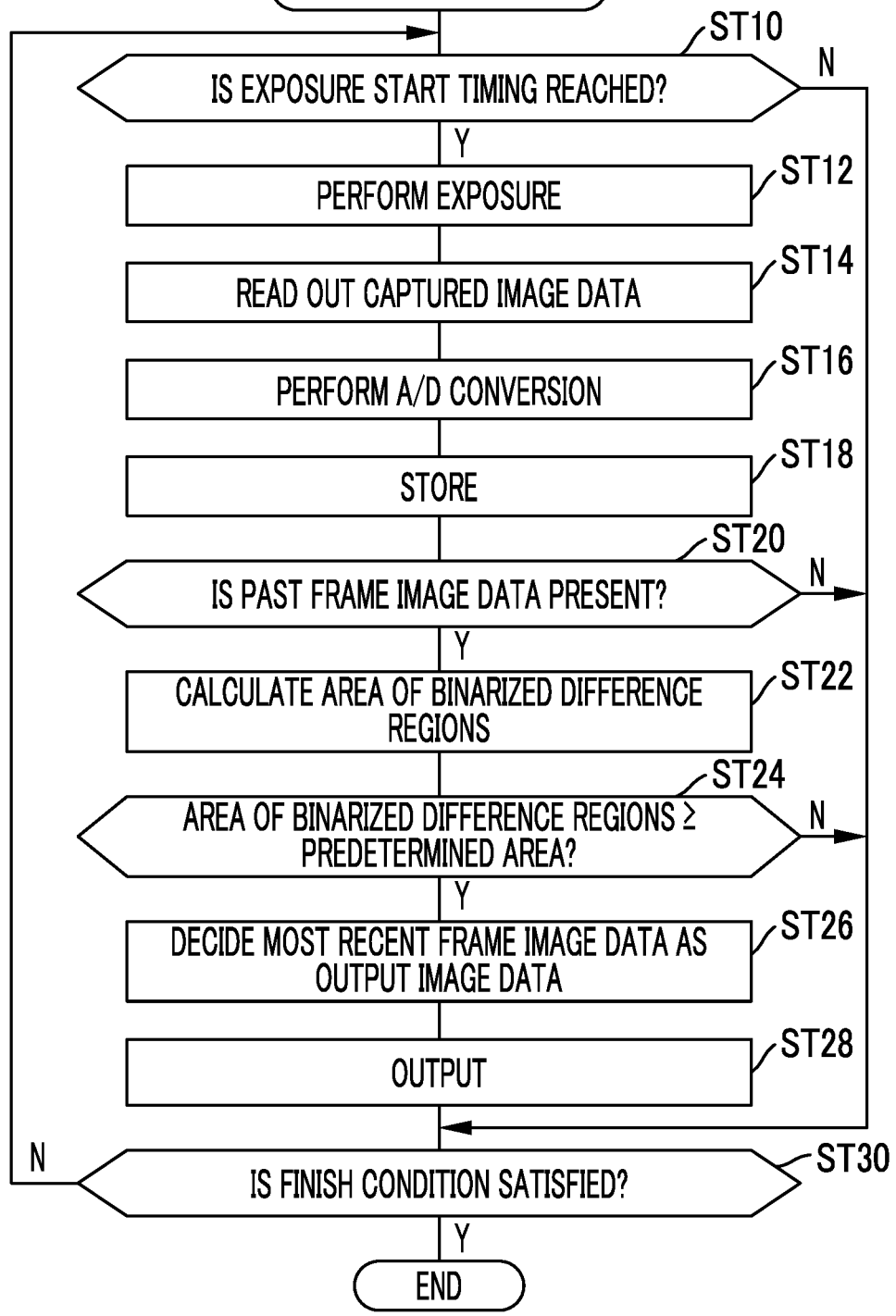
FIG. 15 is a flowchart illustrating an example of a flow of imaging processing according to the first embodiment.

Processing of step ST222 is different from processing of step ST22 illustrated in FIG. 15 in that the area of the binarized difference regions is calculated based on the thinned image data 69B1 instead of the captured image data 69B.

Processing of step ST224 is different from processing of step ST24 illustrated in FIG. 15 in that the area of the binarized difference regions calculated based on the thinned image data 69B is compared with the predetermined area instead of the area of the binarized difference regions calculated based on the captured image data 69B1.

Processing of step ST226 is different from processing of step ST26 illustrated in FIG. 15 in that the most recent frame image data after the thinning processing is output instead of the most recent frame image data of the captured image data 69B.

Processing of step ST228 is different from processing of step ST28 illustrated in FIG. 15 in that the output image data 270 is output instead of the output image data 70.

As described above, in the image processing circuit 262C, the difference image data and the binarized image data are generated based on the thinned image data 69B1 obtained by performing the thinning processing on the captured image data 69B, and the output image data 270 is decided. The thinned image data 69B1 has a smaller data amount than the captured image data 69B. Thus, a load exerted on processing in the image processing circuit 262C is reduced. In addition, the output image data 270 has a smaller data amount than the output image data 70. Thus, the power consumption required for outputting the image data can be reduced.

While the image data indicating the vertically ½ thinned image is illustrated as the thinned image data 69B1 in the second embodiment, the technology of the present disclosure is not limited thereto. For example, in a case where n denotes a natural number greater than or equal to 3, image data indicating a vertically 1/n thinned image may be applied as the thinned image data. In addition, image data indicating a horizontally thinned image that is thinned in units of columns may be applied as the thinned image data, or image data indicating an image that is thinned in units of rows and units of columns may be applied as the thinned image data.

Third Embodiment

An example of a form of decreasing the data amount by thinning out the captured image data 69B in units of rows is illustratively described in the second embodiment. An example of a form of decreasing the data amount using a method different from the second embodiment will be described in a third embodiment. In the third embodiment, the same constituents as the second embodiment will be designated by the same reference signs and will not be described. Hereinafter, parts different from the second embodiment will be described.

As illustrated in FIG. 1 to FIG. 3 as an example, an imaging apparatus 300 according to the third embodiment is different from the imaging apparatus 200 described in the second embodiment in that an imaging apparatus main body 312 is included instead of the imaging apparatus main body 212. As illustrated in FIG. 3 as an example, the imaging apparatus main body 312 is different from the imaging apparatus main body 212 in that an imaging element 344 is included instead of the imaging element 244. As illustrated in FIG. 5 as an example, the imaging element 344 is different from the imaging element 244 in that a processing circuit 362 is included instead of the processing circuit 262.

As illustrated in FIG. 6 as an example, the processing circuit 362 is different from the processing circuit 262 in that an image processing circuit 362C is included instead of the image processing circuit 262C, and that an output circuit 362D is included instead of the output circuit 262D.

Figure 22:
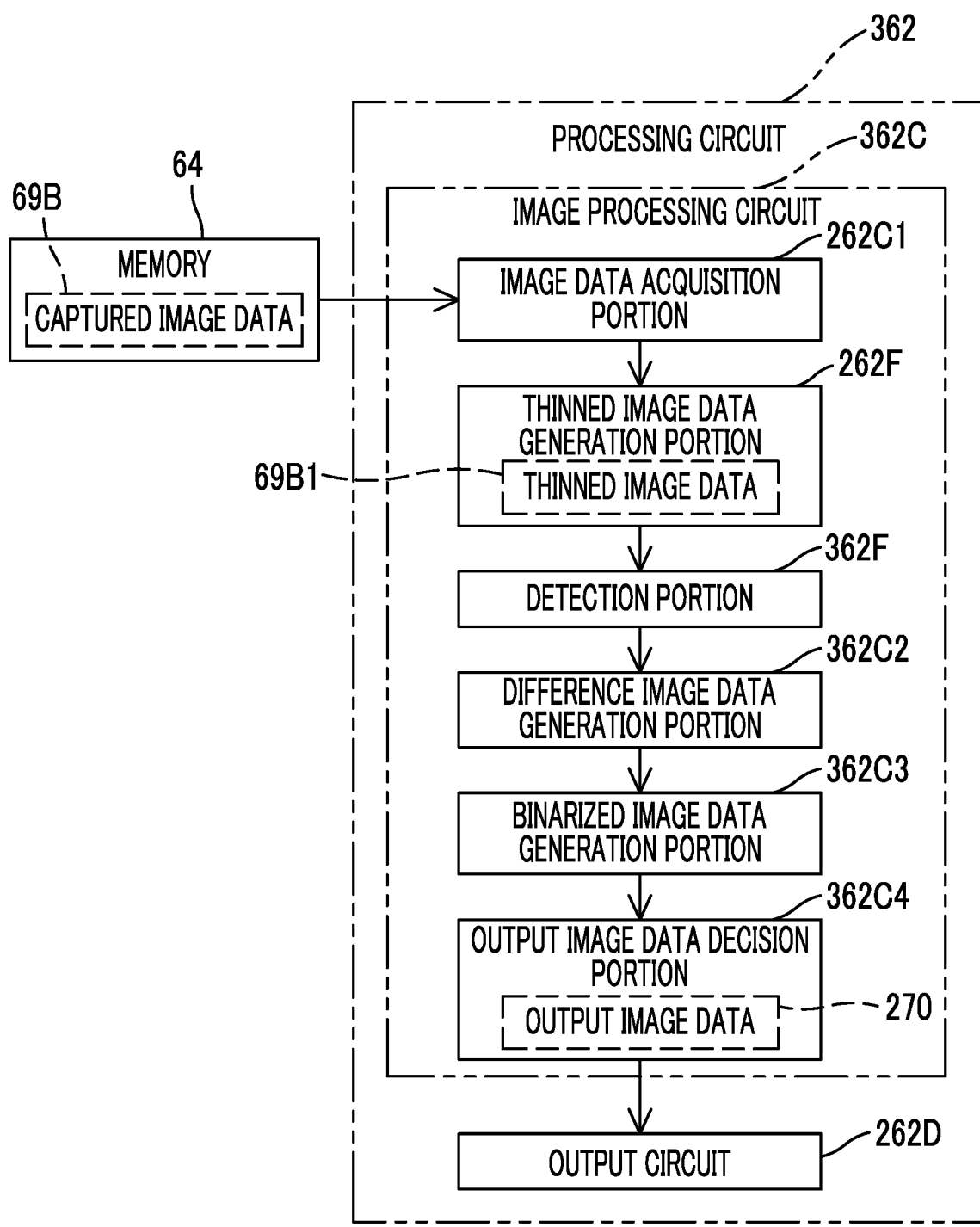
FIG. 22 is a block diagram illustrating an example of a configuration of a processing circuit included in the imaging element of the imaging apparatus according to the third embodiment.

As illustrated in FIG. 22 as an example, the image processing circuit 362C is different from the image processing circuit 262C described in the second embodiment in that a detection portion 362F is included. In addition, the image processing circuit 362C is different from the image processing circuit 262C described in the second embodiment in that a difference image data generation portion 362C2 is included instead of the difference image data generation portion 262C2. In addition, the image processing circuit 362C is different from the image processing circuit 262C described in the second embodiment in that a binarized image data generation portion 362C3 is included instead of the binarized image data generation portion 262C3. In addition, the image processing circuit 362C is different from the image processing circuit 262C described in the second embodiment in that an output image data decision portion 362C4 is included instead of the output image data decision portion 262C4.

Figure 23:
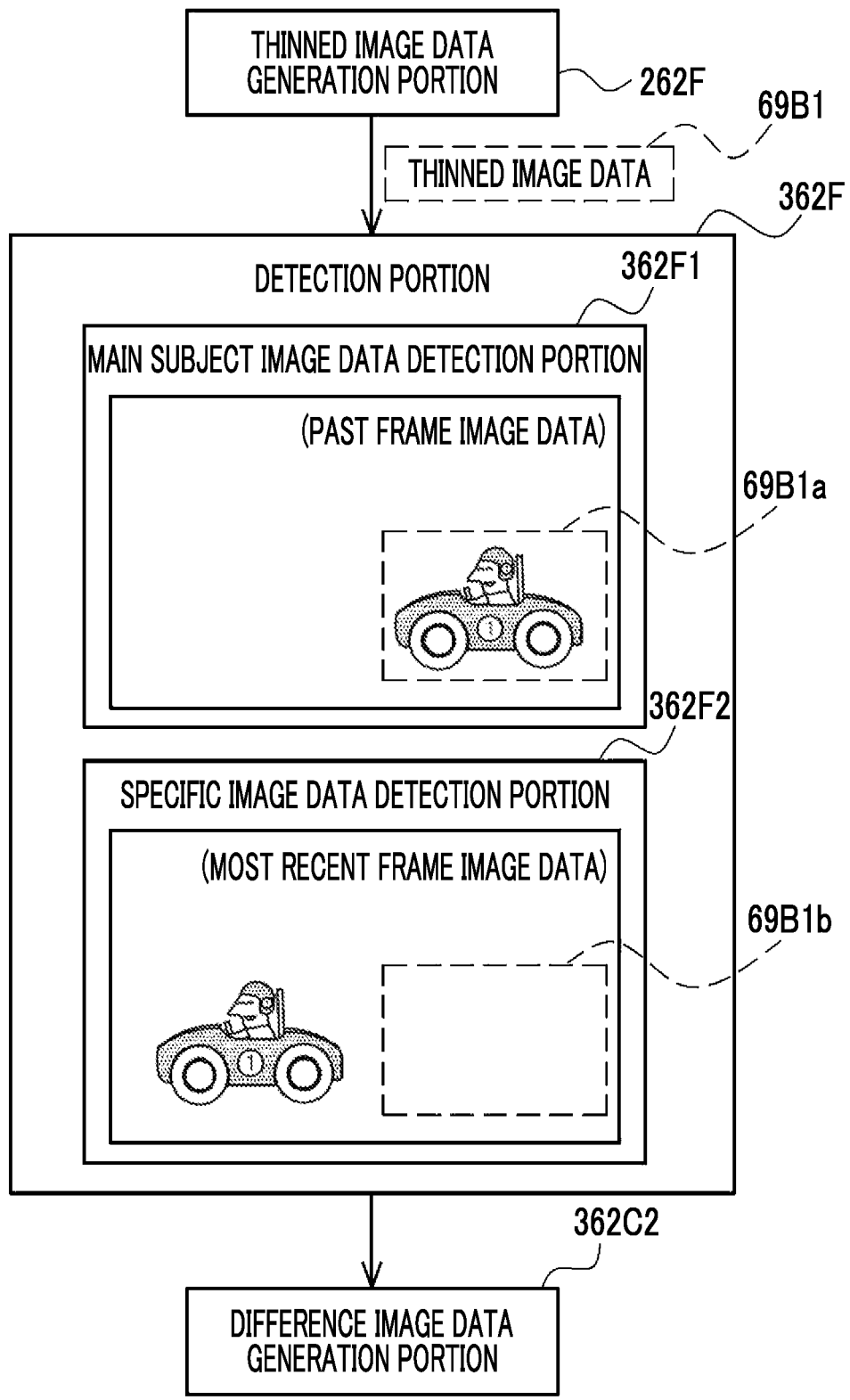
FIG. 23 is a conceptual diagram for describing the thinned image data generation portion, a detection portion, and a difference image data generation portion illustrated in FIG. 22.

As illustrated in FIG. 23 as an example, the detection portion 362F acquires the thinned image data 69B1 from the thinned image data generation portion 262F. As described in the second embodiment, the thinned image data 69B1 includes the most recent frame image data after the thinning processing and the past frame image data after the thinning processing. In the third embodiment, for convenience of description, the most recent frame image data after the thinning processing will be simply referred to as the "most recent frame image data", and the past frame image data after the thinning processing will be simply referred to as the "past frame image data".

The detection portion 362F comprises a main subject image data detection portion 362F1 and a specific image data detection portion 362F2. The main subject image data detection portion 362F1 detects main subject image data 69B1*a* indicating an image of a main subject from the past frame image data.

The main subject image data detection portion 362F1 detects image data of which a degree of matching with standard image data is greater than or equal to a predetermined degree of matching, from the past frame image data as the main subject image data 69B1*a*. For example, image data of which 90% or more matches the standard image data is detected as the main subject image data 69B1*a*. In the third embodiment, image data that is registered in advance as image data corresponding to the main subject image data 69B1*a* is employed as an example of the standard image data.

The specific image data detection portion 362F2 detects, from the most recent frame image data, specific image data 69B1*b* that indicates an image specified from a position corresponding to a position of an image indicated by the main subject image data 69B1*a* within an image indicated by the past frame image data.

The detection portion 362F outputs the main subject image data 69B1*a* and the specific image data 69B1*b* to the difference image data generation portion 362C2.

Figure 24:
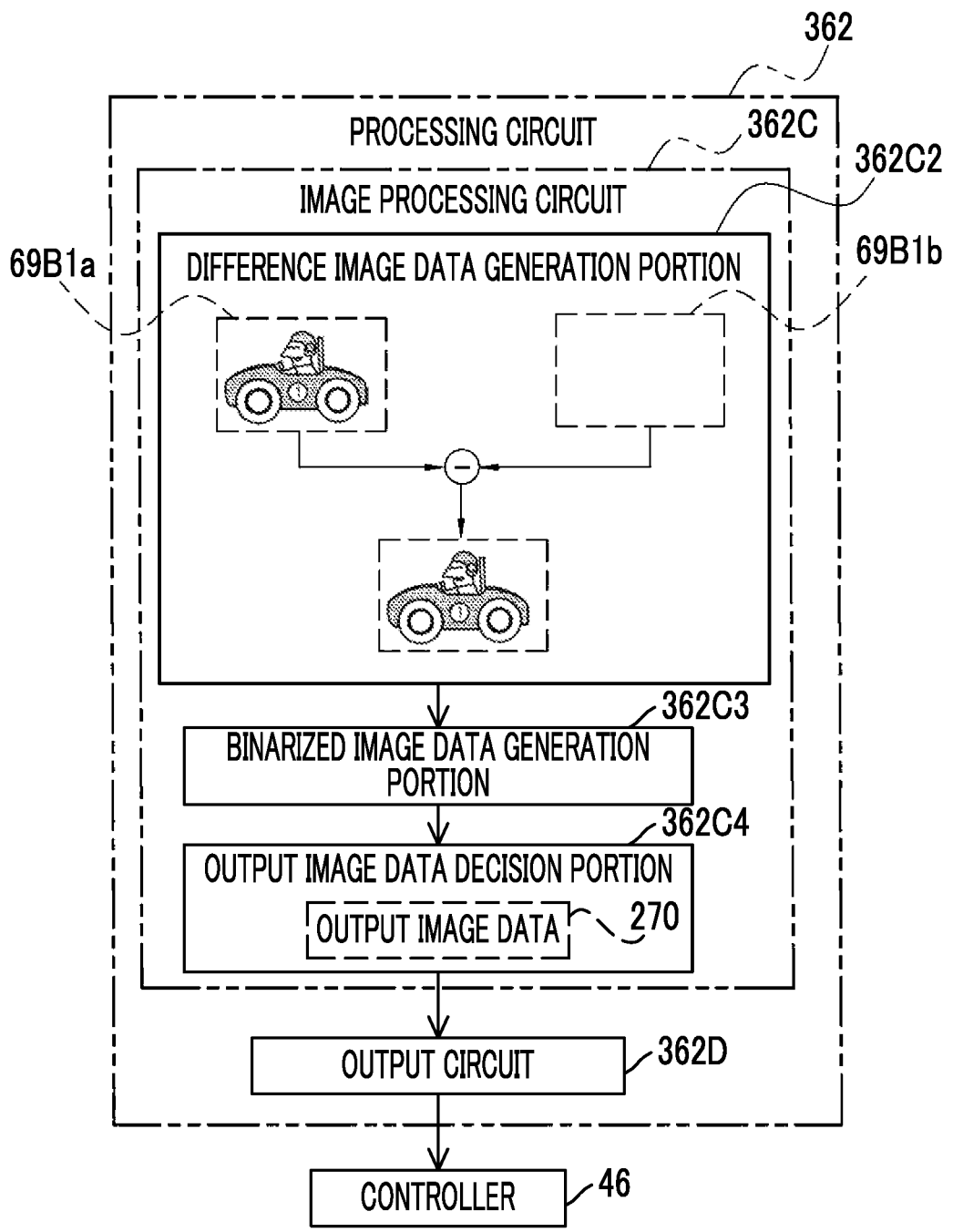
FIG. 24 is a conceptual diagram for describing an image processing circuit and an output circuit illustrated in FIG. 22 and a controller.

As illustrated in FIG. 24 as an example, the difference image data generation portion 362C2 calculates the difference absolute value between the main subject image data 69B1*a* and the specific image data 69B1*b* and generates the difference image data based on the calculated difference absolute value.

The binarized image data generation portion 362C3 generates the binarized image data based on the difference image data generated by the difference image data generation portion 362C2.

The output image data decision portion 362C4 decides the output image data 270 using the same method as the binarized image data generation portion 262C3 described in the second embodiment, based on the binarized image data generated by the binarized image data generation portion 362C3. The output image data decision portion 362C4 outputs the decided output image data 270 to the output circuit 362D.

Next, an action of the imaging apparatus 300 will be described.

Figure 25:
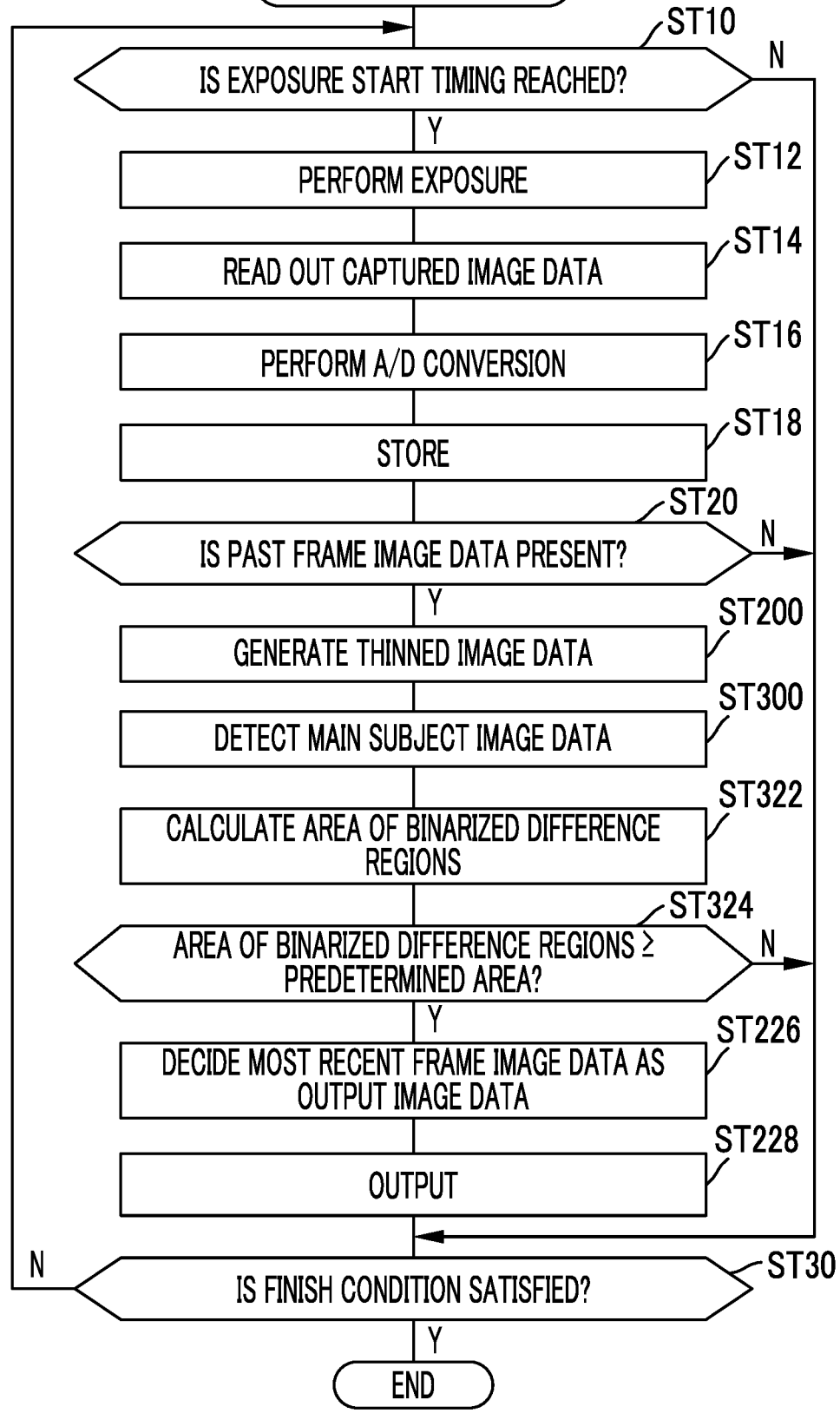
FIG. 25 is a flowchart illustrating an example of a flow of imaging processing according to the third embodiment.

First, a flow of imaging processing executed by the processing circuit 362 of the imaging element 344 will be described with reference to FIG. 25. The imaging processing illustrated in FIG. 25 is different from the imaging processing illustrated in FIG. 21 in that step ST300 is included. In addition, the imaging processing illustrated in FIG. 25 is different from the imaging processing illustrated in FIG. 21 in that step ST322 to step ST324 are included instead of step ST222 to step ST224. Thus, in a flowchart of the imaging processing illustrated in FIG. 25, the same steps as the imaging processing illustrated in FIG. 21 are designated by the same step numbers. Hereinafter, only parts of the imaging processing illustrated in FIG. 25 different from the imaging processing illustrated in FIG. 21 will be described.

As illustrated in FIG. 25 as an example, after processing of step ST200 is executed, the imaging processing transitions to step ST300. In step ST300, the main subject image data detection portion 362F1 detects the main subject image data 69B1a from the past frame image data. In addition, the specific image data detection portion 362F2 detects the specific image data 69B1b from the most recent frame image data.

Processing of step ST322 is different from processing of step ST222 illustrated in FIG. 21 in that the area of the binarized difference regions is calculated based on the main subject image data 69B1a and the specific image data 69B1b instead of calculating the area of the binarized difference regions based on the thinned image data 69B1.

Processing of step ST324 is different from processing of step ST224 illustrated in FIG. 21 in that the area of the binarized difference regions calculated based on the main subject image data 69B1a and the specific image data 69B1b is compared with the predetermined area instead of the area of the binarized difference regions calculated based on the thinned image data 69B1. The area of the binarized difference regions calculated based on the main subject image data 69B1a and the specific image data 69B1b is an example of a "degree of difference" according to the embodiments of the technology of the present disclosure.

As described above, in the image processing circuit 362C, the main subject image data 69B1a and the specific image data 69B1b are detected from the thinned image data 69B1 obtained by performing the thinning processing on the captured image data 69B. The area of the binarized difference regions is calculated based on the main subject image data 69B1a and the specific image data 69B1b. The main subject image data 69B1a and the specific image data 69B1b have a smaller data amount than the captured image data 69B. Thus, a load exerted on processing in the image processing circuit 362C is reduced. In addition, the output image data 270 has a smaller data amount than the output image data 70. Thus, the power consumption required for outputting the image data can be reduced.

While an example of a form of detecting the main subject image data using the standard image data registered in advance is illustratively described in the third embodiment, the technology of the present disclosure is not limited thereto. For example, face image data indicating an image of a face may be detected as the main subject image data using a well-known face detection function.

Fourth Embodiment

A case where the imaging frame rate is constant is described in the third embodiment. A case where the imaging frame rate is variable will be described in a fourth embodiment. In the fourth embodiment, the same constituents as the third embodiment will be designated by the same reference signs and will not be described. Hereinafter, parts different from the third embodiment will be described.

As illustrated in FIG. 1 to FIG. 3 as an example, an imaging apparatus 400 according to the fourth embodiment is different from the imaging apparatus 300 described in the third embodiment in that an imaging apparatus main body 412 is included instead of the imaging apparatus main body 312. As illustrated in FIG. 3 as an example, the imaging apparatus main body 412 is different from the imaging apparatus main body 312 in that an imaging element 444 is included instead of the imaging element 344. As illustrated in FIG. 5 as an example, the imaging element 444 is different from the imaging element 344 in that a processing circuit 462 is included instead of the processing circuit 362.

As illustrated in FIG. 6 as an example, the processing circuit 462 is different from the processing circuit 362 in that an image processing circuit 462C is included instead of the image processing circuit 362C, and that a control circuit 462E is included instead of the control circuit 62E.

Figure 26:
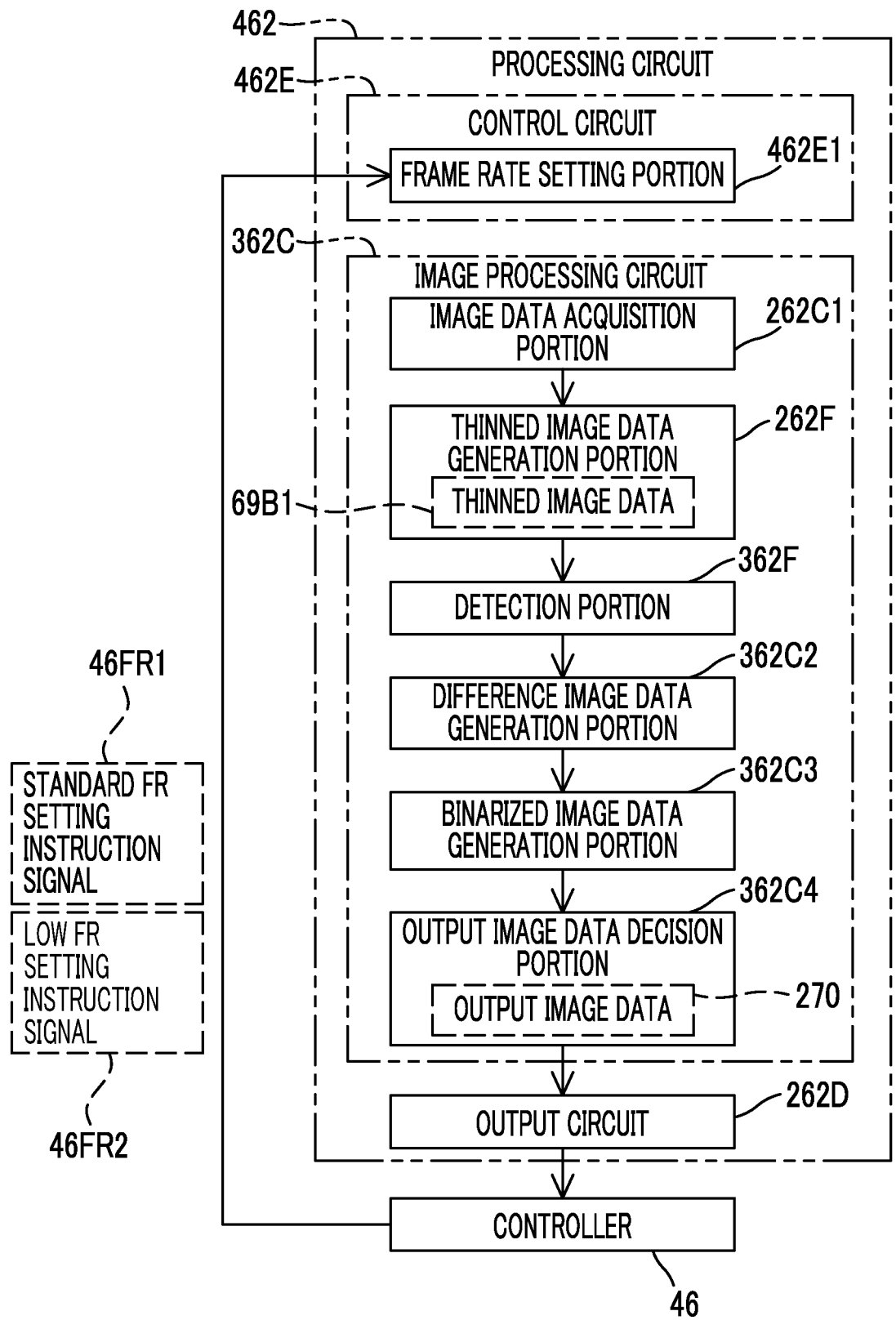
FIG. 26 is a block diagram illustrating an example of a configuration of a processing circuit included in the imaging element of the imaging apparatus according to the fourth embodiment.

As illustrated in FIG. 26 as an example, the control circuit 462E is different from the control circuit 62E in that a frame rate setting portion 462E1 is included. While an example of a form of incorporating the frame rate setting portion 462E1 in the control circuit 462E is illustrated here, the technology of the present disclosure is not limited thereto. The frame rate setting portion 462E1 may be incorporated in the processing circuit 462 separately from the control circuit 462E.

The controller 46 selectively outputs a standard FR setting instruction signal 46FR1 and a low FR setting instruction signal 46FR2 to the frame rate setting portion 462E1 based on the output image data 270 input from the output circuit 262D. Here, the abbreviation "FR" included in the "standard FR" and the "low FR" stands for "Frame Rate".

The imaging frame rate (refer to FIG. 7A) described in the first embodiment is a frame rate that can be changed to a standard frame rate and a low frame rate. The low frame rate is a frame rate that is lower than the standard frame rate and higher than the output frame rate (refer to FIG. 7B). Here, 240 fps is applied as an example of the standard frame rate, and 120 fps is applied as an example of the low frame rate.

The standard FR setting instruction signal 46FR1 is a signal for issuing an instruction to set the standard frame rate as the imaging frame rate. The low FR setting instruction signal 46FR2 is a signal for issuing an instruction to set the low frame rate as the imaging frame rate.

In a case where the standard FR setting instruction signal 46FR1 is input from the controller 46, the frame rate setting portion 462E1 sets the standard frame rate as the imaging frame rate. In addition, in a case where the low FR setting instruction signal 46FR2 is input from the controller 46, the frame rate setting portion 462E1 sets the low frame rate as the imaging frame rate.

Figure 27:
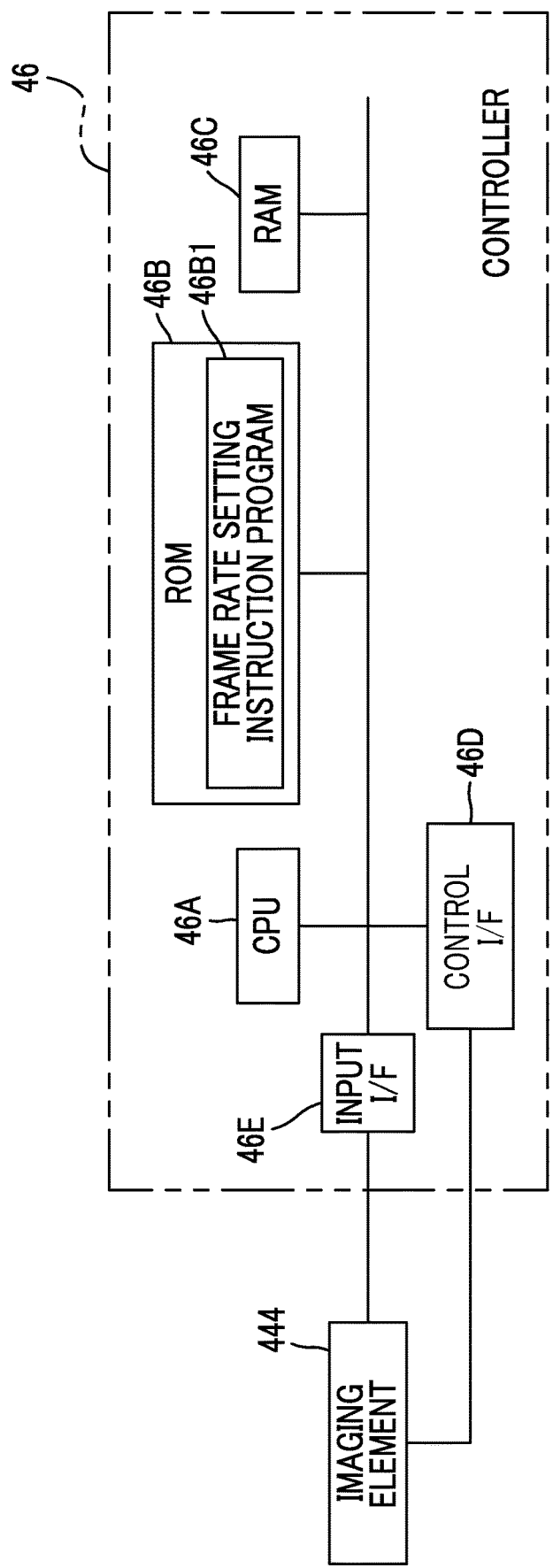
FIG. 27 is a block diagram illustrating an example of a configuration of the controller included in the imaging apparatus according to the fourth embodiment.

As illustrated in FIG. 27 as an example, the ROM 46B of the controller 46 stores a frame rate setting instruction program 46B1. The CPU 46A loads the frame rate setting instruction program 46B1 into the RAM 46C. The CPU 46A reads out the frame rate setting instruction program 46B1 from the ROM 46B and loads the frame rate setting instruction program 46B1 into the RAM 46C. By executing the frame rate setting instruction program 46B1 loaded in the RAM 46C, the CPU 46A operates as an image data reception portion 46C1, a count-up instruction portion 46C2, a counter 46C3, a first signal output portion 46C4, and a second signal output portion 46C5 illustrated in FIG. 28 as an example. The counter 46C3 includes a count value reset portion 46C3a and a count-up portion 46C3b.

Figure 28:
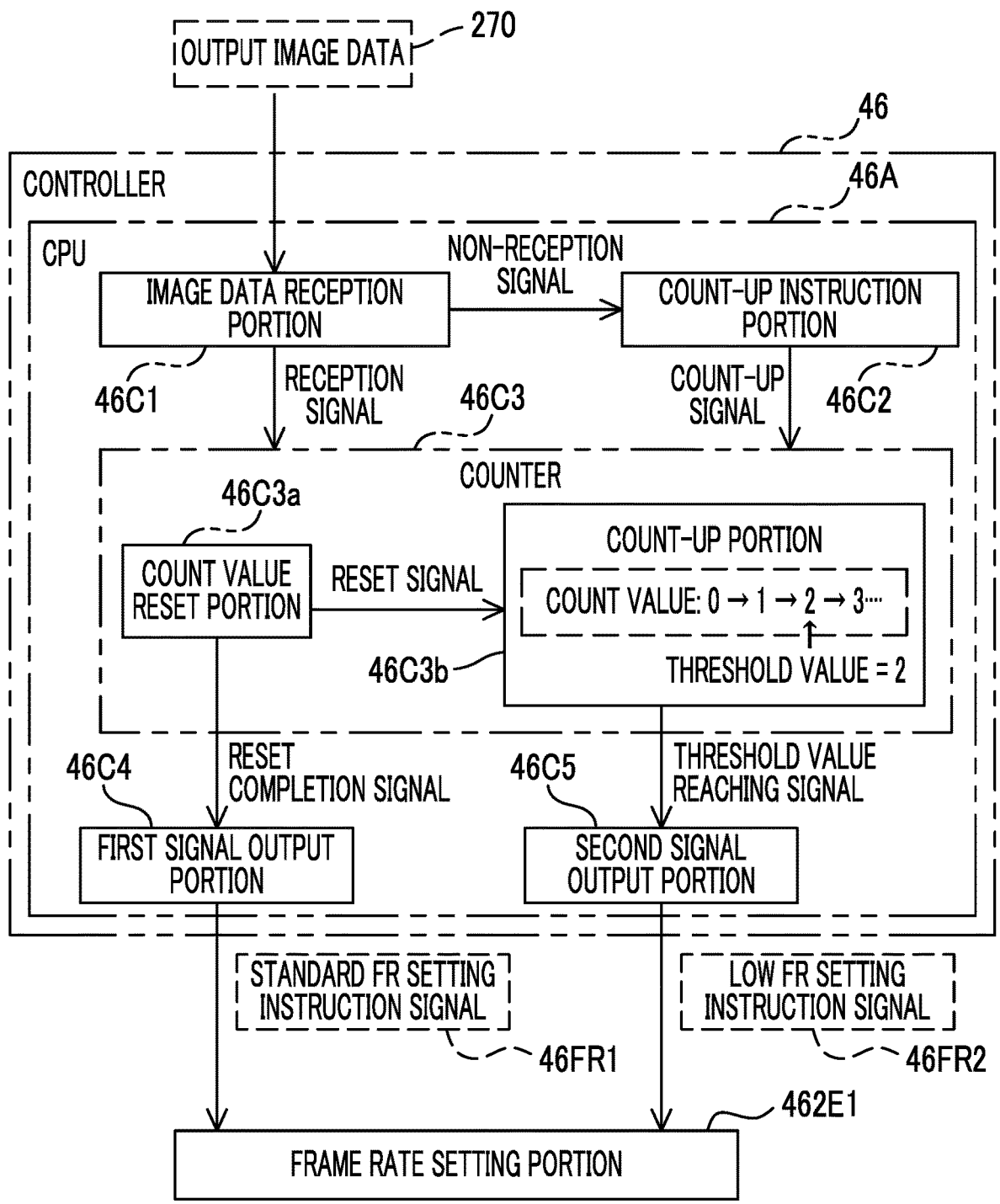
FIG. 28 is a functional block diagram illustrating an example of a function of a CPU of the controller included in the imaging apparatus according to the fourth embodiment.

As illustrated in FIG. 28 as an example, the image data reception portion 46C1 receives the output image data 270 output from the output circuit 262D. In a case where the output image data 270 is received, the image data reception portion 46C1 outputs a reception signal indicating that the output image data 270 is received, to the counter 46C3. In a case where the output image data 270 is not received even after a predetermined reception timing is reached, the image data reception portion 46C1 outputs a non-reception signal indicating that the output image data 270 is not received, to the count-up instruction portion 46C2. Here, the predetermined reception timing refers to a timing that is determined in accordance with the output frame rate. The predetermined reception timing is periodically reached in accordance with the output frame rate. For example, in a case where the output frame rate is 60 fps, the predetermined reception timing is reached at time intervals of $1/60$ seconds.

In a case where the non-reception signal is received, the count-up instruction portion 46C2 outputs a count-up signal for issuing a count-up instruction to the counter 46C3.

The count-up portion 46C3b counts up a count value of which an initial value is "0". Specifically, in the counter 46C3, in a case where the count-up signal is input from the count-up instruction portion 46C2, the count-up portion 46C3b adds 1 to the count value. In a case where the count value reaches a threshold value, the count-up portion 46C3b outputs a threshold value reaching signal indicating that the count value reaches the threshold value, to the second signal output portion 46C5. In the example illustrated in FIG. 28, "2" is employed as the threshold value. The threshold value may be a fixed value or a variable value that can be changed in accordance with an instruction received by the reception portion 84 (refer to FIG. 3).

The count value reset portion 46C3a resets the count value. Specifically, in the counter 46C3, in a case where the reception signal is input from the image data reception portion 46C1, the count value reset portion 46C3a resets the count value to "0". In a case where the count value is reset to "0", the count value reset portion 46C3a outputs a reset completion signal indicating that reset is completed, to the first signal output portion 46C4.

In a case where the reset completion signal is input from the count value reset portion 46C3a, the first signal output portion 46C4 outputs the standard FR setting instruction signal 46FR1 to the frame rate setting portion 462E1. In a case where the threshold value reaching signal is input from the count-up portion 46C3b, the second signal output portion 46C5 outputs the low FR setting instruction signal 46FR2 to the frame rate setting portion 462E1.

Next, an action of the imaging apparatus 400 will be described. In description of the action of the imaging apparatus 400, only parts different from the third embodiment will be described.

First, a flow of frame rate setting instruction processing executed by the CPU 46A in accordance with the frame rate setting instruction program 46B1 will be described with reference to FIG. 29.

Figure 29:
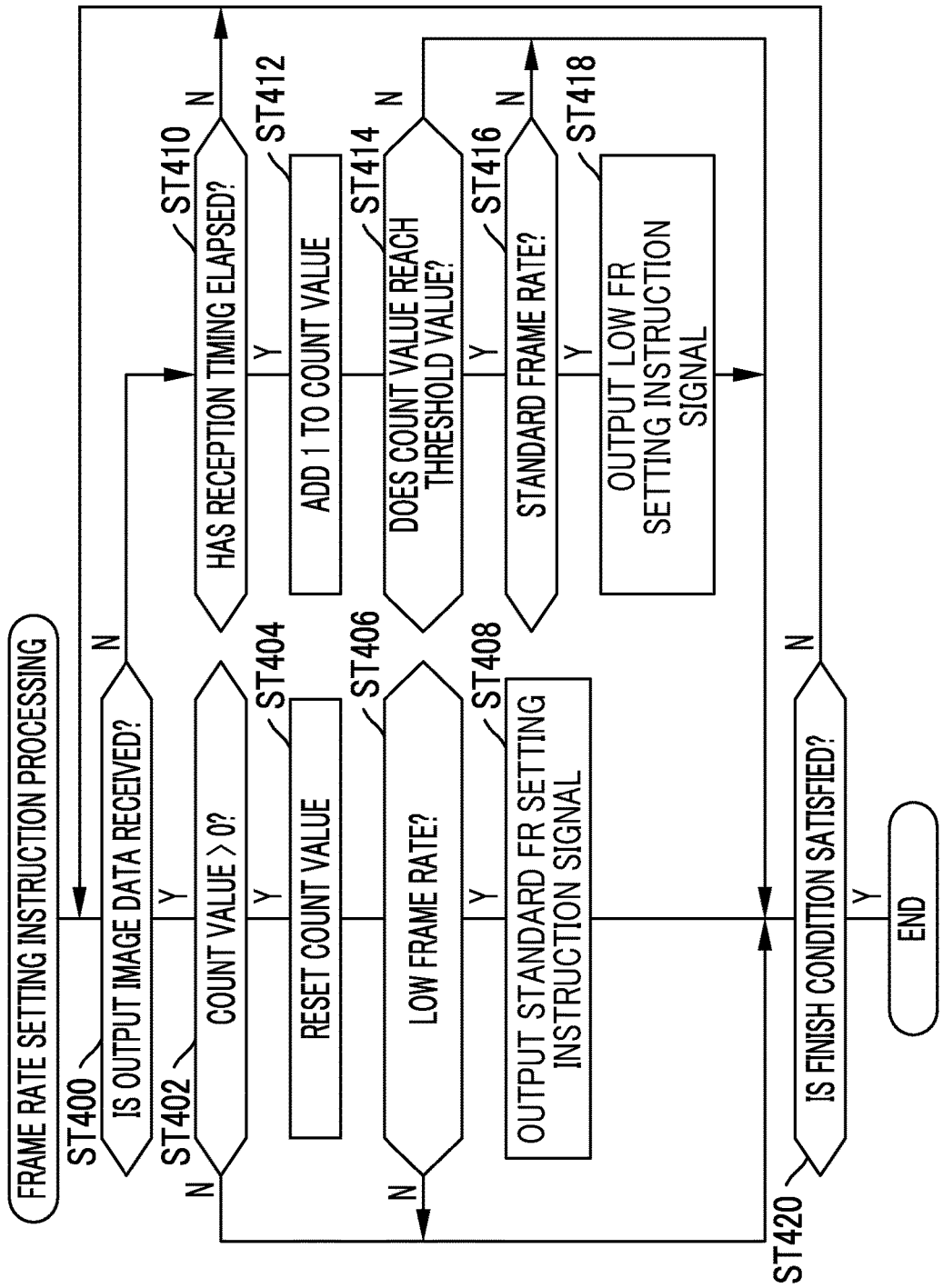
FIG. 29 is a flowchart illustrating an example of a flow of frame rate setting instruction processing according to the fourth embodiment.

In the frame rate setting instruction processing illustrated in FIG. 29, first, in step ST400, the image data reception portion 46C1 determines whether or not the output image data 270 is received. In step ST400, in a case where the output image data 270 is received, a positive determination is made, and the frame rate setting instruction processing transitions to step ST402. In step ST400, in a case where the output image data 270 is not received, a negative determination is made, and the frame rate setting instruction processing transitions to step ST410.

In step ST402, the count value reset portion 46C3a determines whether or not the count value exceeds "0". In step ST402, in a case where the count value exceeds "0", a positive determination is made, and the frame rate setting instruction processing transitions to step ST408. In step ST402, in a case where the count value is "0", a negative determination is made, and the frame rate setting instruction processing transitions to step ST420.

In step ST404, the count value reset portion 46C3a resets the count value to "0". Then, the frame rate setting instruction processing transitions to step ST406.

In step ST406, the first signal output portion 46C4 determines whether or not the current imaging frame rate of the imaging element 444 is the low frame rate. In step ST406, in a case where the current imaging frame rate of the imaging element 444 is the low frame rate, a positive determination is made, and the frame rate setting instruction processing transitions to step ST408. In step ST406, in a case where the current imaging frame rate of the imaging element 444 is not the low frame rate, that is, in a case where the current imaging frame rate of the imaging element 444 is the standard frame rate, a negative determination is made, and the frame rate setting instruction processing transitions to step ST420.

In step ST408, the first signal output portion 46C4 outputs the standard FR setting instruction signal 46FR1 to the frame rate setting portion 462E1. Then, the frame rate setting instruction processing transitions to step ST420.

In step ST410, the image data reception portion 46C1 determines whether or not the predetermined reception timing has elapsed. In step ST410, in a case where the predetermined reception timing has not elapsed, a negative determination is made, and the frame rate setting instruction processing transitions to step ST400. In step ST410, a determination as to whether or not the predetermined reception timing has elapsed is performed. In step ST410, in a case where the predetermined reception timing has elapsed, a positive determination is made, and the frame rate setting instruction processing transitions to step ST412.

In step ST412, the count-up instruction portion 46C2 outputs the count-up signal to the counter 46C3. In the counter 46C3, in a case where the count-up signal is input, the count-up portion 46C3b adds 1 to the count value. Then, the frame rate setting instruction processing transitions to step ST414.

In step ST414, the count-up portion 46C3b determines whether or not the count value reaches the threshold value. In step ST414, in a case where the count value reaches the threshold value, a positive determination is made, and the frame rate setting instruction processing transitions to step ST416. In step ST414, in a case where the count value does not reach the threshold value, a negative determination is made, and the frame rate setting instruction processing transitions to step ST420.

In step ST416, the second signal output portion 46C5 determines whether or not the current imaging frame rate of the imaging element 444 is the standard frame rate. In step ST416, in a case where the current imaging frame rate of the imaging element 444 is the standard frame rate, a positive determination is made, and the frame rate setting instruction processing transitions to step ST418. In step ST416, in a case where the current imaging frame rate of the imaging element 444 is not the standard frame rate, that is, in a case where the current imaging frame rate of the imaging element 444 is the low frame rate, a negative determination is made, and the frame rate setting instruction processing transitions to step ST420.

In step ST418, the second signal output portion 46C5 outputs the low FR setting instruction signal 46FR2 to the frame rate setting portion 462E1. Then, the frame rate setting instruction processing transitions to step ST420.

Next, a flow of standard frame rate setting processing executed by the processing circuit 462 of the imaging element 444 will be described with reference to FIG. 30.

In the standard frame rate setting processing illustrated in FIG. 30, first, in step ST440, the frame rate setting portion 462E1 determines whether or not the standard FR setting instruction signal 46FR1 is received. In step ST440, in a case where the standard FR setting instruction signal 46FR1 is not received, a negative determination is made, and the standard frame rate setting processing transitions to step ST444. In step ST440, in a case where the standard FR setting instruction signal 46FR1 is received, a positive determination is made, and the standard frame rate setting processing transitions to step ST442.

In step ST442, the frame rate setting portion 462E1 sets the standard frame rate as the imaging frame rate. Then, the standard frame rate setting processing transitions to step ST444.

In step ST444, the frame rate setting portion 462E1 determines whether or not a condition (hereinafter, referred to as a "standard frame rate setting processing finish condition") under which the standard frame rate setting processing is finished is satisfied. For example, a condition that an instruction to finish the standard frame rate setting processing is received by the reception portion 84 (refer to FIG. 3) is illustrated as the standard frame rate setting processing finish condition. In step ST444, in a case where the standard frame rate setting processing finish condition is not satisfied, a negative determination is made, and the standard frame rate setting processing transitions to step ST440. In step ST444, in a case where the standard frame rate setting processing finish condition is satisfied, the standard frame rate setting processing is finished.

Next, a flow of low frame rate setting processing executed by the processing circuit 462 of the imaging element 444 will be described with reference to FIG. 31.

In the low frame rate setting processing illustrated in FIG. 31, first, in step ST450, the frame rate setting portion 462E1 determines whether or not the low FR setting instruction signal 46FR2 is received. In step ST450, in a case where the low FR setting instruction signal 46FR2 is not received, a negative determination is made, and the low frame rate setting processing transitions to step ST454. In step ST450, in a case where the low FR setting instruction signal 46FR2 is received, a positive determination is made, and the low frame rate setting processing transitions to step ST452.

In step ST452, the frame rate setting portion 462E1 sets the low frame rate as the imaging frame rate. Then, the low frame rate setting processing transitions to step ST454.

In step ST454, the frame rate setting portion 462E1 determines whether or not a condition (hereinafter, referred to as a "low frame rate setting processing finish condition") under which the low frame rate setting processing is finished is satisfied. For example, a condition that an instruction to finish the low frame rate setting processing is received by the reception portion 84 (refer to FIG. 3) is illustrated as the low frame rate setting processing finish condition. In step ST454, in a case where the low frame rate setting processing finish condition is not satisfied, a negative determination is made, and the low frame rate setting processing transitions to step ST450. In step ST444, in a case where the low frame rate setting processing finish condition is satisfied, the low frame rate setting processing is finished.

As described above, in the imaging element 444, a period in which the output image data 270 is not continuously output from the output circuit 262D is counted up as the count value by the count-up portion 46C3b. In a case where the count value reaches the threshold value, the low FR setting instruction signal 46FR2 is output by the second signal output portion 46C5. In the frame rate setting portion 462E1, in a case where the low FR setting instruction signal 46FR2 is input, the low frame rate is set as the imaging frame rate. That is, in a case where the period in which the output image data 270 is not output from the output circuit 262D continues for a predetermined time period, the imaging frame rate is decreased.

In a case where the output image data 270 is not output from the output circuit 262D, the area of the binarized difference regions is less than the predetermined area. This means that the subject is not having a noticeable motion. Even in a case where the number of frames of the captured image data 69 obtained by imaging the subject during a period in which the subject is not having a noticeable motion is not large, the user is not disturbed. In addition, in a case where the number of frames is increased, power consumption in the processing circuit 462 is also increased. In the imaging element 444 according to the fourth embodiment, in a case where the period in which the output image data 270 is not output from the output circuit 262D continues for the predetermined time period, the imaging frame rate is decreased. Thus, power consumption in the imaging element 444 can be reduced, compared to a case of performing imaging at the standard frame rate during the period in which the subject is not having a noticeable motion.

While an example of a form of decreasing the imaging frame rate in a case where the period in which the output image data 270 is not output from the output circuit 262D continues for the predetermined time period is described in the fourth embodiment, the technology of the present disclosure is not limited thereto. For example, in a case where the period in which the output image data 270 is not output from the output circuit 262D continues for the predetermined time period, the output frame rate may be decreased instead of the imaging frame rate. For example, the frame rate setting portion 462E1 may decrease the output frame rate from 60 fps to 30 fps.

Fifth Embodiment

In the fourth embodiment, every output image data 270 decided by the output image data decision portion 362C4 is output. An example of a form of outputting selected output image data 270 will be described in a fifth embodiment. In the fifth embodiment, the same constituents as the fourth embodiment will be designated by the same reference signs and will not be described. Hereinafter, parts different from the fourth embodiment will be described.

As illustrated in FIG. 1 to FIG. 3 as an example, an imaging apparatus 500 according to the fifth embodiment is different from the imaging apparatus 400 described in the fourth embodiment in that an imaging apparatus main body 512 is included instead of the imaging apparatus main body 412. As illustrated in FIG. 3 as an example, the imaging apparatus main body 512 is different from the imaging apparatus main body 412 in that an imaging element 544 is included instead of the imaging element 444. As illustrated in FIG. 5 as an example, the imaging element 544 is different from the imaging element 444 in that a processing circuit 562 is included instead of the processing circuit 462. As illustrated in FIG. 6 as an example, the processing circuit 562 is different from the processing circuit 462 in that an image processing circuit 562C is included instead of the image processing circuit 362C, and that an output circuit 562D is included instead of the output circuit 262D.

Figure 32:
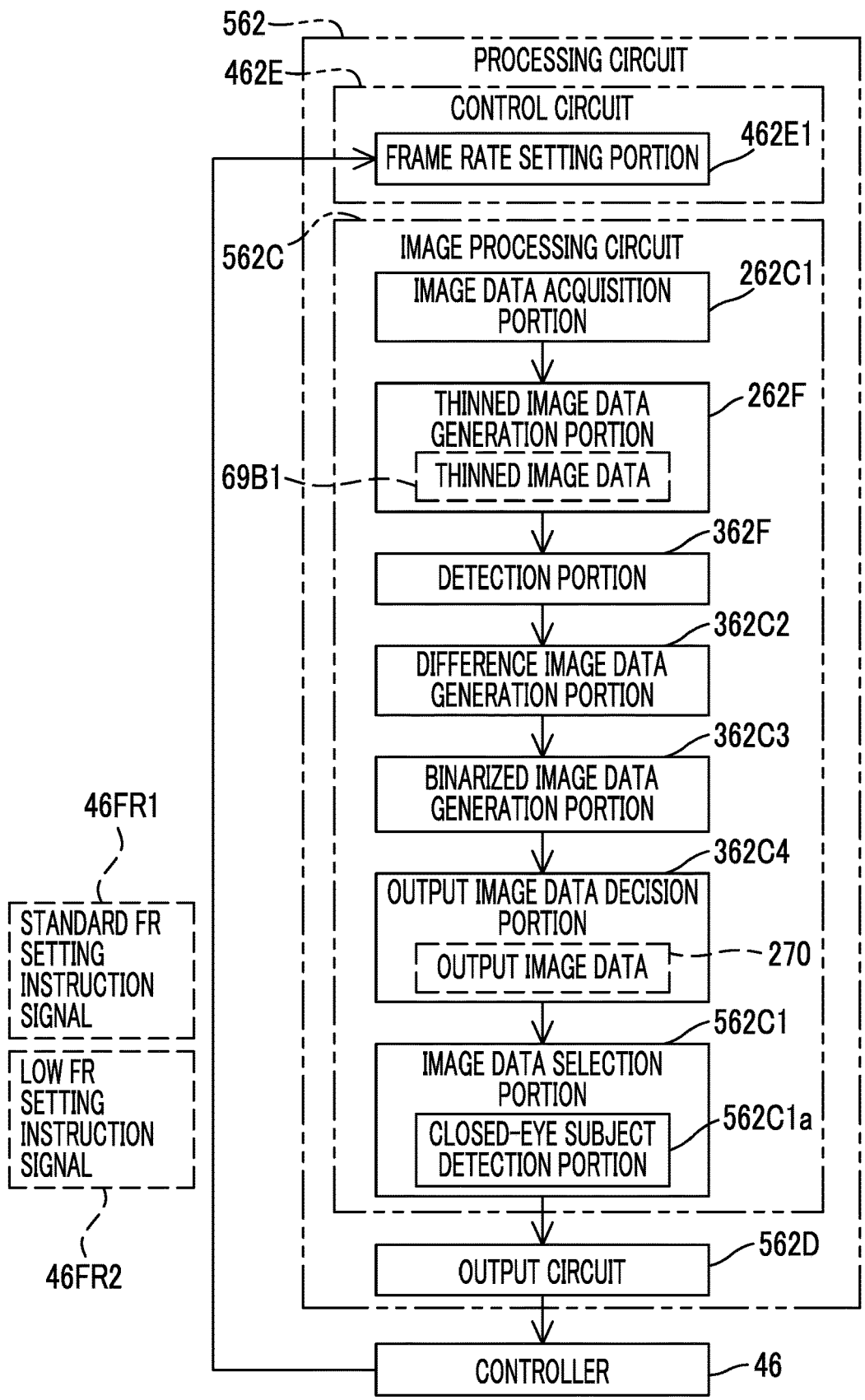
FIG. 32 is a block diagram illustrating an example of a configuration of a processing circuit included in the imaging element of the imaging apparatus according to the fifth embodiment.

As illustrated in FIG. 32 as an example, the image processing circuit 562C is different from the image processing circuit 362C in that an image data selection portion 562C1 is included. The image data selection portion 562C1 selects the output image data 270 by determining whether or not the output image data 270 decided by the output image data decision portion 362C4 is image data appropriate for output. In the fifth embodiment, decision of the output image data 270 performed by the output image data decision portion 362C4 will be referred to as "temporary decision".

The image data selection portion 562C1 includes a closed-eye subject detection portion 562C1a and selects the output image data 270 based on a detection result of the closed-eye subject detection portion 562C1a.

Figure 33:
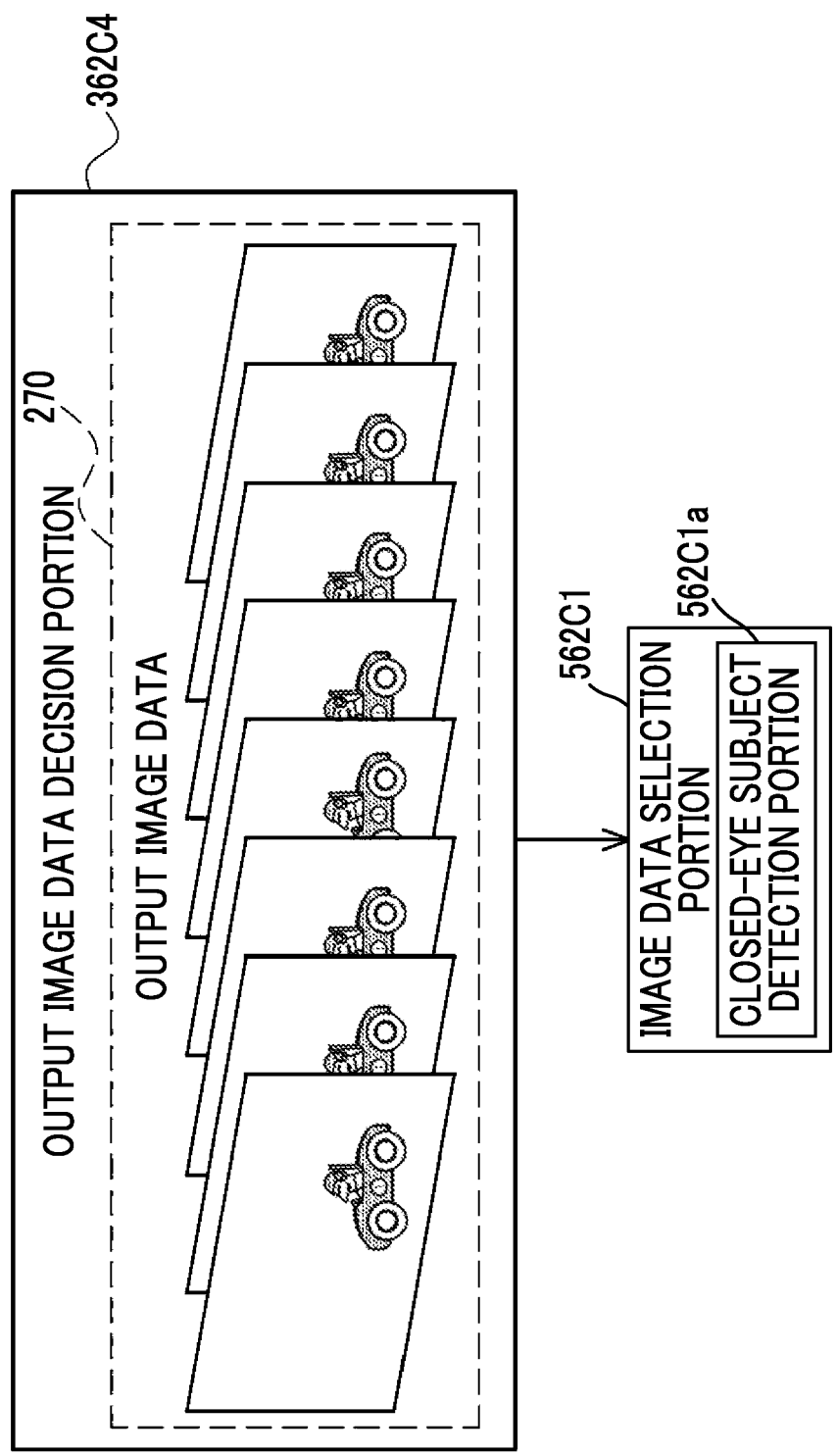
FIG. 33 is a conceptual diagram for describing an output image data decision portion and an image data selection portion illustrated in FIG. 32.

As illustrated in FIG. 33 as an example, the image data selection portion 562C1 acquires the output image data 270 decided by the output image data decision portion 362C4. The closed-eye subject detection portion 562C1a determines whether or not the face image data indicating the image of the face is included in the output image data 270, using the well-known face detection function. The output image data 270 not including the face image data is selected by the image data selection portion 562C1 as output confirmation image data 270A that is confirmed as the image data appropriate for output, and is output to the output circuit 562D.

In a case where the face image data is included in the output image data 270, the closed-eye subject detection portion 562C1a detects, from the face image data, closed-eye image data indicating an image of an eye in a state where an eyelid is closed. Accordingly, even in a case where the face image data is included in the output image data 270, as illustrated in FIG. 34A as an example, the closed-eye subject detection portion 562C1a categorizes the face image data as the closed-eye image data and open-eye image data in which the eyelid is open.

Figure 34A:
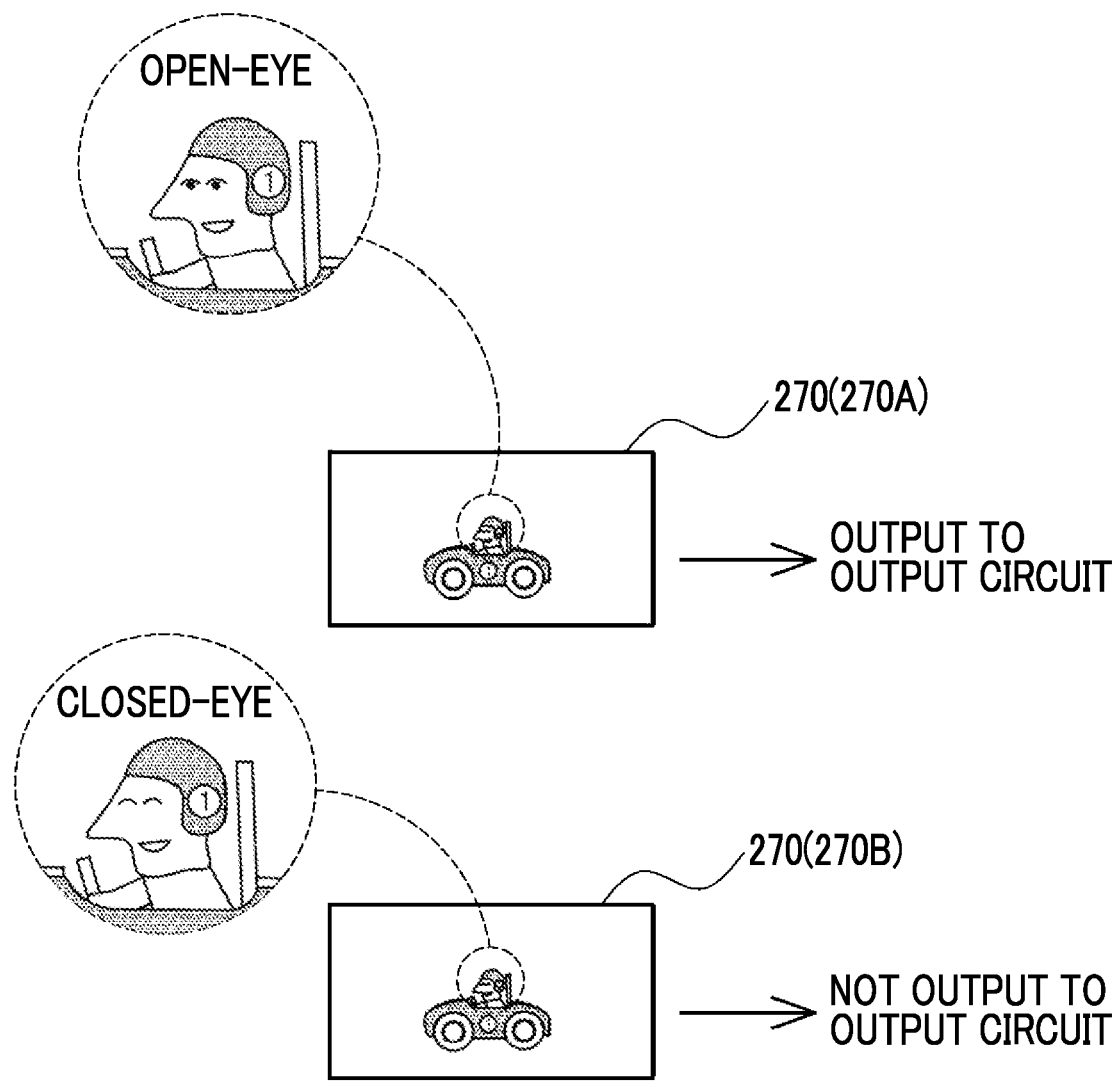
FIG. 34A is a conceptual diagram for describing the image data selection portion illustrated in FIG. 33.
Figure 34B:
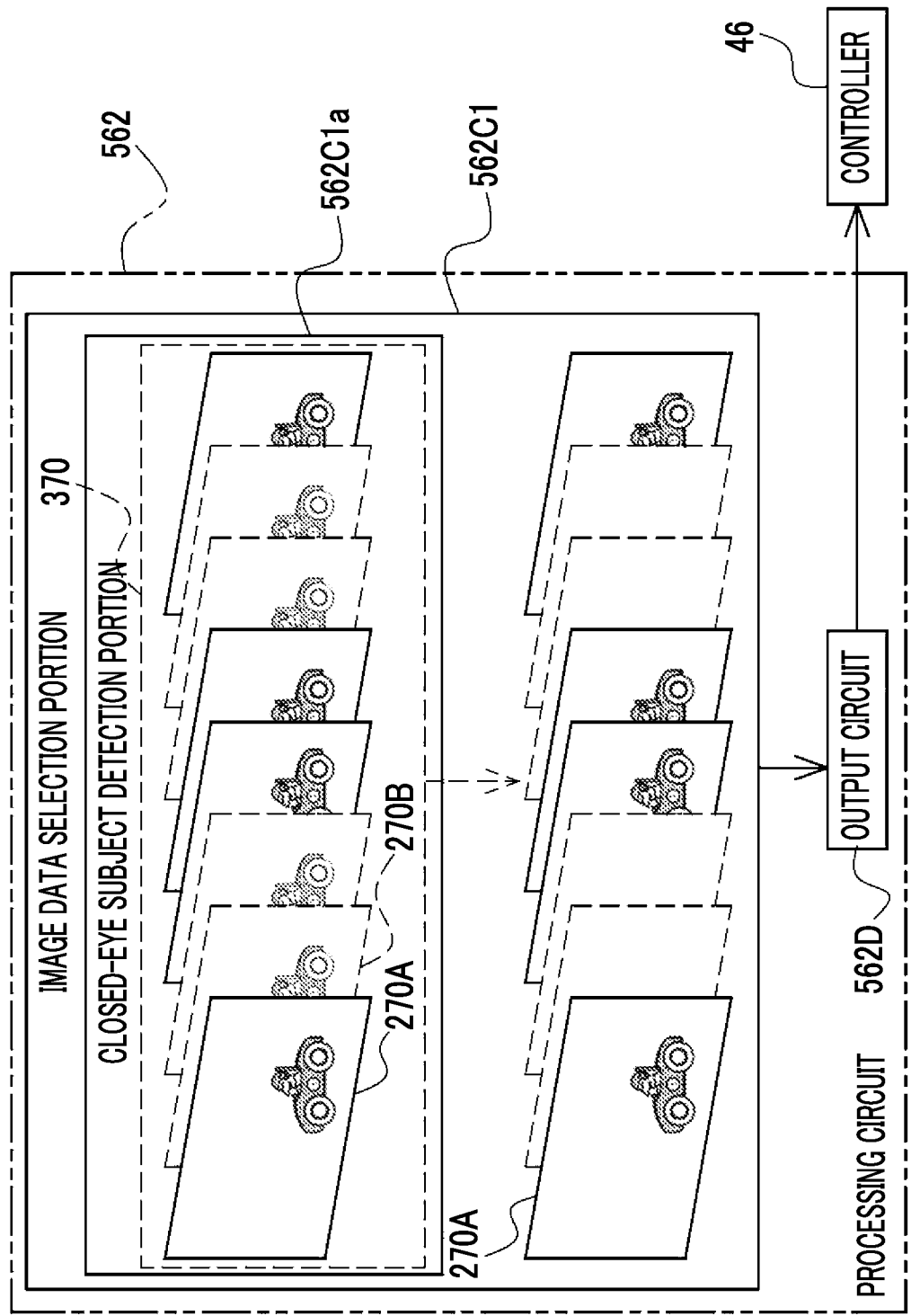
FIG. 34B is a conceptual diagram for describing the image data selection portion illustrated in FIG. 33 in detail.

As illustrated in FIG. 34A and FIG. 34B as an example, the image data selection portion 562C1 outputs the output image data 270 including the open-eye image data to the output circuit 562D as the output confirmation image data 270A, and sets the output image data 270 including the closed-eye image data as non-output confirmation image data 270B and does not output the non-output confirmation image data 270B to the output circuit 562D.

As illustrated in FIG. 35 as an example, the output circuit 562D outputs, in addition to the output confirmation image data 270A, first dummy data 270C corresponding to the dummy data 70a described in the example illustrated in FIG. 16 and second dummy data 270D as image data alternative to the non-output confirmation image data 270B. The second dummy data 270D is also image data in which pixel values of all pixels are "0" in the same manner as the first dummy data 270C.

Next, an action of the imaging apparatus 500 will be described.

First, a flow of imaging processing executed by the processing circuit 562 of the imaging element 544 will be described with reference to FIG. 36. Hereinafter, for convenience of description, it will be assumed that the face image data is included in the output image data 270. In addition, an output method for the first dummy data 270C illustrated in FIG. 35 is the same as the example illustrated in FIG. 16 and thus, will not be described below for convenience of description.

Figure 36:
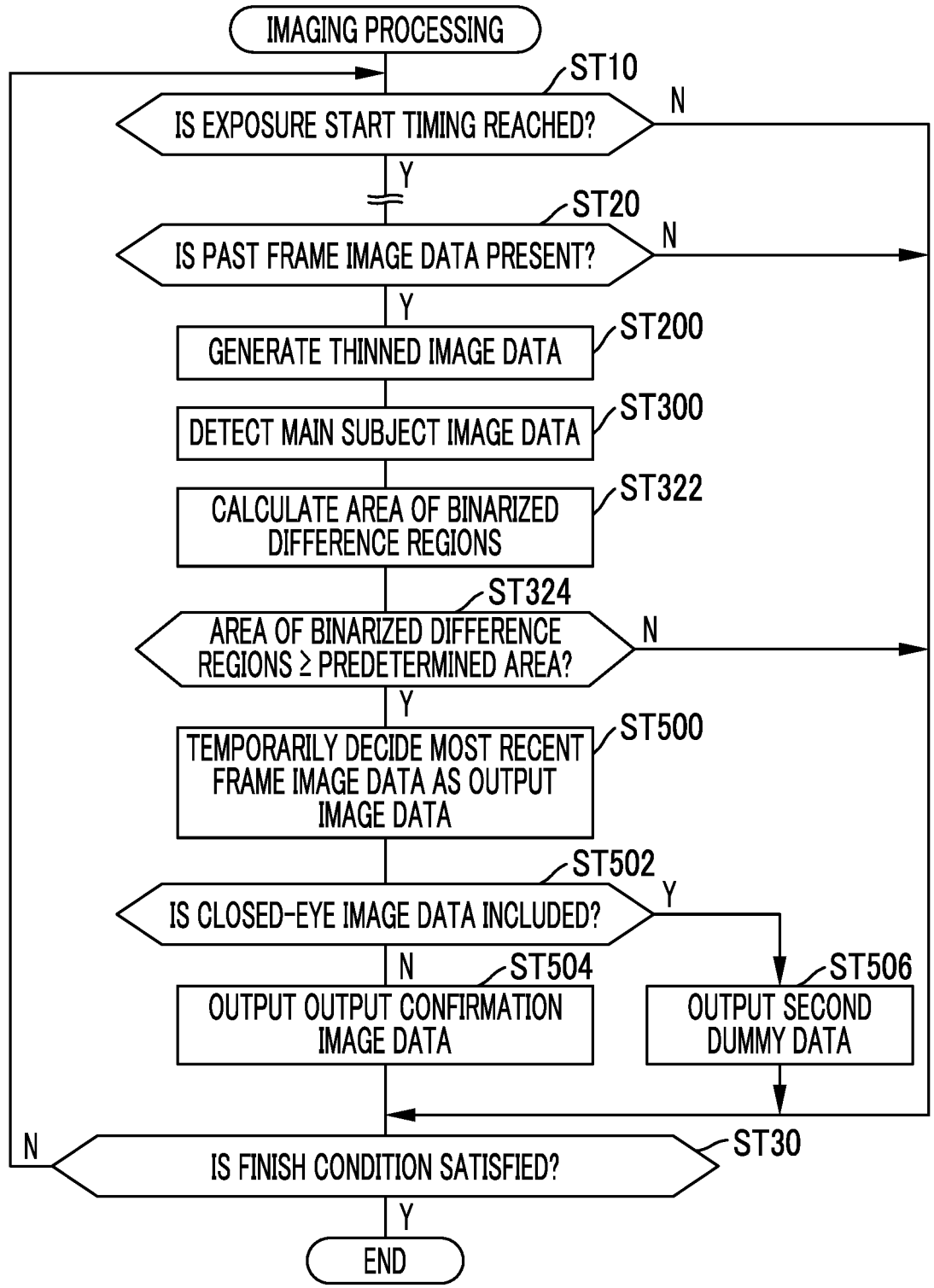
FIG. 36 is a flowchart illustrating an example of a flow of imaging processing according to the fifth embodiment.

In addition, the imaging processing illustrated in FIG. 36 is different from the imaging processing illustrated in FIG. 25 in that step ST500 to step ST506 are included instead of step ST226 to step ST228. Thus, in a flowchart of the imaging processing illustrated in FIG. 36, the same steps as the imaging processing illustrated in FIG. 25 are designated by the same step numbers. Hereinafter, only parts of the imaging processing illustrated in FIG. 36 different from the imaging processing illustrated in FIG. 25 will be described.

In the imaging processing illustrated in FIG. 36, in a case where a positive determination is made in step ST324, the imaging processing transitions to step ST500. In step ST500, the output image data decision portion 362C4 temporarily decides the most recent frame image data as the output image data 270.

In step ST502, the closed-eye subject detection portion 562C1a determines whether or not the closed-eye image data is included in the output image data 270 temporarily decided in step ST500. In step ST502, in a case where the closed-eye image data is not included in the output image data 270 temporarily decided in step ST500, a negative determination is made, and the imaging processing transitions to step ST504. In step ST502, in a case where the closed-eye image data is included in the output image data 270 temporarily decided in step ST500, a positive determination is made, and the imaging processing transitions to step ST506.

In a case where the closed-eye image data is not included in the output image data 270 temporarily decided in step ST500, the output image data 270 temporarily decided in step ST500 is output as the output confirmation image data 270A to the output circuit 562D by the image data selection portion 562C1.

In step ST504, the output circuit 562D outputs the output confirmation image data 270A to the controller 46. Then, the imaging processing transitions to step ST30.

In step ST506, the output circuit 562D outputs the second dummy data 270D to the controller 46. Then, the imaging processing transitions to step ST30.

As described above, in the imaging element 544, in a case where the face image data is included in the output image data 270 temporarily decided by the output image data decision portion 362C4, and the closed-eye image data is detected from the face image data, the temporarily decided output image data 270 is not output to the controller 46. Accordingly, the power consumption required for outputting the image data can be reduced, compared to a case of outputting the output image data 270 including the closed-eye image data to the controller 46.

In addition, in the imaging element 544, in a case where the face image data is included in the output image data 270 temporarily decided by the output image data decision portion 362C4, and the open-eye image data is detected from the face image data, the temporarily decided output image data 270 is output to the controller 46. Accordingly, the output image data 270 including the open-eye image data that is expected to be more necessary for the user than the output image data 270 including the closed-eye image data can be provided to the user.

In addition, in the imaging element 544, in a case where the face image data is included in the output image data 270 temporarily decided by the output image data decision portion 362C4, and the closed-eye image data is detected from the face image data, the second dummy data 270D is output to the controller 46. In this case, by outputting the second dummy data 270D to the controller 46, a degree of change in data between the imaging element 544 and the controller 46, that is, the toggle rate of data, can be decreased, compared to a case of simply not outputting the image data.

While an example of a form of outputting the second dummy data 270D to the controller 46 is illustratively described in the fifth embodiment, the technology of the present disclosure is not limited thereto. The second dummy data 270D may not be output to the controller 46. In this case, processing of step ST506 may be removed from the imaging processing illustrated in FIG. 36.

Sixth Embodiment

An example of a form of outputting the selected output image data 270 is described in the fifth embodiment. An example of a form of outputting the selected output image data 270 using a method different from the fifth embodiment will be described in a sixth embodiment. In the sixth embodiment, the same constituents as the fifth embodiment will be designated by the same reference signs and will not be described. Hereinafter, parts different from the fifth embodiment will be described.

As illustrated in FIG. 1 to FIG. 3 as an example, an imaging apparatus 600 according to the sixth embodiment is different from the imaging apparatus 500 described in the fifth embodiment in that an imaging apparatus main body 612 is included instead of the imaging apparatus main body 512. As illustrated in FIG. 3 as an example, the imaging apparatus main body 612 is different from the imaging apparatus main body 512 in that an imaging element 644 is included instead of the imaging element 544. As illustrated in FIG. 5 as an example, the imaging element 644 is different from the imaging element 544 in that a processing circuit 662 is included instead of the processing circuit 562. As illustrated in FIG. 6 as an example, the processing circuit 662 is different from the processing circuit 562 in that an image processing circuit 662C is included instead of the image processing circuit 562C.

Figure 37:
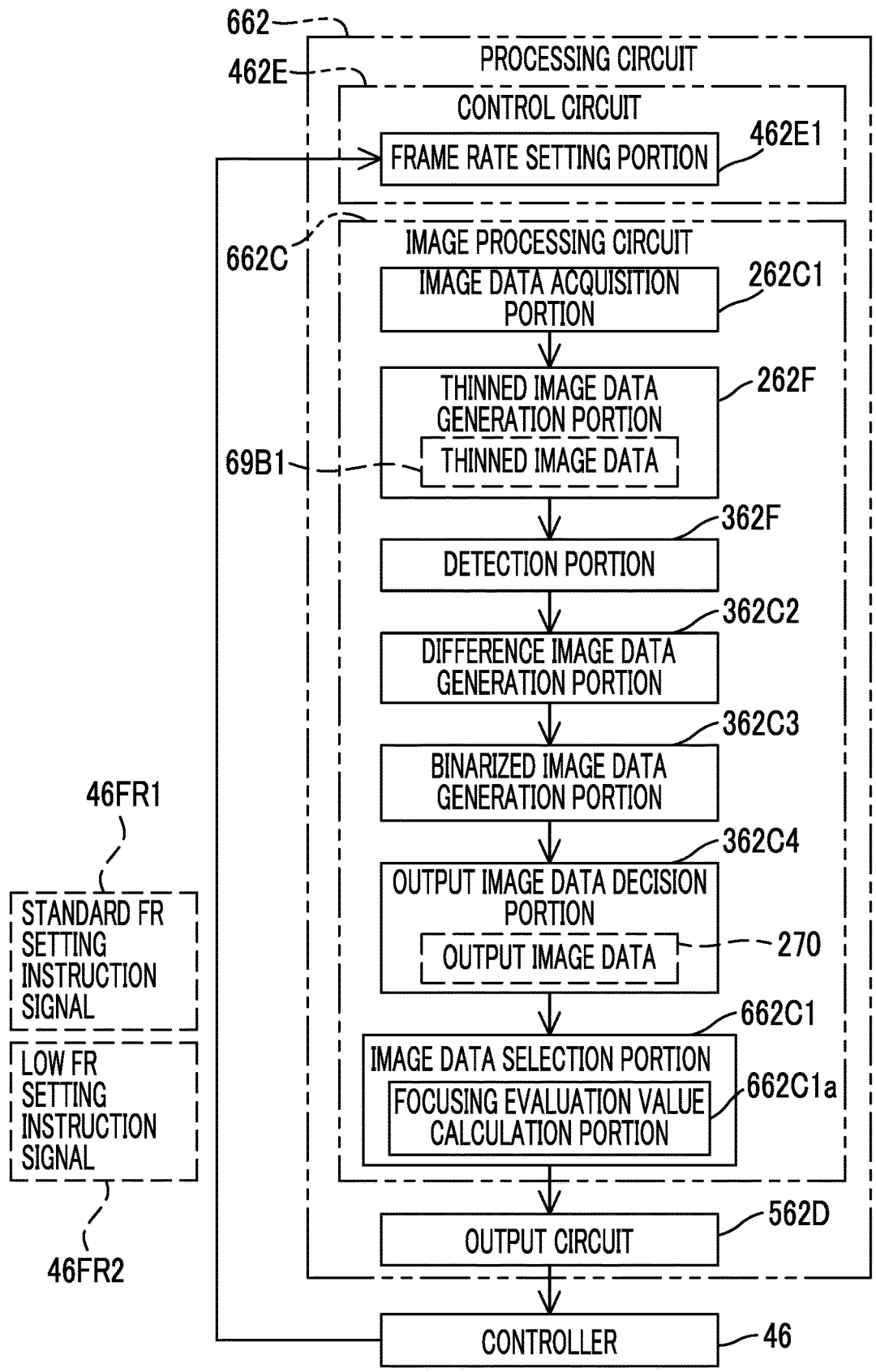
FIG. 37 is a block diagram illustrating an example of a configuration of a processing circuit included in the imaging element of the imaging apparatus according to the sixth embodiment.

As illustrated in FIG. 37 as an example, the image processing circuit 662C is different from the image processing circuit 562C in that an image data selection portion 662C1 is included instead of the image data selection portion 562C1. The image data selection portion 662C1 is different from the image data selection portion 562C1 in that a focusing evaluation value calculation portion 662C1$a$ is included instead of the closed-eye subject detection portion 562C1$a$.

Figure 38:
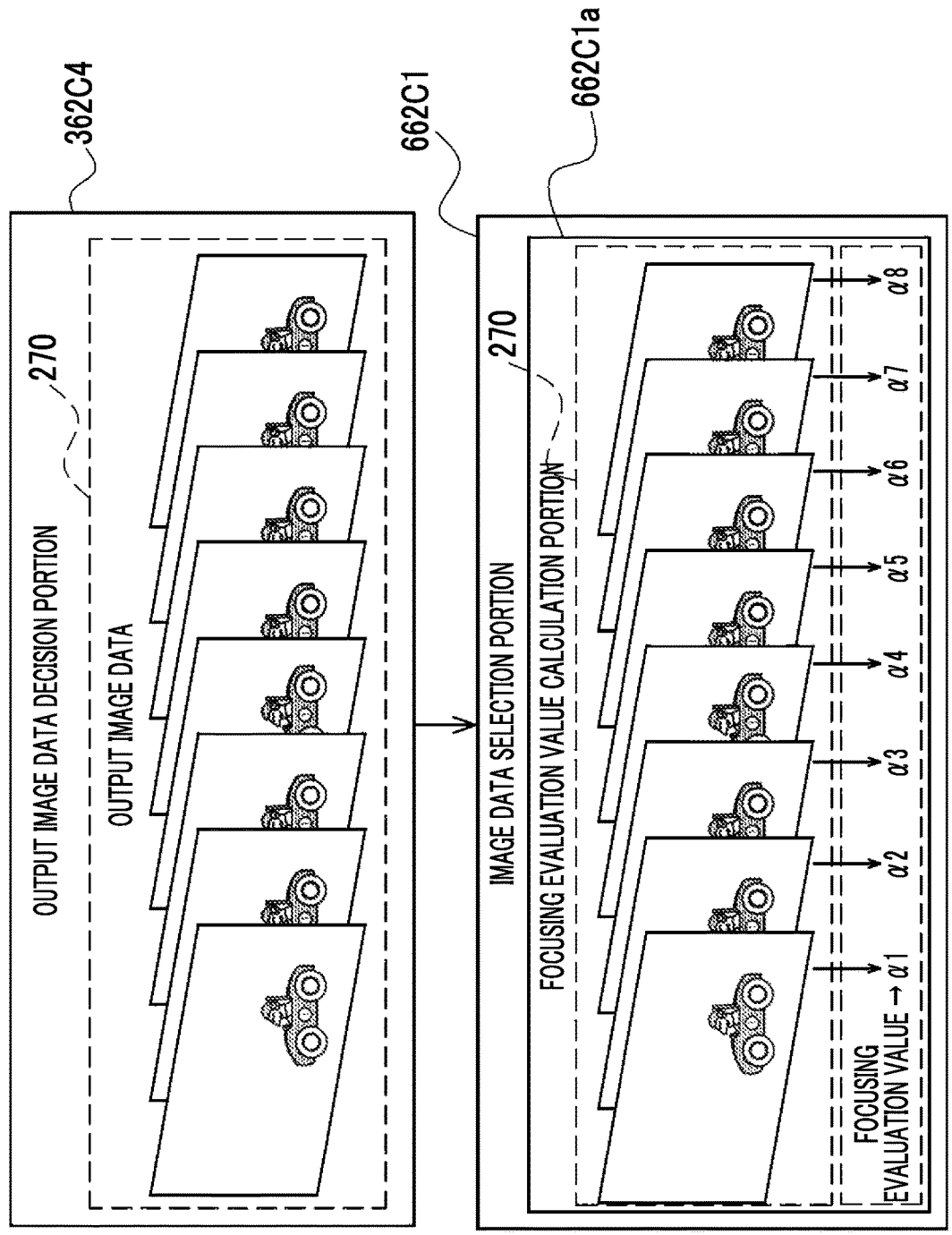
FIG. 38 is a conceptual diagram for describing the output image data decision portion and an image data selection portion illustrated in FIG. 37.

As illustrated in FIG. 38 as an example, the focusing evaluation value calculation portion 662C1$a$ calculates a focusing evaluation value indicating a degree of a focused state by targeting the output image data 270 temporarily decided by the output image data decision portion 362C4. A contrast value of an image indicated by the output image data 270 is illustrated as the focusing evaluation value. In addition, for example, in a case where a phase difference pixel is included in the photoelectric conversion element 61, a phase difference specified based on a pixel value of the phase difference pixel can be used as the focusing evaluation value.

Figure 39:
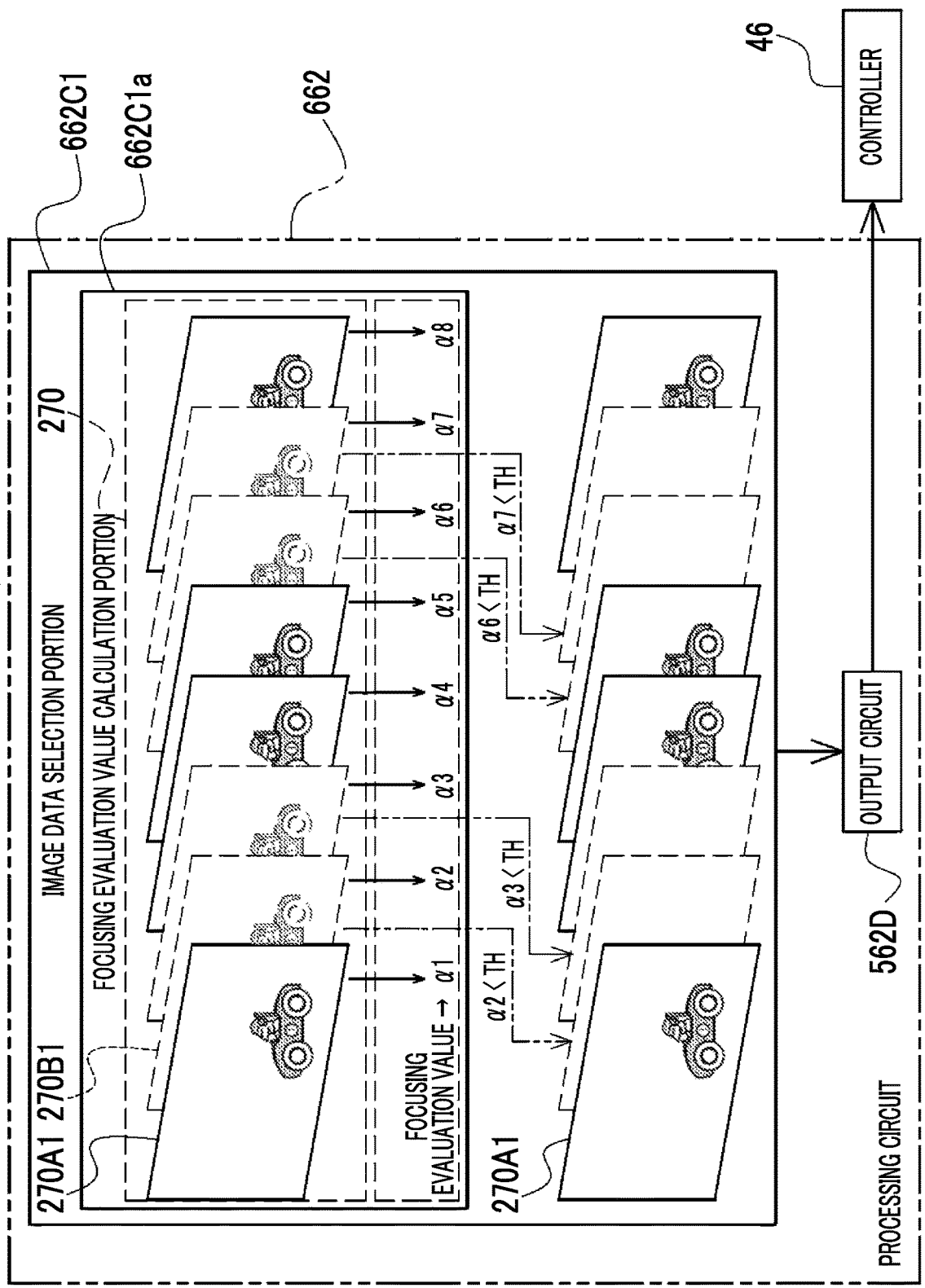
FIG. 39 is a conceptual diagram for describing the image data selection portion illustrated in FIG. 38 in detail.

In the example illustrated in FIG. 38, $\alpha 1$ to $\alpha 8$ are illustrated as the focusing evaluation value for each frame. As illustrated in FIG. 39 as an example, the image data selection portion 662C1 compares each of the focusing evaluation values $\alpha 1$ to $\alpha 8$ with a threshold value TH and outputs the output image data 270 corresponding to the focusing evaluation value less than the threshold value TH to the output circuit 562D as the output confirmation image data 270A1. In addition, the image data selection portion 662C1 sets the output image data 270 corresponding to the focusing evaluation value greater than or equal to the threshold value TH as the non-output confirmation image data 270B1 and does not output the non-output confirmation image data 270B1 to the output circuit 562D.

The output image data 270 corresponding to the focusing evaluation value less than the threshold value TH refers to the output image data 270 of a calculation target for the focusing evaluation value. In addition, the threshold value TH is an example of a "predetermined evaluation value" according to the embodiments of the technology of the present disclosure. The threshold value TH may be a fixed value or a variable value that can be changed in accordance with an instruction received by the reception portion 84 (refer to FIG. 3).

As illustrated in FIG. 35 as an example, the output circuit 562D outputs the output confirmation image data 270A1 to the controller 46 and outputs second dummy data 270D1 as the image data alternative to the non-output confirmation image data 270B1. The second dummy data 270D1 is the same image data as the second dummy data 270D described in the fifth embodiment.

As described above, in the imaging element 644, in a case where the focusing evaluation value related to the output image data 270 temporarily decided by the output image data decision portion 362C4 is less than the threshold value TH, the temporarily decided output image data 270 is not output to the controller 46. Accordingly, the power consumption required for outputting the image data can be reduced, compared to a case of outputting the output image data 270 corresponding to the focusing evaluation value less than the threshold value TH to the controller 46.

In addition, in the imaging element 644, in a case where the focusing evaluation value related to the output image data 270 temporarily decided by the output image data decision portion 362C4 is greater than or equal to the threshold value TH, the temporarily decided output image data 270 is output to the controller 46. Accordingly, the output image data 270 that is expected to be more necessary for the user than the output image data 270 corresponding to the focusing evaluation value less than the threshold value TH can be provided to the user.

In the sixth embodiment, even for the output image data 270 temporarily decided by the output image data decision portion 362C4, in a case where the focusing evaluation value related to the output image data 270 is less than the threshold value, the second dummy data 270D1 is output as the image data alternative to the output image data 270. However, the technology of the present disclosure is not limited thereto. For example, for the output image data 270 temporarily decided by the output image data decision portion 362C4 described in the fifth embodiment, the second dummy data 270D1 may be output in a case where the closed-eye image data is included, and where the focusing evaluation value is less than the threshold value. Even for the output image data 270 temporarily decided by the output image data decision portion 362C4, in a case where the output image data 270 is image data satisfying a specific condition, the output circuit 562D may not output the output image data 270 and output the second dummy data 270D1.

In addition, while a case of outputting the output image data 270 is described in the second to sixth embodiments, the technology of the present disclosure is not limited thereto. For example, the output image data 270 may be output in the display motion picture capturing mode, and the output image data 70 having a smaller data amount than the output image data 270 may be output in the recording imaging mode.

Figure 40:
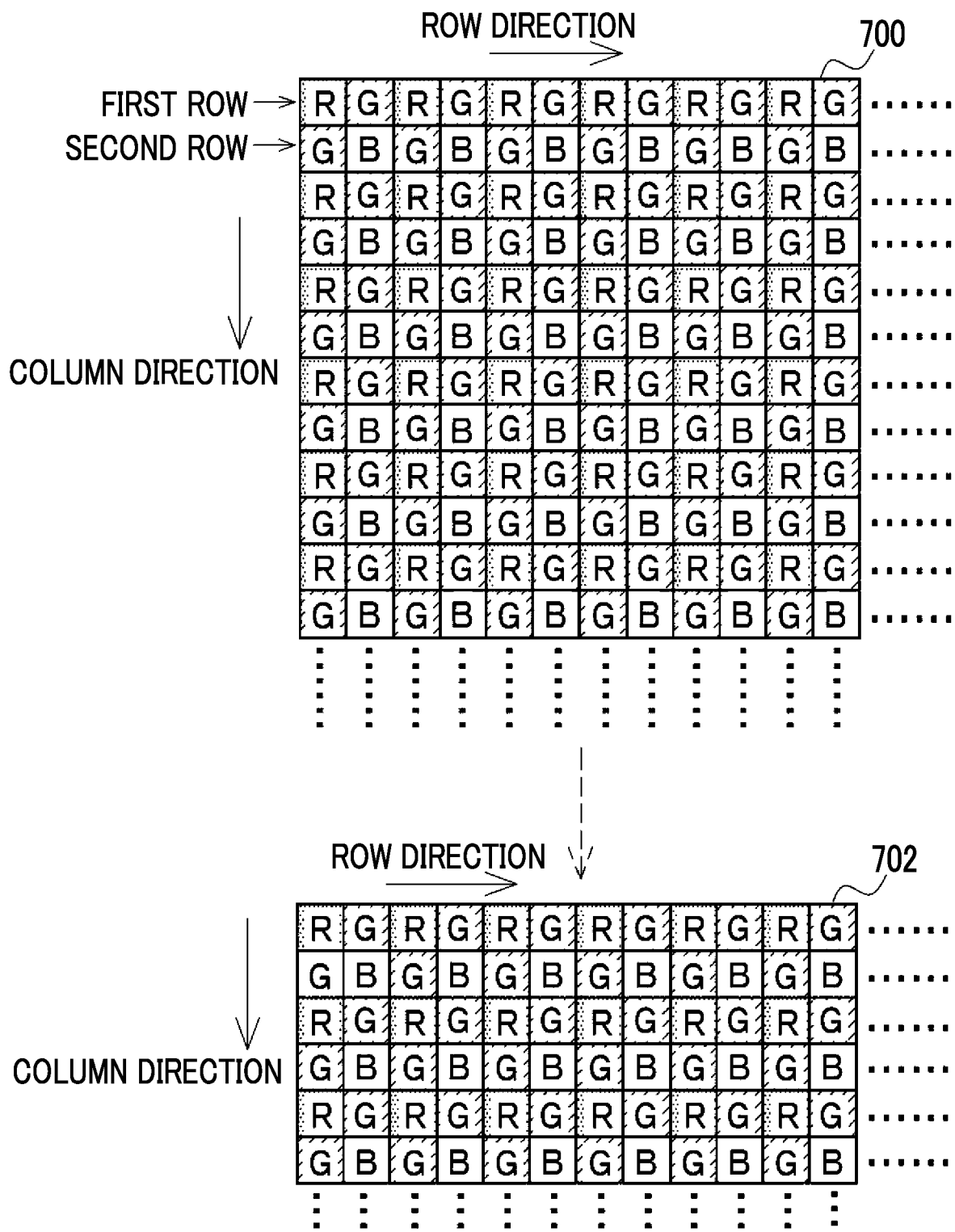
FIG. 40 is a conceptual diagram illustrating an example of a data structure of each of captured image data and thinned image data corresponding to Bayer arrangement.

In addition, while the captured image data 69B having the X-Trans arrangement of the R pixels, the G pixels, and the B pixels is illustrated in the second embodiment, the technology of the present disclosure is not limited thereto. For example, as illustrated in FIG. 40, captured image data 700 may be used instead of the captured image data 69B. In the captured image data 700, the R pixels, the G pixels, and the B pixels are arranged with periodicity corresponding to Bayer arrangement.

In the example illustrated in FIG. 40, in a first row, the R pixels and the G pixels are arranged in circulation in an order of the R pixel and the G pixel in the row direction. In addition, in a second row, the B pixels and the G pixels are arranged in circulation in an order of the G pixel and the B pixel in the row direction. An arrangement pattern of the R pixels, the G pixels, and the B pixels of the entire captured image data 700 is formed by repetition of an arrangement pattern of the R pixels and the G pixels of the first row in every other row in the column direction and repetition of an arrangement pattern of the B pixels and the G pixels of the second row in every other row in the column direction.

In this case, the thinning processing is performed on the captured image data 700. For example, thinned image data 702 illustrated in FIG. 40 is image data indicating a vertically ½ thinned image obtained by thinning out lines of every two rows adjacent in the column direction from an image indicated by the captured image data 700.

In addition, while "calculation" meaning derivation of a solution using a calculation expression is illustrated in each of the embodiments, the technology of the present disclosure is not limited thereto. For example, instead of "calculation", "derivation" using a look-up table may be applied, or the calculation expression and the look-up table may be used together. For example, "derivation" using the look-up table includes processing of deriving a solution as an output value using the look-up table that includes an independent variable of the calculation expression as an input value and a dependent variable (solution) of the calculation expression as an output value.

In addition, while an example of a form of implementing the processing circuits 62, 262, 362, 462, 562, and 662 (hereinafter, simply referred to as the "processing circuit") by an ASIC is illustratively described in each of the embodiments, the technology of the present disclosure is not limited thereto. For example, the imaging processing may be implemented by a software configuration based on a computer.

Figure 41:
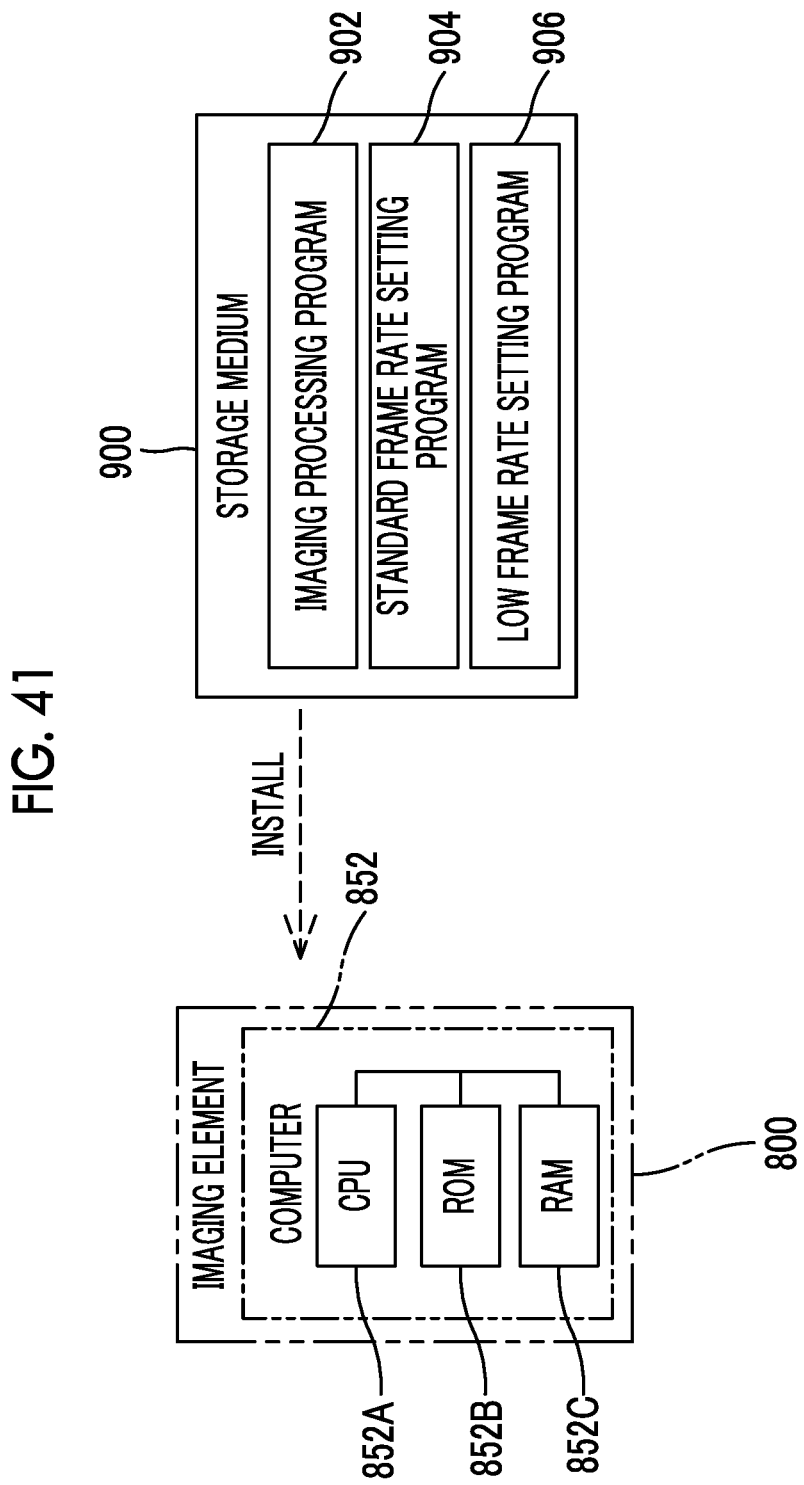
FIG. 41 is a conceptual diagram illustrating an example of an aspect in which a program is installed on a computer within the imaging element from a storage medium storing the program.

In this case, for example, as illustrated in FIG. 41, an imaging processing program 902 causing a computer 852 incorporated in an imaging element 800 corresponding to the imaging elements 44, 244, 344, 444, 544, and 644 to execute the imaging processing is stored in a storage medium 900. In addition, a standard frame rate setting program 904 for executing the standard frame rate setting processing is stored in the storage medium 900. Furthermore, a low frame rate setting program 906 is stored in the storage medium 900.

The computer 852 comprises a CPU 852A, a ROM 852B, and a RAM 852C. The imaging processing program 902 of the storage medium 900 is installed on the computer 852, and the CPU 852A of the computer 852 executes the imaging processing in accordance with the imaging processing program 902. In addition, the standard frame rate setting program 904 of the storage medium 900 is installed on the computer 852, and the CPU 852A of the computer 852 executes the standard frame rate setting processing in accordance with the standard frame rate setting program 904. Furthermore, the low frame rate setting program 906 of the storage medium 900 is installed on the computer 852, and the CPU 852A of the computer 852 executes the low frame rate setting processing in accordance with the low frame rate setting program 906.

While a single CPU is illustrated as the CPU 852A here, the technology of the present disclosure is not limited thereto. A plurality of CPUs may be employed instead of the CPU 852A. Any portable storage medium such as an SSD or a USB memory is illustrated as an example of the storage medium 900.

While the imaging processing program 902, the standard frame rate setting program 904, and the low frame rate setting program 906 are stored in the storage medium 900 in the example illustrated in FIG. 41, the technology of the present disclosure is not limited thereto. For example, at least one program of the imaging processing program 902, the standard frame rate setting program 904, or the low frame rate setting program 906 may be stored in advance in the ROM 852B. The CPU 852A may read out the program from the ROM 852B, load the program into the RAM 852C, and execute the loaded program.

In addition, the imaging processing program 902, the standard frame rate setting program 904, and the low frame rate setting program 906 may be stored in a storage portion of another computer, a server apparatus, or the like connected to the computer 852 through a communication network (not illustrated). The imaging processing program 902, the standard frame rate setting program 904, and the low frame rate setting program 906 may be downloaded to the computer 852 in response to a request of the imaging apparatuses 10, 200, 300, 400, 500, and 600 (hereinafter, simply referred to as the "imaging apparatus"). In this case, the downloaded imaging processing program 902, the standard frame rate setting program 904, and the low frame rate setting program 906 are executed by the CPU 852A of the computer 852.

In addition, the computer 852 may be disposed outside the imaging elements 44, 244, 344, 444, 544, and 644. In this case, the computer 852 may control the processing circuit in accordance with the imaging processing program 902, the standard frame rate setting program 904, and the low frame rate setting program 906.

Various processors illustrated below can be used as a hardware resource for executing the imaging processing described in each of the embodiments. For example, as described above, a CPU that is a general-purpose processor functioning as the hardware resource for executing the imaging processing by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor.

The hardware resource for executing the imaging processing may be configured with one of those various processors or may be configured with a combination of two or more processors of the same type or different types (for example, a combination of a plurality of FPGAs or a combination of a CPU and an FPGA). In addition, the hardware resource for executing various types of processing according to the embodiments of the technology of the present disclosure may be one processor.

As an example of a configuration with one processor, first, as represented by a computer such as a client and a server, a form in which one processor is configured with a combination of one or more CPUs and software, and in which this processor functions as the hardware resource for executing the in-imaging element processing is available. Second, as represented by a system-on-a-chip (SoC) or the like, a form of using a processor that implements, by one IC chip, a function of the entire system including a plurality of hardware resources for executing the imaging processing is available. The in-imaging element processing is implemented using one or more of the various processors as the hardware resource.

Furthermore, as a hardware structure of those various processors, more specifically, an electric circuit in which circuit elements such as semiconductor elements are combined can be used.

Figure 42:
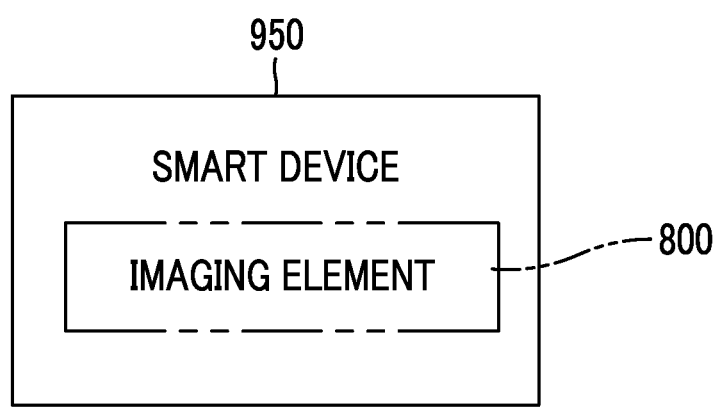
FIG. 42 is a block diagram illustrating an example of a schematic configuration of a smart device incorporating the imaging element according to the embodiments.

While an interchangeable lens camera is illustrated as the imaging apparatus in each of the embodiments, the technology of the present disclosure is not limited thereto. For example, the technology of the present disclosure may be applied to a smart device 950 illustrated in FIG. 42. The smart device 950 illustrated in FIG. 42 as an example is an example of the imaging apparatus according to the embodiments of the technology of the present disclosure. The imaging element 800 is mounted in the smart device 950. Even with the smart device 950 configured in such a manner, the same actions and effects as the imaging apparatus described in each of the embodiments are obtained. The technology of the present disclosure can be applied to not only the smart device 950 but also a personal computer or a wearable terminal apparatus.

While the first display 32 and the second display 86 are illustrated in each of the embodiments, the technology of the present disclosure is not limited thereto. For example, a separate display that is retrofit into the imaging apparatus main bodies 12, 212, 312, 412, 512, and 612 may be used as the "display portion" according to the embodiments of the technology of the present disclosure.

In addition, the imaging processing, the standard frame rate setting processing, and the low frame rate setting processing are merely an example. Accordingly, unnecessary steps may be deleted, new steps may be added, or a processing order may be rearranged without departing from a gist of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
a memory that stores image data obtained by imaging a subject at a first frame rate, and that is incorporated in the imaging element; and
a processor that is incorporated in the imaging element, and that is configured to perform processing using the image data and to output output image data based on the image data at a second frame rate, based on a processing result,
the processor being configured to:
derive a degree of difference between first image data that is obtained as the image data by performing imaging and second image data that is obtained as the image data earlier than the first image data and is stored in the memory,
perform processing of selecting at least one of the first image data or the second image data as the output image data in a case in which the derived degree of difference is equal to or greater than a threshold value,
output the output image data, and
output first dummy data in a case in which the derived degree of difference is less than the threshold value.

2. The imaging element according to claim 1,
wherein the processor is configured to, in a case in which the derived degree of difference is equal to or greater than the threshold value, not output the output image data and output second dummy data in a case in which the output image data is image data satisfying a specific condition.

3. The imaging element according to claim 2,
wherein the specific condition is a presence of closed-eye image data, which indicates an image of an eye in a state in which an eyelid is closed, in the output image data.

4. The imaging element according to claim 2,
wherein the specific condition is a value indicating a degree of focusing for the output image data being less than a predetermined value.

5. The imaging element according to claim 2,
wherein the specific condition is a presence of closed-eye image data, which indicates an image of an eye in a state in which an eyelid is closed, in the output image data, and a value indicating a degree of focusing for the output image data being less than a predetermined value.

6. The imaging element according to claim 1,
wherein the processor is configured to:
perform thinning processing on the first image data and the second image data, and
derive a degree of difference between the first image data after the thinning processing and the second image data after the thinning processing.

7. The imaging element according to claim 1,
wherein the processor is configured to:
  detect main subject image data indicating an image of a main subject from one of the first image data or the second image data, and
  detect, from another of the first image data or the second image data, specific image data indicating an image specified from a position corresponding to a position of the image of the main subject within an image indicated by the first image data, and
the degree of difference is a degree of difference between the main subject image data detected by the processor and the specific image data detected by the processor.

8. The imaging element according to claim 1,
wherein the processor is configured to, in a case in which a state in which the degree of difference is less than the threshold value continues for a predetermined time period, decrease at least the first frame rate among the first frame rate and the second frame rate.

9. The imaging element according to claim 1,
wherein the processor is configured to:
  detect, from the image data, closed-eye image data indicating an image of an eye in a state in which an eyelid is closed, and
  in a case in which the closed-eye image data is detected, not output the image data from which the closed-eye image data is detected.

10. The imaging element according to claim 9,
wherein the processor is configured to, in a case in which the derived degree of difference is equal to or greater than the threshold value, select at least one of the first image data or the second image data as the output image data, on a condition that the closed-eye image data is not detected.

11. The imaging element according to claim 1,
wherein the processor is configured to:
  derive an evaluation value indicating a degree of focusing for the image data, and
  in a case in which the derived evaluation value is less than a predetermined evaluation value, not output the image data of a derivation target for the evaluation value less than the predetermined evaluation value.

12. The imaging element according to claim 11,
wherein the processor is configured to, in a case in which the derived degree of difference is equal to or greater than the threshold value, select at least one of the first image data or the second image data as the output image data, on a condition that the evaluation value is equal to or greater than the predetermined evaluation value.

13. The imaging element according to claim 1,
wherein at least a photoelectric conversion element and the memory are formed in one chip.

14. The imaging element according to claim 13,
wherein the imaging element is a laminated imaging element in which the photoelectric conversion element is laminated with the memory.

15. An imaging apparatus comprising:
the imaging element according to claim 1; and
a display control processor configured to perform control for displaying an image on a display, based on the output image data output by the processor.

16. An imaging apparatus comprising:
the imaging element according to claim 1; and
a storage control processor configured to perform control for storing, in a storage device, the output image data output by the processor.

17. An imaging element comprising:
a memory that stores image data obtained by imaging a subject at a first frame rate, and that is incorporated in the imaging element; and
a processor that is incorporated in the imaging element, and that is configured to perform processing using the image data and to output output image data based on the image data at a second frame rate, based on a processing result,
the processor being configured to:
  derive a degree of difference between first image data that is obtained as the image data by performing imaging and second image data that is obtained as the image data earlier than the first image data and is stored in the memory,
  perform processing of selecting at least one of the first image data or the second image data as the output image data in a case in which the derived degree of difference is equal to or greater than a threshold value,
  output the output image data, and
  in a case in which the derived degree of difference is equal to or greater than the threshold value, not output the output image data and output second dummy data in a case in which the output image data is image data satisfying a specific condition.

18. An operation method of an imaging element including a memory that stores image data obtained by imaging a subject at a first frame rate, and a processor configured to perform processing using the image data and to output output image data based on the image data at a second frame rate, based on a processing result, the memory and the processor being incorporated in the imaging element, the operation method comprising:
  deriving a degree of difference between first image data that is obtained as the image data by performing imaging and second image data that is obtained as the image data earlier than the first image data and is stored in the memory;
  performing processing of selecting at least one of the first image data or the second image data as the output image data in a case in which the derived degree of difference is equal to or greater than a threshold value;
  outputting the output image data; and
  outputting first dummy data in a case in which the derived degree of difference is less than the threshold value.

19. An operation method of an imaging element including a memory that stores image data obtained by imaging a subject at a first frame rate, and a processor configured to perform processing using the image data and to output output image data based on the image data at a second frame rate, based on a processing result, the memory and the processor being incorporated in the imaging element, the operation method comprising:
  deriving a degree of difference between first image data that is obtained as the image data by performing imaging and second image data that is obtained as the image data earlier than the first image data and is stored in the memory;
  performing processing of selecting at least one of the first image data or the second image data as the output image data in a case in which the derived degree of difference is equal to or greater than a threshold value;
  outputting the output image data; and
  in a case in which the derived degree of difference is equal to or greater than the threshold value, not output the output image data and output second dummy data in a case in which the output image data is image data satisfying a specific condition.

20. A non-transitory computer-readable storage medium storing a program for a computer applied to an imaging element including a memory that stores image data obtained by imaging a subject at a first frame rate, and a processor configured to perform processing using the image data and to output output image data based on the image data at a second frame rate, based on a processing result, the memory and the processor being incorporated in the imaging element, the program causing the computer to execute a process comprising:

deriving a degree of difference between first image data that is obtained as the image data by performing imaging and second image data that is obtained as the image data earlier than the first image data and is stored in the memory;

performing processing of selecting at least one of the first image data or the second image data as the output image data in a case in which the derived degree of difference is equal to or greater than a threshold value;

outputting the output image data; and outputting first dummy data in a case in which the derived degree of difference is less than the threshold value.

21. A non-transitory computer-readable storage medium storing a program for a computer applied to an imaging element including a memory that stores image data obtained by imaging a subject at a first frame rate, and a processor configured to perform processing using the image data and to output output image data based on the image data at a second frame rate, based on a processing result, the memory and the processor being incorporated in the imaging element, the program causing the computer to execute a process comprising:

deriving a degree of difference between first image data that is obtained as the image data by performing imaging and second image data that is obtained as the image data earlier than the first image data and is stored in the memory;

performing processing of selecting at least one of the first image data or the second image data as the output image data in a case in which the derived degree of difference is equal to or greater than a threshold value;

outputting the output image data; and in a case in which the derived degree of difference is equal to or greater than the threshold value, not output the output image data and output second dummy data in a case in which the output image data is image data satisfying a specific condition.

* * * * *